United States Patent [19]
Oliver et al.

[11] Patent Number: 5,593,486
[45] Date of Patent: Jan. 14, 1997

[54] PHOTOCHROMIC HOT MELT INK COMPOSITIONS

[75] Inventors: John F. Oliver, Calgary; Trevor I. Martin, Burlington; Carol A. Jennings, Etobicoke, all of Canada; Eric G. Johnson, Plant City, Fla.; Stephan V. Drappel, Toronto, Canada

[73] Assignee: Xerox Corporation, Stamford, Conn.

[21] Appl. No.: 567,457

[22] Filed: Dec. 5, 1995

[51] Int. Cl.⁶ .................................................. C09D 11/02
[52] U.S. Cl. ................... 106/22 A; 106/21 A; 106/23 A
[58] Field of Search .................. 106/21 R, 21 A, 106/23 A, 22 A, 22 B

[56] References Cited

U.S. PATENT DOCUMENTS

| | | | |
|---|---|---|---|
| 4,203,619 | 5/1980 | Sanders | 106/21 R |
| 4,490,731 | 12/1984 | Vought | 346/140 R |
| 4,751,528 | 6/1988 | Spehrley, Jr. et al. | 3436/140 R |
| 4,791,439 | 12/1988 | Guiles | 346/140 R |
| 5,006,170 | 4/1991 | Schwarz et al. | 106/20 R |
| 5,051,779 | 9/1991 | Hikawa | 355/200 |
| 5,091,966 | 2/1992 | Blomberg et al. | 382/21 |
| 5,122,187 | 6/1992 | Schwarz et al. | 106/25 R |
| 5,128,525 | 7/1992 | Sterns et al. | 235/454 |
| 5,168,147 | 12/1992 | Blomberg | 235/456 |
| 5,286,288 | 2/1994 | Tobias et al. | 106/22 A |
| 5,290,346 | 3/1994 | Fujioka | 106/22 A |
| 5,291,243 | 3/1994 | Fleckman et al. | 355/201 |
| 5,298,062 | 3/1994 | Davies et al. | 106/22 A |
| 5,337,361 | 8/1994 | Wang et al. | 380/51 |
| 5,383,959 | 1/1995 | Sirdesai et al. | 106/21 A |
| 5,507,864 | 4/1996 | Jaeger et al. | 106/22 A |

FOREIGN PATENT DOCUMENTS

| | | |
|---|---|---|
| 459792A2 | 3/1991 | European Pat. Off. . |
| 469864A2 | 5/1992 | European Pat. Off. . |

*Primary Examiner*—Helene Klemanski
*Attorney, Agent, or Firm*—Judith L. Byorick

[57] ABSTRACT

Disclosed is a hot melt ink composition comprising (a) an ink vehicle, said ink vehicle being a solid at about 25° C. and having a viscosity of from about 1 to about 20 centipoise at a temperature suitable for hot melt ink jet printing, said temperature being greater than about 45° C., (b) a photochromic material, (c) an optional colorant, and (d) an optional propellant.

19 Claims, No Drawings

PHOTOCHROMIC HOT MELT INK COMPOSITIONS

BACKGROUND OF THE INVENTION

The present invention is directed to hot melt ink compositions. More specifically, the present invention is directed to ink compositions that are solid at room temperature and that are suitable for ink jet printing processes, particularly thermal ink jet printing processes. One embodiment of the present invention is directed to a hot melt ink composition comprising (a) an ink vehicle, said ink vehicle being a solid at about 25° C. and having a viscosity of from about 1 to about 20 centipoise at a temperature suitable for hot melt ink jet printing, said temperature being greater than about 45° C., (b) a photochromic material, (c) an optional colorant, and (d) an optional propellant.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, they are much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The second type of drop-on-demand system is known as thermal ink jet, or bubble jet, and produces high velocity droplets and allows very close spacing of nozzles. The major components of this type of drop-on-demand system are an ink-filled channel having a nozzle on one end and a heat generating resistor near the nozzle. Printing signals representing digital information originate an electric current pulse in a resistive layer within each ink passageway near the orifice or nozzle causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be retired after 100 to 500 microseconds minimum dwell time to enable the channel to be refilled and to enable the dynamic refilling factors to become somewhat dampened. Thermal ink jet processes are well known and are described, for example, in U.S. Pat. Nos. 4,601,777; 4,251,824; 4,410,899; 4,412,224; and 4,532,530, the disclosures of each of which are totally incorporated herein by reference.

Ink jet printing processes may also employ inks that are solid at room temperature and liquid at elevated temperatures. For example, U.S. Pat. No. 4,490,731, the disclosure of which is totally incorporated herein by reference, discloses an apparatus for dispensing solid ink for printing on a substrate such as paper. The ink dye vehicle is chosen to have a melting point above room temperature, so that the ink which is melted in the apparatus will not be subject to evaporation or spillage during periods of nonprinting. The vehicle is also chosen to have a low critical temperature to permit the use of the solid ink in a thermal ink jet printer. In thermal ink jet printing processes employing hot melt inks, the solid ink is melted by the heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby enabling higher print density than is generally obtained with liquid inks. Advantages of a hot melt ink in ink jet printing are elimination of potential spillage of the ink during handling, a wide range of print density and quality, minimal paper cockle or distortion, and enablement of indefinite periods of nonprinting without the danger of nozzle clogging, even without capping the nozzles.

In addition, U.S. Pat. No. 4,751,528, the disclosure of which is totally incorporated herein by reference, discloses a hot melt ink jet system which includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify hot melt ink in a selected zone more rapidly to avoid offset by a pinch roll coming in contact with the surface of the substrate to which hot melt ink has been applied. An airtight enclosure surrounding the platen is connected to a vacuum pump and has slits adjacent to the platen to hold the substrate in thermal contact with the platen.

Further, U.S. Pat. No. 4,791,439, the disclosure of which is totally incorporated by reference, discloses an apparatus for use with hot melt inks having an integrally connected ink jet head and reservoir system, the reservoir system including a highly efficient heat conducting plate inserted within an essentially non-heat conducting reservoir housing. The reservoir system has a sloping flow path between an inlet position and a sump from which ink is drawn to the head, and includes a plurality of vanes situated upon the plate for rapid heat transfer.

U.S. Pat. No. 5,006,170 (Schwarz) and U.S. Pat. No. 5,122,187 (Marchessault et al.), the disclosures of each of which are totally incorporated herein by reference, disclose hot melt ink compositions suitable for ink jet printing which comprise a colorant, a binder, and a propellant selected from the group consisting of hydrazine; cyclic amines; ureas; carboxylic acids; sulfonic acids; aldehydes; ketones; hydrocarbons; esters; phenols; amides; imides; halocarbons; urethanes; ethers; sulfones; sulfamides; sulfonamides; phosphites; phosphonates; phosphates; alkyl sulfides; alkyl acetates; and sulfur dioxide. Also disclosed are hot melt ink compositions suitable for ink jet printing which comprise a colorant, a propellant, and a binder selected from the group consisting of rosin esters; polyamides; dimer acid amides; fatty acid amides; epoxy resins; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides; benzoate esters; long chain alcohols; phthalate plasticizers; citrate plasticizers; maleate plasticizers; sulfones; polyvinyl -pyrrolidinone copolymers; polyvinyl pyrrolidone/polyvinyl acetate copolymers; novalac resins; natural product waxes; mixtures of linear primary alcohols and linear long chain amides; and mixtures of linear primary alcohols and fatty acid amides. In one embodiment, the binder comprises a liquid crystalline material.

Photochromism in general is a reversible change of a single chemical species between two states having distinguishably different absorption spectra, wherein the change is induced in at least one direction by the action of electromagnetic radiation. The inducing radiation, as well as the changes in the absorption spectra, are usually in the ultraviolet, visible, or infrared regions. In some instances, the change in one direction is thermally induced. The single chemical species can be a molecule or an ion, and the reversible change in states may be a conversion between two molecules or ions, or the dissociation of a single molecule or ion into two or more species, with the reverse change being a recombination of the two or more species thus formed into the original molecule or ion. Photochromic phenomena are observed in both organic compounds, such as anils, disulfoxides, hydrazones, osazones, semicarbazones, stilbene derivatives, o-nitrobenzyl derivatives, spiro compounds, and the like, and in inorganic compounds, such as metal oxides, alkaline earth metal sulfides, titanates, mercury compounds, copper compounds, minerals, transition metal compounds such as carbonyls, and the like. Photochromic materials are known in applications such as photochromic glasses, which are useful as, for example, ophthalmic lenses.

Methods for encoding machine-readable information on documents, packages, machine parts, and the like, are known. One-dimensional symbologies, such as those employed in bar codes, are known. Two-dimensional symbologies generally are of two types—matrix codes and stacked bar codes. Matrix codes typically consist of a random checker board of black and white squares. Alignment features such as borders, bullseyes, start and stop bits, and the like, are included in the matrix to orient the matrix during scanning. Stacked bar codes consist of several one-dimensional bar codes stacked together. Two-dimensional symbologies have an advantage over one-dimensional symbologies of enabling greater data density. For example, a typical bar code can contain from about 9 to about 20 characters per inch, while a typical two-dimensional symbology can contain from about 100 to about 800 characters per square inch. Many two-dimensional symbologies also utilize error correction codes to increase their robustness. Examples of two-dimensional symbologies include PDF417, developed by Symbol Technologies, Inc., Data Matrix, developed by International Data Matrix, Vericode, developed by Veritec, Inc., CP Code, developed by Teiryo, Inc. and Integrated Motions, Inc., Maxicode, developed by the United Parcel Service, Softstrip, developed by Softstrip, Inc., Code One, developed by Laserlight Systems, Supercode, developed by Metanetics Inc., DataGlyph, developed by Xerox Corporation, and the like. One-dimensional and two-dimensional symbologies can be read with laser scanners or with video cameras. The scanners typically consist of an imaging detector coupled to a microprocessor for decoding. Scanners can be packaged into pen-like pointing devices or guns. Bar-like codes and methods and apparatus for coding and decoding information contained therein are disclosed in, for example, U.S. Pat. No. 4,692,603, U.S. Pat. No. 4,665,004, U.S. Pat. No. 4,728,984, U.S. Pat. No. 4,728,783, U.S. Pat. No. 4,754,127, and U.S. Pat. No. 4,782,221, the disclosures of each of which are totally incorporated herein by reference.

European Patent Application 469,864-A2 (Bloomberg et al.), the disclosure of which is totally incorporated herein by reference, discloses self-clocking glyph shape codes for encoding digital data in the shapes of glyphs that are suitable for printing on hardcopy recording media. Advantageously, the glyphs are selected so that they tend not to degrade into each other when they are degraded and/or distorted as a result, for example, of being photocopied, transmitted via facsimile, and/or scanned into an electronic document processing system. Moreover, for at least some applications, the glyphs desirably are composed of printed pixel patterns containing nearly the same number of on pixels and nearly the same number of off pixels, such that the code that is rendered by printing such glyphs on substantially uniformly spaced centers appears to have a generally uniform texture. In the case of codes printed at higher spatial densities, this texture is likely to be perceived as a generally uniform gray tone. Binary image processing and convolution filtering techniques for decoding such codes are also disclosed.

European Patent Application 459,792-A2 (Zdybel et al.), the disclosure of which is totally incorporated herein by reference, discloses the provision in electronic document processing systems for printing unfiltered or filtered machine-readable digital representations of electronic documents, and human-readable renderings of them on the same record medium using the same printing process. The integration of machine-readable digital representations of electronic documents with the human-readable hardcopy renderings of them may be employed, for example, not only to enhance the precision with which the structure and content of such electronic documents can be recovered by scanning such hardcopies into electronic document processing systems, but also as a mechanism for enabling recipients of scanned-in versions of such documents to identify and process annotations that were added to the hardcopies after they were printed and/or for alerting the recipients of the scanned-in documents to alterations that may have been made to the original human-readable content of the hardcopy renderings. In addition to storage of the electronic representation of the document, provision is made for encoding information about the electronic representation of the document itself, such as file name, creation and modification dates, access and security information, and printing histories. Provision is also made for encoding information which is computed from the content of the document and other information, for purposes of authentication and verification of document integrity. Provision is also made for the encoding of information which relates to operations which are to be performed depending on handwritten marks made upon a hardcopy rendering of the document; for example, encoding instructions of what action is to be taken when a box on a document is checked. Provision is also made for encoding in the hardcopy another class of information: information about the rendering of the document specific to that hardcopy, which can include a numbered copy of that print, the identification of the machine which performed that print, the reproduction characteristics of the printer, and the screen frequency and rotation used by the printer in rendering halftones. Provision is also made for encoding information about the digital encoding mechanism itself, such as information given in standard-encoded headers about subsequently compressed or encrypted digital information.

U.S. Pat. No. 5,128,525 (Stearns et al.), the disclosure of which is totally incorporated herein by reference, discloses weighted and unweighted convolution filtering processes for decoding bitmap image space representations of self-clocking glyph shape codes and for tracking the number and locations of the ambiguities or "errors" that are encountered during the decoding. This error detection may be linked to or compared against the error statistics from an alternative decoding process, such as the binary image processing techniques that are described to increase the reliability of the decoding that is obtained.

U.S. Pat. No. 5,291,243 (Heckman et al.), the disclosure of which is totally incorporated herein by reference, discloses a system for printing security documents which have copy detection or tamper resistance in plural colors with a single pass electronic printer printing an integrated image controlled by an image generation system which electronically generates a safety background image pattern with first and second interposed color patterns which is electronically merged with alphanumeric information and a protected signature into an integrated electronic image for the printer. The single pass printer preferably has an imaging surface upon which two latent images thereof are interposed, developed with two differently colored developer materials, and simultaneously transferred to the substrate in a single pass. The color patterns are preferably oppositely varying density patterns of electronically generated pixel dot images with varying spaces therebetween. Preferably a portion of the alphanumeric information is formed by a special secure font, such as a low density shadow copy. The validating signature also preferably has two intermixed color halftone patterns with halftone density gradients varying across the signature in opposite directions, but differently from the background. Also electronically superimposed in the safety background pattern may be substantially invisible latent image pixel patterns which become visible when copied, and/or are machine readable even in copies.

U.S. Pat. No. 5,168,147 (Bloomberg), the disclosure of which is totally incorporated herein by reference, discloses binary image processing techniques for decoding bitmap image space representations of self-clocking glyph shape codes of various types (e.g., codes presented as original or degraded images, with one or a plurality of bits encoded in each glyph, while preserving the discriminability of glyphs that encode different bit values) and for tracking the number and locations of the ambiguities (sometimes referred to herein as "errors") that are encountered during the decoding of such codes. A substantial portion of the image processing that is performed in the illustrated embodiment of the invention is carried out through the use of morphological filtering operations because of the parallelism that is offered by such operations. Moreover, the error detection that is performed in accordance with this invention may be linked to or compared against the error statistics from one or more alternative decoding process, such as the convolution filtering process that is disclosed herein, to increase the reliability of the decoding that is obtained.

U.S. Pat. No. 5,091,966 (Bloomberg et al.), the disclosure of which is totally incorporated herein by reference, discloses weighted and unweighted convolution filtering processes for decoding bitmap image space representations of self-clocking glyph shape codes and for tracking the number and locations of the ambiguities or "errors" that are encountered during the decoding. This error detection may be linked to or compared against the error statistics from an alternative decoding process, such as the binary image processing techniques that are described to increase the reliability of the decoding that is obtained.

U.S. Pat. No. 5,051,779 (Hikawa), the disclosure of which is totally incorporated herein by reference, discloses an image processing system which specifies input image information on the basis of existence of a special mark or patterns printed on a job control sheet. Selected one of various image processings is executed in accordance with the existence of the special mark or patterns to thereby obtain output image information. Each of the special marks or patterns are line drawings, each drawn so as to have a certain low correlative angle to the longitudinal and transverse directions of an image provided with the special mark or patterns.

U.S. Pat. No. 5,337,361 (Wang et al.), the disclosure of which is totally incorporated herein by reference, discloses a record which contains a graphic image and an information area which are interrelated to discourage misuse of the record. The information area can overlay the graphic image and include information encoded in an error-correctable, machine-readable format which allows recovery of the information despite distortion due to the underlying graphic image. The record may also represent the image by words similar in form to words in the information area. Both the information and graphic words can then be altered when an action regarding the record takes place.

Copending application U.S. Ser. No. 08/567,786, filed concurrently herewith, entitled "Method for Embedding and Recovering Machine-Readable Information," with the named inventors Trevor I. Martin and John F. Oliver, the disclosure of which is totally incorporated herein by reference, discloses a method of embedding and recovering machine readable information on a substrate which comprises (a) writing data in a predetermined machine readable code format on the substrate with a photochromic marking material having a first state corresponding to a first absorption spectrum and a second state corresponding to a second absorption spectrum; and (b) thereafter effecting a photochromic change in the photochromic marking material from the first state to the second state.

Copending application U.S. Ser. No. 08/567,637, filed concurrently herewith, entitled "Ink Compositions With Liposomes Containing Photochromic Compounds," with the named inventors Carol A. Jennings, Marcel P. Breton, Mary A. Isabella, Eric G. Johnson, Trevor I. Martin, and John F. Oliver, the disclosure of which is totally incorporated herein by reference, discloses an ink composition which comprises an aqueous liquid vehicle, a photochromic material, and a vesicle-forming lipid, wherein vesicles of the lipid are present in the ink.

Copending application U.S. Ser. No. 08/567,456, now U.S. Pat. No. 5,551,973, filed concurrently herewith, entitled "Photochromic Microemulsion Ink Compositions," with the named inventors John F. Oliver, Trevor I. Martin, Carol A. Jennings, Eric G. Johnson, and Marcel P. Breton, the disclosure of which is totally incorporated herein by reference, discloses an ink composition which comprises an aqueous phase, an oil phase, a photochromic material, and a surfactant, said ink exhibiting a liquid crystalline gel phase at a first temperature and a liquid microemulsion phase at a second temperature higher than the first temperature.

Copending application U.S. Ser. No. 08/567,589, filed concurrently herewith, entitled "Photochromic Electrostatic Toner Compositions," with the named inventors Trevor I. Martin, Carol A. Jennings, Eric G. Johnson, and John F. Oliver, the disclosure of which is totally incorporated herein by reference, discloses a toner composition for the development of electrostatic latent images which comprises particles comprising a mixture of a resin and a photochromic material. Another embodiment of the invention is directed to a liquid developer composition for the development of electrostatic latent images which comprises a nonaqueous liquid vehicle and a photochromic material, wherein the liquid developer has a resistivity of from about $10^8$ to about $10^{11}$ ohm-cm and a viscosity of from about 25 to about 500 centipoise. Yet another embodiment of the invention is directed to a liquid developer composition for the development of electrostatic latent images which comprises a nonaqueous liquid vehicle, a charge control agent, and toner particles comprising a mixture of a resin and a photochromic material.

The present invention is directed to hot melt ink compositions suitable for ink jet printing. In one embodiment, the inks are particularly suitable for thermal ink jet printing. A need exists for hot melt inks that result in images needing no further fixing or fusing treatment, such as drying or heating. There is also a need for hot melt inks with photochromic characteristics. In addition, there is a need for processes for preparing documents with images having photochromic characteristics. Further, there is a need for processes and materials which enable the placement of encoded information on documents which is not detectable to the reader but which is machine readable.

SUMMARY OF THE INVENTION

It is an object of the present invention to provide ink compositions with the above advantages.

It is another object of the present invention to provide hot melt ink compositions suitable for ink jet printing.

It is yet another object of the present invention to provide hot melt ink compositions particularly suitable for thermal ink jet printing.

It is still another object of the present invention to provide hot melt inks that result in images needing no further fixing or fusing treatment, such as drying or heating.

Another object of the present invention is to provide hot melt inks with photochromic characteristics.

Yet another object of the present invention is to provide processes for preparing documents with images having photochromic characteristics.

Still another object of the present invention is to provide processes and materials which enable the placement of encoded information on documents which is not detectable to the reader but which is machine readable.

These and other objects of the present invention (or specific embodiments thereof) can be achieved by providing an ink composition which comprises (a) an ink vehicle, said ink vehicle being a solid at about 25° C. and having a viscosity of from about 1 to about 20 centipoise at a temperature suitable for hot melt ink jet printing, said temperature being greater than about 45° C., (b) a photochromic material, (c) an optional colorant, and (d) an optional propellant.

DETAILED DESCRIPTION OF THE INVENTION

The ink compositions of the present invention comprise an ink vehicle, said ink vehicle being a solid at about 25° C. and having a viscosity of from about 1 to about 20 centipoise at a temperature suitable for hot melt ink jet printing, said temperature being greater than about 45° C., a photochromic material, and an optional propellant. Ideally, the inks melt at temperatures above about 70° C. and have viscosities of from about 1 to about 15 centipoise at the jetting temperature. Further, it is desirable that the finished prints be able to survive severe storage conditions without melting or exhibiting offset.

Any suitable ink vehicle with the above characteristics can be employed. Examples of suitable ink vehicles include (A) ethylene/propylene copolymers,-such as those available from Petrolite Corporation Polymers Division Headquarters, Tulsa, Okla. and of the general formula

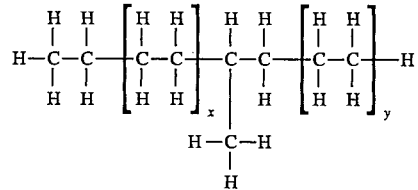

wherein y is an integer of from 0 to about 10 and x=21-y, said materials typically having a melting point of from about 96 to about 112° C. and a molecular weight range of from about 500 to about 2,000, such as Petrolite® CP-7 ($M_n$= 650), Petrolite®CP-11 ($M_n$=1,10)0, Petrolite®CP-12 ($M_n$= 1.200). and the like; (B) urethane derivatives of oxidized synthetic or petroleum waxes, such as those available from Petrolire Corporation Polymers Division Headquarters, Tulsa, Okla. and of the general formulae

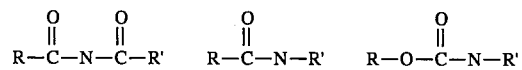

wherein R is an alkyl group of the formula $CH_3(CH_2)n$ wherein n is an integer of from about 20 to about 200 and R' is a tolyl group, said materials typically having a melting point of from about 74° to about 83° C., such as Petrolite®CA-11 ($M_n$=790, $M_w/M_n$=2.2), Petrolite®WB-5 ($M_n$=650, $M_w/M_n$=1.7), Petrolite®WB-17 ($M_n$=730, $M_w/M_n$=1.8), and the like; (C) n-paraffinic, branched paraffinic, and naphthenic hydrocarbons, typically with from about 30 to about 60 carbon atoms, generally prepared by the refinement of naturally occuring hydrocarbons, such as BE SQUARE 185 and BE SQUARE 195, with molecular weights of from about 600 to about 750, available from Petrolite; (D) highly branched hydrocarbons, typically prepared by olefin polymerization, such as the VYBAR® materials available from Petrolite, including Vybar® 253 ($M_n$=520), Vybar® 5013 ($M_n$=420), and the like; (E) ethoxylated alcohols, such as those available from Petrolite and of the general formula

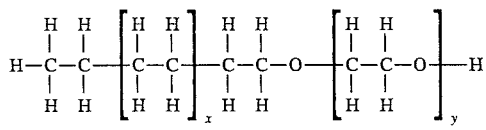

wherein x is an integer of from about 11 to about 24 and y is an integer of from about 1 to about 40, said materials typically having a melting point of from about 85° to about 106° C. and a molecular weight range of from about to about 2,500, such as Unithox® 420 ($M_n$=560), Unithox® 450 ($M_n$=900), Unithox® 480 ($M_n$=2,250), Unithox® 520 ($M_n$=700), Unithox® 550 ($M_n$=1,100), Unithox® 720 ($M_n$=875), Unithox® 750 ($M_n$=1,400), and the like; (F) high molecular weight linear alcohols, such as those available from Petrolite and of the general formula

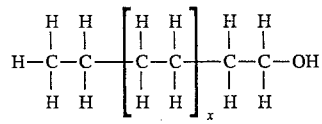

wherein x is an integer of from about 11 to about 23, said materials typically having a melting point of from about 78° to about 106° C. and a molecular weight range of from about 300 to about 1,000, such as Unilin® ($M_n$=375), Unilin® 425 ($M_n$=460), Unilin® 550 ($M_n$=550), Unilin® 700 ($M_n$=700), and the like; (G) hydrocarbon-based waxes, such as the homopolymers of polyethylene available from Petrolire and of the general formula

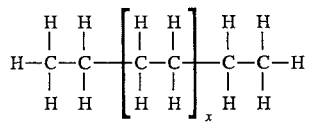

wherein x is an integer of from about 12 to about 105, said materials typically having a melting point of from about 88° to about 129° C. and a molecular weight of from about 400 to about 3,000, such as Polywax®500 ($M_n$=500), Polywax® 655 ($M_n$=655), Polywax® 850 ($M_n$=850), Polywax® 1000 ($M_n$=1,000), and the like; (H) modified maleic anhydride hydrocarbon adducts of polyolefins prepared by graft copolymerization, such as those available from Petrolite and of the general formulae

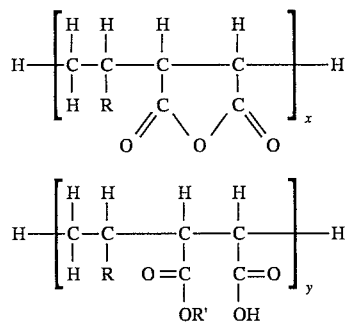

wherein R is an alkyl group with from about 6 to about 28 carbon atoms, R' is an ethyl group, a propyl group, an isopropyl group, a butyl group, an isobutyl group, or an alkyl group with from about 20 to about 200 carbon atoms, x is an integer of from about 9 to about 13, and y is an integer of from about 9 to about 13, said materials typically having melting points of about 77° C., those available from Petrolite and of the general formula

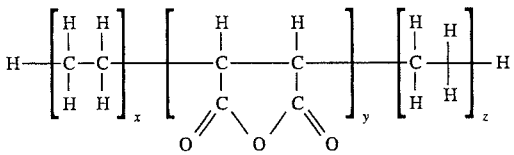

wherein R is an alkyl group with from about 6 to about 28 carbon atoms, x is an integer of from about 9 to about 13, y is 1 or 2, and z is an integer of from about 9 to about 13, and those available from Petrolite and of the general formula

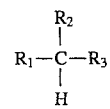

wherein $R_1$ and $R_3$ are hydrocarbon groups and $R_2$ is either of one of the general formulae

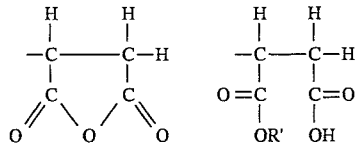

or a mixture thereof, wherein R' is an isopropyl group, said materials typically having melting points of from about 97° to about 121° C., with examples of modified maleic anhydride copolymers including Ceramer®67 ($M_n$=655, $M_w/M_n$=1.1), Ceramer®1608 ($M_n$=700, $M_w/M_n$=1.7), and the like; (I) mixtures of monoamides and tetraamides, such as, for example, a mixture of stearyl stearamide (available from Witco Chemical Co. as Kemamides) and dimer acid tetraamide (available from Union Camp Corp. as Unirez X37-523-235) and the like; and any other suitable material, as well as mixtures thereof. Preferred ink vehicles are highly amorphous in nature, i.e., exhibit minimum free volume, to ensure that the resulting images possess high optical transmission, hue, and chroma and to circumvent void formation in the printhead during liquid-solid phase transformation.

Additional examples of suitable ink vehicles for the hot melt inks of the present invention, present in any effective amount, generally from about 1 to about 99 percent by weight of the ink and preferably from about 90 to about 95 percent by weight of the ink, include rosin esters; polyamides; dimer acid amides; fatty acid amides, including Aramid C, available from Azko Chemie, Chicago, Ill.; epoxy resins, such as Epotuf 37001, available from Riechold Chemical Company; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides, including Ketjenflex MH and Ketjenflex MS80, available from Azko Chemie, Chicago, Ill.; benzoate esters, such as Benzoflex S552, available from Velsicol Chemical Company, Chicago, Ill.; phthalate plasticizers; citrate plasticizers; maleate plasticizers; sulfones, such as diphenyl sulfone, n-decyl sulfone, n-amyl sulfone, chlorophenyl methyl sulfone; polyvinyl pyrrolidinone copolymers; polyvinyl pyrrolidone/polyvinyl acetate copolymers; novalac resins, such as Durez 12 686, available from Occidental Chemical Company, Buffalo, N.Y.; and natural product waxes, such as beeswax, monton wax, candelilla wax, Gilsonite (American Gilsonite Company), and the like. Other ink vehicles include mixtures of linear primary alcohols with linear long chain amides or fatty acid amides, such as those with from about 6 to about 24 carbon atoms, including Paricin 9 (propylene glycol monohydroxystearate), Paricin 13 (glycerol monohydroxystearate), Paricin 15 (ethylene glycol monohydroxystearate), Paricin 220 (N(2-hydroxyethyl)-12-hydroxystearamide), Paricin 285 (N,N'-ethylene-bis-12-hydroxystearamide), Flexricin 185 (N,N'-ethylene-bis-ricinoleamide), and the like, all available from CasChem Company, Bayonne, N.J.; Kemnamide B (behenamide/arachidamide), Kemamide W40 (N,N'-ethylenebisstearamide), Kemamide P181 (oleyl palmitamide), Kemamide S (stearamide), Kemamide U (oleamide), Kemamide E (erucamide), Kemamide O (oleamide), Kemamide W45 (N,N'-thylenebisstearamide), Kenamide W20 (N,N'-ethylenebisoleamide), Kemamide E180 (stearyl erucamide), Kemamide E221 (erucyl erucamide), Kemamide S180 (stearyl stearamide), Kemamide S221 (erucyl stearamide), and the like, all available from Humko Chemical Company, Memphis, Tenn. Further, linear long chain sulfones with from about 4 to about 16 carbon atoms, such as n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecyl sulfone, n-hexadecyl sulfone, and the like, are suitable ink vehicle materials. The ink vehicle may comprise one or more of the aforementioned suitable materials.

Also suitable as ink vehicles are liquid crystalline materials as disclosed in, for example, U.S. Pat. No. 5,122,187, the disclosure of which is totally incorporated herein by reference.

Typical ink vehicles for the hot melt inks of the present invention generally have melting points of from about 60° to about 150° C., and preferably from about 80° to about 120° C., as determined by observation and measurement on a microscope hot stage, wherein the binder material is heated on a glass slide and observed by microscope. Higher melting points are acceptable, although printhead life may be reduced at these temperatures. In addition, the surface tension of the binder at the operating temperature of the ink should be from about 20 to about 65 dynes per centimeter, and preferably from about 40 to about 65 dynes per centimeter to enhance refill rates, paper wetting, and color mixing. Operating temperatures of the inks of the present invention are generally from about 60° to about 150° C. Higher temperatures are acceptable, although they may reduce the lifetime of the heater and printhead. Generally, the operating temperature is selected to obtain low ink viscosity while avoiding extensive fuming or smoking. The viscosity of the binder at the operating temperature of the ink is generally from about 1 to about 20 centipoise, and preferably from about 1 to about 5 centipoise to enhance refilling of the jets, jettability, and substrate penetration. For inks intended for use in thermal ink jet printing processes, the ink vehicle should also be thermally stable in its molten state so that it does not undergo decomposition to yield gaseous products or to form heater deposits. Additionally, the ink vehicle should enable printed images with sufficient flexibility to prevent cracking or creasing. Additional information regarding the optimal characteristics of a hot melt ink are disclosed in, for example, Titterington and Jaegar (Tektronix), "Design Parameters for a Phase Chang Ink Jet Ink," IS&TS Eighth International Congress on Non-Impact Printing Technologies, p. 295 (1992), the disclosure of which is totally incorporated herein by reference.

Examples of suitable photochromic materials include compounds that undergo heterolytic cleavage, such as spiropyrans and related compounds, and the like; compounds that undergo homolyric cleavage, such as bis-imidazole compounds, bis-tetraphenylpyrrole, hydrazine compounds, aryl disulfide compounds, and the like; compounds that undergo cis-trans isomerization, such as stilbene compounds, photoisomerizable azo compounds, and the like; compounds that undergo photochromic tautomerism, including those that undergo hydrogen transfer phototautomerism, those that undergo photochromic valence tautomerism, and the like; and others.

More specifically, examples include spiropyrans, of the general formula

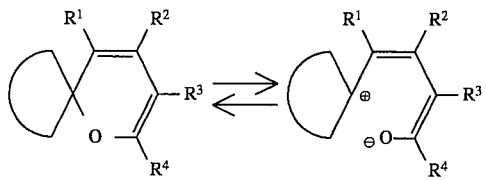

wherein $R^1$, $R^2$, $R^3$, and $R^4$ each, independently of the others, can be (but are not limited to) hydrogen, alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 20 carbon atoms and more preferably with from 1 to about 10 carbon atoms, aryloxy groups, preferably with from about 5 to about 20 carbon atoms and more preferably with from about 5 to about 10 carbon atoms, alkylthio groups, preferably with from 1 to about 20 carbon atoms and more preferably with from 1 to about 10 carbon atoms, arylthio groups, preferably with from about 5 to about 20 carbon atoms and more preferably with from about 5 to about 10 carbon atoms, aidehyde groups, ketone groups, ester groups, amide groups, carboxylic acid groups, sulfonic acid groups, and the like. Further, two or more R groups can be joined together to form a ring.

Also suitable are spirooxazines, of the general formula

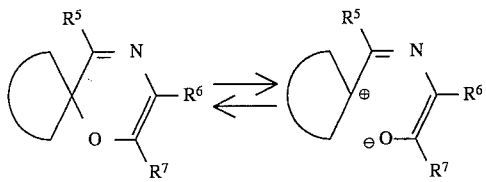

wherein $R^5$, $R^6$, and $R^7$ each, independently of the others, can be (but are not limited to) hydrogen, alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 20 carbon atoms and more preferably with from 1 to about 10 carbon atoms, aryloxy groups, preferably with from about 5 to about 20 carbon atoms and more preferably with from about 5 to about 10 carbon atoms, alkylthio groups, preferably with from 1 to about 20 carbon atoms and more preferably with from 1 to about 10 carbon atoms, arylthio groups, preferably with from about 5 to about 20 carbon atoms and more preferably with from about 5 to about 10 carbon atoms, aldehyde groups, ketone groups, ester groups, amide groups, carboxylic acid groups, sulfonic acid groups, and the like. Further, two or more R groups can be joined together to form a ring.

Also suitable are spirothiopyrans, of the general formula

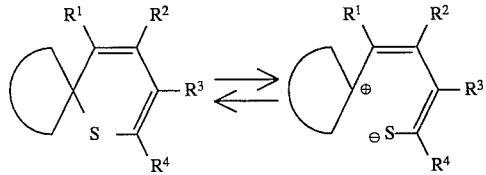

wherein $R^1$, $R^2$, $R^3$, and $R^4$ each, independently of the others, can be (but are not limited to) hydrogen, alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 20 carbon atoms and more preferably with from 1 to about 10 carbon atoms, aryloxy groups, preferably with from about 5 to about 30 carbon atoms and more preferably with from about 5 to about 20 carbon atoms, alkylthio groups, preferably with from 1 to about 20 carbon atoms and more preferably with from 1 to about 10 carbon atoms, arylthio groups, preferably with from about 5 to about 20 carbon atoms and more preferably with from about 5 to about 10 carbon atoms, aldehyde groups, ketone groups, ester groups, amide groups, carboxylic acid groups, sulfonic acid groups, and the like. Further, two or more R groups can be joined together to form a ring.

Examples of spiropyrans include spiro[2H-1-benzopyran-2,2'-indolines], including those of the general formula

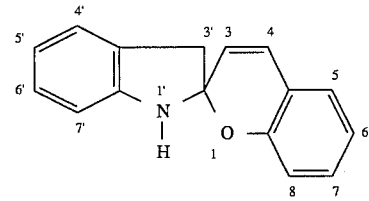

wherein substituents can be present on one or more of the 1',3',4',5',6', 7', 3, 4, 5, 6, 7, and 8 positions, spiroindolinonaphthopyrans, including those of the general formula

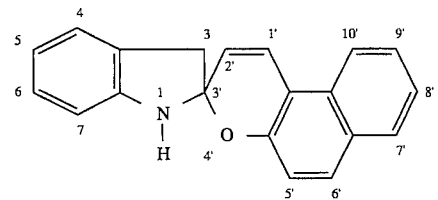

wherein substituents can be present on one or more of the 1, 3, 4, 5, 6, 7, 1', 2', 5', 6', 7', 8', 9', or 10' positions, spiro[2H-1-benzopyran-2,2'benzothiazolines], including those of the general formula

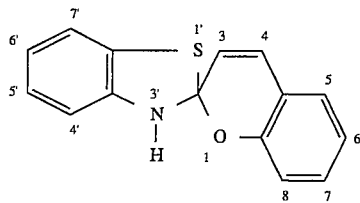

wherein substituents can be present on one or more of the 1',3',4',5',6', 7', 3, 4, 5, 6, 7, and 8 positions, spiro[2H-1-benzopyran-2,2'-benzoxazolines], including those of the general formula

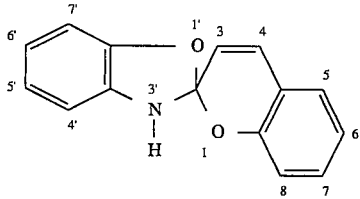

wherein substituents can be present on one or more of the 1', 3', 4', 5', 6', 7', 3, 4, 5, 6, 7, and 8 positions, spiropyranopyrans, including those of the general formula

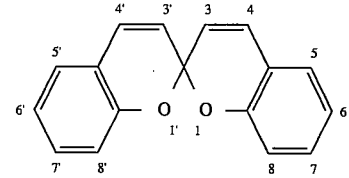

wherein substituents can be present on one or more of the 3, 4, 5, 6, 7, 8, 3', 4',5',6',7', and 8' positions, aza-spiroindolinopyrans, including those of the general formula

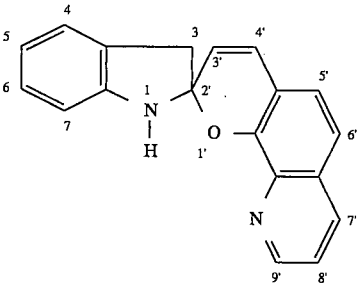

wherein substituents can be present on one or more of the 3, 4, 5, 6, 7, 3', 4', 5', 6', 7', 8', and 9' positions, spiro(quinolinopyrans), including those of the general formula

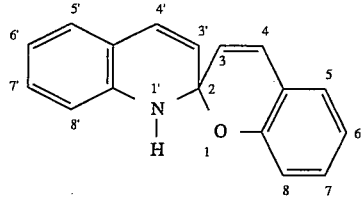

wherein substituents can be present on one or more of the 3, 4, 5, 6, 7, 8, 3', 4', 5', 6', 7', and 8' positions, spiro(pyridino pyrans), including those of the general formula

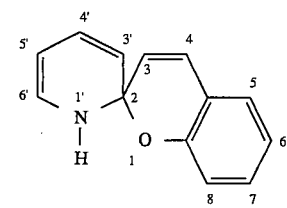

wherein substituents can be present on one or more of the 3, 4, 5, 6, 7, 8, 3', 4', 5', and 6' positions, and the like.

Examples of spirooxazines include spiro[indoline-2,3'-[3H]-naphtho[2,1-b]-1,4-oxazines], including those of the general formula

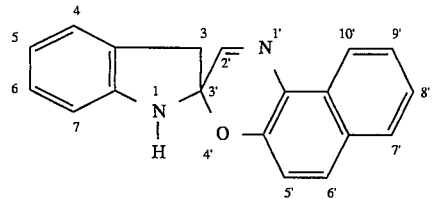

wherein substituents can be present on one or more of the 1, 3, 4, 5, 6, 7, 1', 2', 5', 6', 7', 8', 9', or 10' positions, spiro[2H-1,4-benzoxazine-2,2'-indolines including those of the general formula

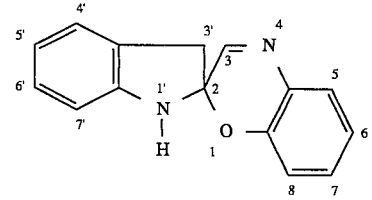

wherein substituents can be present on one or more of the 3, 5, 6, 7, 8, 1', 3', 4', 5', 6', and 7' positions, and the like.

Examples of spirothiopyrans include spiro[2H-1-benzothiopyran-2,2'-indolines], including those of the general formula

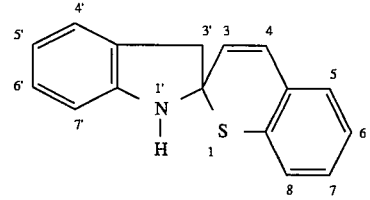

wherein substituents can be present on one or more of the 1', 3', 4', 5', 6', 7', 3, 4, 5, 6, 7, and 8 positions, and the like.

In all of the above examples of spiropyrans, spirooxazines, and spirothiopyrans, examples of substituents include (but are not limited to) alkyl, including cyclic alkyl groups, such as cyclopropyl, cyclohexyl, and the like, and including unsaturated alkyl groups, such as vinyl ($H_2C$=CH—), allyl ($H_2C$=CH—$CH_2$—), propynyl (HC≡C—$CH_2$—), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aidehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 30 carbon atoms and more preferably with from 1 to about 20 carbon atoms, arylthio groups, preferably with from about 5 to about 30 carbon atoms and more preferably with from about 5 to about 20 carbon atoms, aidehyde groups, ketone groups, ester groups, amide groups, carboxylic acid groups, sulfonic acid groups, and the like. Further, two or more substituents can be joined together to form a ring.

Substituents on the left ring of the spiropyrans, spirooxazines, and spirothiopyrans (represented by the loop in the generic structural formulae of these materials) can be adjusted to affect the color of the open form of the material. Substituents on the central moiety of the spiropyrans, spirooxazines, and spirothiopyrans or on alkyl or aryl groups attached thereto also affect the color of the open form of the material, although to a lesser degree than substituents on the left ring. Further, when the left ring contains a nitrogen atom, this atom or other .atoms can be substituted to affect the solubility of the compound in various liquids and resins. For example, long chain hydrocarbons, such as those with 16 or 18 carbon atoms, can increase solubility in hydrocarbons. Sulfonate and carboxylate groups, for example, can enhance water solubility.

Specific examples of spiropyrans, spirooxazines, and spirothiopyrans include spiro[2H-1-benzopyran-2,2'-indoline]; 8-acetoxymercuri-6-nitro-1',3',3'-trimethylspiro[2H-1-benzopyran-2,2'-indoline]; 6-acetyl-1',3',3'-trimethylspiro[2H-1-benzopyran-2,2'-indoline]; 8-allyl-5'-chloro-6-nitro-1',3',3'-trimethylspiro[2H-1-benzopyran-2,2'-indoline]; 8-allyl-3',3'-dimethyl-6'-nitro-1'-phenyispiro[2H-1-benzopyran-2,2'-indoline]; 8-allyl-6-nitro-1',3,3',3'-tetramethylspiro[2H-1-benzopyran-2,2'-indoline]; 8-allyl-6-nitro-1',3',3'-trimethylspiro[2H-1-benzopyran-2,2'-indoline]; 8-allyl-1',3',3'-trimethylspiro[2H-1-benzopyran-2,2'-indoline]; 5'-amino-5,7-dichloro-6-nitro-1',3',3'-trimethylspiro[2H-1-benzopyran-2,2'-indoline]; 6-amino-7-hydroxy-1',3',3'-trimethylspiro[2H-1-benzopyran-2,2'-indoline]; 5'-amino-8-methoxy-6-nitro-1',3',3'-trimethylspiro[2H-1-benzopyran-2,2'-indoline]; 5-amino-8-methoxy-1',3',3'-trimethylspiro[2H-1-benzopyran-2,2'-indoline]; 5'-amino-8-methoxy-1',3',3'-trimethylspiro[2H-1-benzopyran-2,2'-indoline]; 5'-amino-6-nitro-1',3',3'-trimethylspirol2H-1-benzopyran-2,2'-indoline]; 5'-amino-1',3',3'-trimethylspiro[2H-1-benzopyran-2,2'-indoline]; 6-amino-1',3',3'-trimethylspiro[2H-1-benzopyran-2,2'-indoline]; 8-amino-1', 3',3'-trimethylspiro[2H-1-benzopyran-2,2'-indoline]; 1'-amyl-5-bromo-3',3'-dimethyl-8-methoxy-6-nitrospiro[2H-1-benzopyran-2,2'-indoline]; 1'-amyl-3',3'-dimethyl-8-methoxyspiro[2H-1-benzopyran-2,2'-indoline]; 1'-amyl-3', 3-dimethyl-6-methoxy-8-nitrospiro[2H-1-benzopyran-2,2'-indoline]; 1'-amyl-3',3-dimethyl-5',6-dinitro-8-methoxyspiro[2H-1-benzopyran-2,2'-indoline]; 1'-amyl-3', 3-dimethyl-8-methoxy-5,5',6-trinitrospiro[2H-1-benzopyran-2,2'-indoline]; 1'-amyl-3,3'-dimethyl-6-nitrospiro[2H-1-benzopyran-2,2'-indoline]; 6-bromo-1'-butyl-3',3'-dimethylspiro[2H-1-benzopyran-2,2'-indoline]; 8-bromo-1'-butyl-3',3'-dimethyl-6-nitrospiro[2H-1-benzopyran-2,2'-indoline]; 8-bromo-5'-chloro-5,7-dimethoxy-6-nitro-1',3',3'-trimethylspiro[2H-1-benzopyran-2,2'-indoline]; 8-bromo-5'-chloro-7-hydroxy-1',3',3'-trimethylspiro[2H-1-benzopyran-2,2'-indoline]; 5-bromo-5'-chloro-8-methoxy-1',3',3'-trimethylspiro[2H-1-benzopyran-2,2'-indoline]; 6-bromo-5'-chloro-8-methoxy-1',3',3'-trimethylspirol[2H-1-benzopyran-2,2'-indoline]; 5-bromo-6'-chloro-8-methoxy-6-nitro-1',3',3',7'-tetramethylspiro[2H-1-benzopyran-2,2'-indoline]; 5-bromo-5'-chloro-6-methoxy-8-nitro-1',3',3'-trimethylspiro[2H, 1-benzopyran-2,2'-indoline]; 5-bromo-5'-chloro-8-methoxy-6-nitro-1',3', 3'-trimethylspiro[2H-1-benzopyran-2,2'-indoline]; 5-bromo-7'-chloro-8-methoxy-6-nitro-1',3',3'-trimethylspiro[2H-1-benzopyran,2,2'-indoline]; 6-bromo-5'-chloro-8-nitro-1',3',3'-trimethylspiro[2H-1-benzopyran-2,2'-indoline]; 8-bromo-5'-chloro-6-nitro-1',3',3'-trimethylspiro[2H-1-benzopyran-2,2'-indoline]; 5-bromo-4',6-dichloro-8-methoxy-6-nitro-1',3',3'-trimethylspiro[2H-1-benzopyran-2,2'-indoline]; 5-bromo-4',7'-dichloro-8-methoxy-6-nitro-1',3',3'-trimethylspiro[2H-1-benzopyran-2,2'-indoline]; 5-bromo-5', 7'-dichloro-8-methoxy-6-nitro-1',3',3'-trimethylspiro[2H-1-benzopyran-2,2'-indoline]; 6-bromo-5'-chloro-1',3',3'-trimethylspiro[2H-1-benzopyran-2,2'-indoline]; 5-bromo-3', 3'-diethyl-8-methoxy-1'-methyl-6-nitrospiro[2H-1-benzopyran-2,2'-indoline]; 5-bromo-5',8-dimethoxy-6-nitro-1',3',3'-trimethylspiro[2H-1-benzopyran-2,2'-indoline]; 5-bromo-7',8-dimethoxy-6-nitro-1',3',3'-trimethylspiro[2H-1-benzopyran-2,2'-indoline]; 6-bromo-5', 8-dimethoxy-1',3',3'-trimethylspiro[2H-1-benzopyran-2,2'-indoline]; 6-bromo-3',3'-dimethyl-1'-ethylspiro[2H-1-benzopyran-2,2'-indoline]; 6-bromo-3',3'-dimethyl-1'-ethyl-8-methoxyspiro[2H-1-benzopyran-2,2'-indoline]; 5-bromo-1',3'-dimethyl-3'-ethyl-6-methoxy-8-nitrospiro[2H-1-benzopyran-2,2'-indoline]; 5-bromo-1',3'-dimethyl-3'-ethyl-8-methoxy-6-nitrospiro[2H-1-benzopyran-2,2'-indoline]; 8-bromo-3',3'-dimethyl-1'-ethyl-6-nitrospiro[2H-1-benzopyran-2,2'-indoline]; 5-bromo-3',3'-dimethyl-1'-isoamyl-8-methoxy-6-nitrospiro[2H-1-benzopyran-2,2'-indoline]; 5-bromo-1',3'-dimethyl-6-methoxy-8-nitro-3'-phenylspiro[2H-1-benzopyran-2,2'-indoline]; 5-bromo-1',3'-dimethyl-8-methoxy-6-nitro-3'-phenylspiro[2H-1-benzopyran-2,2'-indoline]; 5-bromo-3',3'-dimethyl-6-methoxy-8-nitro-1'-phenylspiro[2H-1-benzopyran-2,2'-indoline]; 5-bromo-3', 3'-dimethyl-8-methoxy-6-nitro-1'-phenylspiro[2H-1-benzopyran-2,2'-indoline]; 8-bromo-3',3'-dimethyl-6-nitro-1'-propylspiro[2H-1-benzopyran-2,2'-indoline]; 6-bromo-3', 3'-dimethyl-1'-propylspiro[2H-1-benzopyran-2,2'-indoline]; 5-bromo-1'-dimethylamino-8-methoxy-3'-methyl-6-nitro-3'-phenylspiro[2H-1-benzopyran-2,2'-indoline]; 5-bromo-5',6-dinitro-8-methoxy-1',3',3'-trimethylspiro[2H-1-benzopyran-2,2'-indoline]; 5-bromo-3',3'-diphenyl-8-methoxy-1'-methyl-6-nitrospiro[2H-1-benzopyran-2,2'-indoline]; 5-bromo-4',6'-diphenyl-8-methoxy-6-nitro-1',3',3'-trimethylspiro[2H-1-benzopyran-2,2'-indoline]; 5-bromo-4'-fluoro-8-methoxy-6-nitro-1',3',3'-trimethylspiro[2H-1-benzopyran- 2,2'-indoline]; 5-bromo-5'-fluoro-8-methoxy-6-nitro-1',3', 3'-trimethylspiro[2H-1-benzopyran-2,2'-indoline]; 8-bromo- 7-hydroxy-1',3',3'-trimethylspiro[2H-1-benzopyran-2,2'-indoline]; 5-bromo-8-methoxy-6-nitro-1',3',3',4',7'-pentamethylspiro[2H-1-benzopyran-2,2'-indoline]; 5-bromo-8-methoxy-6-nitro-1',3',3',5',7'-pentamethylspiro[2H-1-benzopyran-2,2'-indoline]; 5-bromo-6-methoxy-8-nitro-5'-phenyl-1',3',3'-trimethylspiro[2H-1-benzopyran-2,2'-indoline]; 5-bromo-6-methoxy-8-nitro-7'-phenyl-1',3',3'-trimethylspiro[2H-1-benzopyran-2,2'-indoline]; 5-bromo-8-methoxy-6-nitro-5'-phenyl-1',3',3'-trimethylspiro[2H-1-benzopyran-2,2'-indoline]; 5-bromo-8-methoxy-6-nitro-7'-phenyl-1',3',3'-trimethylspiro[2H-1-benzopyran-2,2'-indoline]; 5-bromo-8-methoxy-6-nitro-1',3,3',3'-tetramethylspiro[2H-1-benzopyran-2,2'-indoline]; 5-bromo-8-methoxy-6-nitro-1',3',3',5'-tetramethylspiro[2H-1-benzopyran-2,2'-indoline]; 5-bromo-8-methoxy-6-nitro-1',3 ',3',6'-tetramethylspiro[2H-1-benzopyran-2,2'-indoline]; 5-bromo-8-methoxy-6-nitro-1',3',3',7'-tetramethylspiro[2H-1-benzopyran-2,2'-indoline]; 5-bromo-6-methoxy-8-nitro-1',3',3'-trimethylspiro[2H-1-benzopyran-2,2'-indoline]; 5'-bromo-6-methoxy-8-nitro-1',3',3'-trimethylspiro[2H-1-benzopyran-2,2'-indoline]; 5-bromo-8-methoxy-6-nitro-1',3',3'-trimethylspiro[2H-1-benzopyran-2,2'-indoline]; 5'-bromo-8-methoxy-6-nitro-1',3',3'-trimethylspiro[2H-1-benzopyran-2,2'-indoline]; 6-bromo-8-methoxy-5-nitro-1',3',3'-trimethylspiro[2H-1-benzopyran-2,2'-indoline]; 5-bromo-8-methoxy-6-nitro-1',3',3'-trimethyl-4',6',7'-triphenylspiro[2H-1-benzopyran-2,2'-indoline]; 5-bromo-8-methoxy-1',3',3'-trimethylspiro[2H-1-benzopyran-2,2'-indoline]; 6-bromo-5'-methoxy-1',3',3'-trimethylspiro[2H-1-benzopyran-2,2'-indoline]; 6-bromo-8-methoxy-1',3',3'-trimethylspiro[2H-1-benzopyran-2,2'-indoline]; 6-bromo-8-nitro-1',3,3',3'-tetramethylspiro[2H-1-benzopyran-2,2'-indoline]; 8-bromo-6-nitro-1',3,3',3'-tetramethylspiro[2H-1-benzopyran-2,2'-indoline]; 5-bromo-6-nitro-4',6',8-trimethoxy-1',3', 3'-trimethylspiro[2H-1-benzopyran-2,2'-indoline]; 5-bromo-6-nitro-4',7',8-trimethoxy-1',3',3'-trimethylspiro[2H-1-benzopyran-2,2'-indoline]; 5-bromo-6-nitro-1',3',3'-trimethylspiro[2H-1-benzopyran-2,2'-indoline]; 5'-bromo-6-nitro-1',3',3'-trimethylspiro[2H-1-benzopyran-2,2'-indoline]; 6-bromo-8-nitro-1',3',3'-trimethylspiro[2H-1-benzopyran-2,2'-indoline]; 8-bromo-6-nitro-1',3',3'-trimethylspiro[2H-1-benzopyran-2,2'-indoline]; 6-bromo-5'-nitro-1',3',3'-trimethylspiro[2H-1-benzopyran- 2,2'-indoline]; 6-bromo-1',3',3'-trimethylspiro[2H-1-benzopyran-2,2'-indoline]; 1'-butyl-6-chloro-3',3'-dimethyl-8-methoxyspiro[2H-1-benzopyran-2,2'-indoline]; 1'-butyl-3',3'-dimethylspiro[2H-1-benzopyran-2,2'-indoline]; 1'-butyl-3',3'-dimethyl-6,8-dinitrospiro[2H-1-benzopyran-2,2'-indoline]; 1'-butyl-3',3'-dimethyl-8-methoxyspiro[2H-1-benzopyran-2,2'-indoline]; 8-carbomethoxy-5'-chloro-1',3',3'-trimethylspiro[2H-1-benzopyran-2,2'-indoline]; 5'-carbomethoxy-6-nitro-1',3',3'-trimethylspiro[2H-1-benzopyran-2,2'-indoline]; 8-carbomethoxy-6-nitro-1',3',3'-trimethylspiro[2H-1-benzopyran-2,2'-indoline]; 6-carbomethoxy-1',3',3'-trimethylspiro[2H-1-benzopyran-2,2'-indoline]; 8-carbomethoxy-1',3',3'-trimethylspiro[2H-1-benzopyran-2,2'-indoline]; 6-carboxy-8-methoxy-1',3',3'-trimethylspiro[2H-1-benzopyran-2,2'-indoline]; 5'-carboxy-6-nitro-1',3',3'-trimethylspiro[2H-1-benzopyran-2,2'-indoline]; 6-carboxy-1',3',3'-trimethylspiro[2H-1-benzopyran-2,2'-indoline]; 7-carboxy-1',3',3'-trimethylspiro[2H-1-benzopyran-2,2'-indoline]; 8-carboxy-1',3',3'-trimethylspiro[2H-1-benzopyran-2,2'-indoline]; 5'-chloro-6, 8-dibromo-1',3',3'-trimethylspiro[2H-1-benzopyran-2,2'-indoline]; 6'-chloro-5,7-dimethoxy-6-nitro-1',3',3',7'-tetramethylspiro[2H-1-benzopyran-2,2'-indoline]; 5'-chloro-5,7-dimethoxy-6-nitro-1',3',3'-trimethylspiro[2H-1-benzopyran-2,2'-indoline]; 5'-chloro-7,8-dimethoxy-6-nitro-1',3',3'-trimethylspiro[2H-1-benzopyran-2,2'-indoline]; 7'-chloro-5,7-dimethoxy-6-nitro-1',3',3'-trimethylspiro[2H-1-benzopyran-2,2'-indoline]; 5'-chloro-5,7-dimethoxy-1',3', 3'-trimethylspiro[2H-1-benzopyran-2,2'-indoline]; 6-chloro-5',8-dimethoxy-1',3',3'-trimethylspiro[2H-1-benzopyran-2, 2'-indoline]; 6-chloro-7',8-dimethoxy-1',3',3'-trimethylspiro[2H-1-benzopyran-2,2'-indoline]; 6-chloro-3',3'-dimethyl-1'-ethyl-8-methoxyspiro[2H-1-benzopyran-2,2'-indoline]; 5-chloro-1',3'-dimethyl-8-methoxy-6-nitro-3'-phenylspiro[2H-1-benzopyran-2,2'-indoline]; 6-chloro-3',3'-dimethyl-8-methoxy-1'-phenylspiro[2H-1-benzopyran-2,2'-indoline]; 6-chloro-3',3'-dimethyl-8-nitro-1'-phenylspiro[2H-1-benzopyran-2,2'-indoline]; 5'-chloro-5,6-dinitro-8-methoxy-1', 3',3'-trimethylspiro[2H-1-benzopyran-2,2'-indoline]; 5'-chloro-6,6'-dinitro-8-methoxy-1',3',3'-trimethylspiro[2H-1-benzopyran-2,2'-indoline]; 5'-chloro-6,8-dinitro-7-methoxy-1',3',3'-trimethylspiro[2H-1-benzopyran- 2,2'-indoline]; 7'-chloro-5,6-dinitro-8-methoxy-1',3',3'-trimethylspiro[2H-1-benzopyran-2,2'-indoline]; 5'-chloro-6,6'-dinitro-1',3',3'-trimethylspiro[2H-1-benzopyran-2,2'-indoline]; 5'-chloro-6, 8-dinitro-1',3',3'-trimethylspiro[2H-1-benzopyran-2,2'-indoline]; 6-chloro-5',8-dinitro-1',3',3'-trimethylspiro[2H-1-benzopyran-2,2'-indoline]; 5'-chloro-7-ethoxy-6-nitro-1',3', 3'-trimethylspiro[2H-1-benzopyran-2,2'-indoline]; 5-chloro-8-ethoxy-6-nitro-1',3',3'-trimethylspiro[2H-1-benzopyran-2, 2'-indoline]; 5'-chloro-8-ethoxy-6-nitro-1',3',3'-trimethylspiro[2H-1-benzopyran-2,2'-indoline]; 5'-chloro-8-ethoxy-1',3',3'-trimethylspiro[2H-1-benzopyran-2,2'-indoline]; 6-chloro-8-ethoxy-1',3',3'-trimethylspiro[2H-1-benzopyran-2,2'-indoline]; 5'-chloro-8-fluoro-6-nitro-1',3', 3'-trimethylspiro[2H-1-benzopyran-2,2'-indoline]; 5'-chloro-8-fluoro-1',3',3'-trimethylspiro[2H-1-benzopyran-2,2'-indoline]; 5'-chloro-6-formyl-16',3',3'-trimethylspiro[2H-1-benzopyran-2,2'-indoline]; 5'-chloro-6-hydroxy-8-methoxy-1',3',3'-trimethylspiro[2H-1-benzopyran-2,2'-indoline]; 5'-chloro-6-iodo-8-nitro-1',3',3'-trimethylspiro[2H-1-benzopyran-2,2'-indoline]; 5'-chloro-8-iodo-6-nitro-1',3',3'-trimethylspiro[2H-1-benzopyran-2,2'-indoline]; 5'-chloro-7-methoxy-6-nitro-1',3',3',5-tetramethylspiro[2H-1-benzopyran-2,2'-indoline]; 5-chloro-8-methoxy-6-nitro-1',3',3'-trimethylspiro[2H-1-benzopyran-2,2'-indoline]; 5'-chloro-6-methoxy-8-nitro-1',3',3'-trimethylspiro[2H-1-benzopyran-2,2'-indoline]; 5'-chloro-7-methoxy-6-nitro-1', 3',3'-trimethylspiro[2H-1-benzopyran-2,2'-indoline]; 5'-chloro-8-methoxy-5-nitro-1',3',3'-trimethylspiro[2H-1-benzopyran-2,2'-indoline]; 5'-chloro-8-methoxy-6-nitro-1', 3',3'-trimethylspiro[2H-1-benzopyran-2,2'-indoline]; 6-chloro-5'-methoxy-8-nitro-1',3',3'-trimethylspiro[2H-1-benzopyran-2,2'-indoline]; 7'-chloro-6-methoxy-8-nitro-1', 3',3'-trimethylspiro[2H-1-benzopyran-2,2'-indoline]; 7'-chloro-8-methoxy-6-nitro-1',3',3'-trimethylspiro[2H-1-benzopyran-2,2'-indoline]; 5'-chloro-6-methoxy-1',3',3'-trimethylspiro[2H-1-benzopyran-2,2'-indoline]; 5-chloro-8-methoxy-1',3',3'-trimethylspiro[2H-1-benzopyran-2,2'-indoline];5'-chloro-8-methoxy-1',3',3'-trimethylspiro[2H-1-benzopyran-2,2'-indoline]; 6-chloro-5'-methoxy-1',3',3'-trimethylspiro[2H-1-benzopyran-2,2'-indoline]; 6-chloro-8-methoxy-1',3',3'-trimethylspiro[2H-1-benzopyran-2,2'-indoline]; 7-chloro-7'-methoxy-1',3',3'-trimethylspiro[2H-1-benzopyran-2,2'-indoline]; 5'-chloro-8-methoxy-1',3',3'-trimethyl-5,6,6'-trinitrospiro[2H-1-benzopyran-2,2'-indoline]; 5'-chloro-6-nitro-1',3',3',5,7-pentamethylspiro[2H-1-benzopyran-2,2'-indoline]; 5'-chloro-6-nitro-1',3',3',5,8- pentamethylspiro[2H-1-benzopyran-2,2'-indoline]; 6-chloro-8-nitro-1',3',3',5,7-pentamethylspiro[2H-1-benzopyran-2,2'-indoline]; 7-chloro-6-nitro-1',3,3,3'-tetramethylspiro[2H-1-benzopyran-2,2'-indoline]; 5'-chloro-6-nitro-1',3',3'-trimethylspiro[2H-1-benzopyran-2,2'-indoline]; 5-chloro-6-nitro-1',3',3'-trimethylspiro[2H-1-benzopyran-2,2'-indoline]; 5'-chloro-6-nitro-1',3',3'-trimethylspiro[2H-1-benzopyran-2,2'-indoline]; 5'-chloro-8-nitro-1',3',3'-trimethylspiro[2H-1-benzopyran-2,2'-indoline]; 6'-chloro-6-nitro-1',3',3'-trimethylspiro[2H-1-benzopyran-2,2'-indoline]; 6-chloro-8-nitro-1',3',3'-trimethylspiro[2H-1-benzopyran-2,2'-indoline]; 7-chloro-6-nitro-1',3',3'-trimethylspiro[2H-1-benzopyran-2,2'-indoline]; 7'-chloro-6-nitro-1',3',3'-trimethylspiro[2H-1-benzopyran-2,2'-indoline]; 7-chloro-8-nitro-1',3',3'-trimethylspiro[2H-1-benzopyran-2,2'-indoline]; 8-chloro-6-nitro-1',3',3'-trimethylspiro[2H-1-benzopyran-2,2'-indoline]; 5'-chloro-6-(13-nitrovinyl)-1',3',3'-trimethylspiro[2H-1-benzopyran-2,2'-indoline]; 5'-chloro-1',3',3',5,7-pentamethylspiro[2H-1-benzopyran-2,2'-indoline]; 6-chloro-4',7,8-trimethoxy-1',3',3'-trimethylspiro[2H-1-benzopyran-2,2'-indoline]; 5-chloro-1',3',3'-trimethylspiro[2H-1-benzopyran-2,2'-indoline]; 5'-chloro-1',3',3'-trimethylspiro[2H-1-benzopyran-2,2'-indoline]; 6-chloro-1',3',3'-trimethylspiro[2H-1-benzopyran-2,2'-indoline]; 7-chloro-1',3',3'-trimethylspiro[2H-1-benzopyran-2,2'-indoline], 8-chloro-1',3',3'-trimethylspiro[2H-1-benzopyran-2,2'-indoline]; 6-cyano-1',3',3'-trimethylspiro[2H-1-benzopyran-2,2'-indoline]6,8-diallyl-1',3',3'-trimethylspiro[2H-1-benzopyran-2,2'-indoline]; 5,6-dibromo-8-methoxy-1',3',3'-trimethylspiro[2H-1-benzopyran-2,2'-indoline]; 6,8-dibromo-5-methoxy-1',3',3'-trimethylspiro[2H-1-benzopyran-2,2'-indoline]; 6,8-dibromo-5-nitro-1',3',3'-trimethylspiro[2H-1-benzopyran-2,2'-indoline]; 6,8-dibromo-1',3',3'-trimethylspiro[2H-1-benzopyran-2,2'-indoline]; 4',7'-dichloro-5,7-dimethoxy-6-nitro-1',3',3'-trimethylspiro[2H-1-benzopyran-2,2'-indoline]; 5',8-dichloro-5,7-dimethoxy-6-nitro-1',3',3'-trimethylspiro[2H-1-benzopyran-2,2'-indoline]; 5,6-dichloro-3',3'-dimethyl-8-ethoxy-1'-phenylspiro[2H-1-benzopyran-2,2'-indoline]; 5,7-dichloro-1',3'-dimethyl-6-nitro-3'-phenylspiro[2H-1-benzopyran-2,2'-indoline]; 5,7-dichloro-3',3'-dimethyl-6-nitro-1'-phenylspiro[2H-1-benzopyran-2,2'-indoline]; 4',7'-dichloro-5,6-dinitro-8-methoxy-1',3',3'-trimethylspiro[2H-1-benzopyran-2,2'-indoline]; 4',7'-dichloro-7,8-dinitro-6-methoxy-1',3',3'-trimethylspiro[2H-1-benzopyran-2,2'-indoline]; 5,7-dichloro-5',6'-dinitro-1',3',3'-trimethylspiro[2H-1-benzopyran-2,2'-indoline]; 5,7-dichloro-4',6'-diphenyl-6-nitro-1',3',3'-trimethylspiro[2H-1-benzopyran-2,2'-indoline]; 5,6-dichloro-8-ethoxy-1',3',3'-trimethylspiro[2H-1-benzopyran-2,2'-indoline]; 4',7'-dichloro-8-methoxy-6-nitro-1',3',3'-trimethylspiro[2H-1-benzopyran-2,2'-indoline]; 5,7-dichloro-5'-methoxy-6-nitro-1',3',3'-trimethylspiro[2H-1-benzopyran-2,2'-indoline]; 5,7-dichloro-7'-methoxy-6-nitro-1',3',3'-trimethylspiro[2H-1-benzopyran-2,2'-indoline]; 4',7'-dichloro-8-methoxy-1',3',3'-trimethylspiro[2H-1-benzopyran-2,2'-indoline]; 5,6-dichloro-8-methoxy-1',3',3'-trimethylspiro[2H-1-benzopyran-2,2'-indoline]; 5',6-dichloro-8-methoxy-1',3',3'-trimethylspiro[2H-1-benzopyran-2,2'-indoline]; 6,7'-dichloro-8-methoxy-1',3',3'-trimethylspiro[2H-1-benzopyran-2.2'-indoline]; 5,7-dichloro-6-nitro-1',3',3',4',7'-pentamethylspiro[2H-1-benzopyran-2,2'-indoline]; 5,7-dichloro-6-nitro-1',3',3',5',7'-pentamethylspiro[2H-1-benzopyran-2,2'-indoline]; 5,7-dichloro-6-nitro-7'-phenyl-1',3',3'-trimethylspiro[2H-1-benzopyran-2,2'-indoline]; 5,7-dichloro-6-nitro-4',5',6',7'-tetrafluoro-1',3',3'-trimethylspiro[2H-1-benzopyran-2,2'-indoline]; 4',6'-dichloro-6-nitro-1',3',3'-trimethylspiro[2H-1-benzopyran-2,2'-indoline]; 4',7'-dichloro-6-nitro-1',3',3'-trimethylspiro[2H-1-benzopyran-2,2'-indoline]; 5,7-dichloro-6-nitro-1',3',3',5'-tetramethylspiro[2H-1-benzopyran-2,2'-indoline]; 5,5'-dichloro-6-nitro-1',3',3'-trimethylspiro[2H-1-benzopyran-2,2'-indoline]; 5',6-dichloro-8-nitro-1',3',3'-trimethylspiro[2H-1-benzopyran-2,2'-indoline]; 5,7-dichloro-6-nitro-1',3',3'-trimethylspiro[2H-1-benzopyran-2,2'-indoline]; 5,8-dichloro-6-nitro-1',3',3'-trimethylspiro[2H-1-benzopyran-2,2'-indoline]; 5',7'-dichloro-6-nitro-1',3',3'-trimethylspiro[2H-1-benzopyran-2,2'-indoline]; 5',8-dichloro-6-nitro-1',3',3'-trimethylspiro[2H-1-benzopyran-2,2'-indoline]; 6,8-dichloro-5-nitro-1,3',3'-trimethylspiro[2H-1-benzopyran-2,2'-indoline]; 7,8-dichloro-6-nitro-1',3',3'-trimethylspiro[2H-1-benzopyran-2,2'-indoline]; 5,7-dichloro-6-nitro-1',3',3'-trimethyl-4',6',7'-triphenylspiro[2H-1-benzopyran-2,2'-indoline]; 5',6-dichloro-1',3',3'-trimethylspiro[2H-1-benzopyran-2,2'-indoline]; 5,7-dichloro-1',3',3'-trimethylspiro[2H-1-benzopyran-2,2'-indoline]; 5',7-dichloro-1',3',3'-trimethylspiro[2H-1-benzopyran-2,2'-indoline]; 6,8-dichloro-1',3',3'-trimethylspiro[2H-1-benzopyran-2,2'-indoline]; 7,8-dichloro-1',3',3'-trimethylspiro[2H-1-benzopyran-2,2'-indoline]; 4',7'-diethoxy-8-methoxy-1',3',3'-trimethylspiro[2H-1-benzopyran-2,2'-indoline]; 3',3'-diethyl-6-methoxy-1'-methyl-8-nitrospiro[2H-1-benzopyran-2,2'-indoline]; 3',3'-diethyl-8-methoxy-1'-methyl-6-nitrospiro[2H-1-benzopyran-2,2'-indoline]; 3',3'-diethyl-1'-methyl-6-nitrospiro[2H-1-benzopyran-2,2'-indoline]; 1',3'-diethyl-3'-methyl-4',7',8'-trimethoxyspiro[2H-1-benzopyran-2,2'-indoline]; 7-diethylamino-1',3',3'-trimethylspiro[2H-1-benzopyran-2,2'-indoline]; 5,7-dihydroxy-1',3',3'-trimethylspiro[2H-1-benzopyran-2,2'-indoline]; 6,8-diiodo-1',3',3'-trimethylspiro[2H-1-benzopyran-2,2'-indoline]; 5',8'-dimethoxy3',3'-dimethyl-1'-ethylspiro[2H-1-benzopyran-2,2'-indoline]; 5,7-dimethoxy-3',3'-dimethyl-5',6-dinitro-1'-isoamylspiro[2H-1-benzopyran-2,2'-indoline]; 5,7-dimethoxy-1',3'-dimethyl-6-nitro-3'-phenylspiro[2H-1-benzopyran-2,2'-indoline]; 5,7-dimethoxy-3',3'-dimethyl-6-nitro-1'-phenylspiro[2H-1-benzopyran-2,2'-indoline]; 1',8-dimethoxy-5,6-dinitro-3'-methyl-3'-phenylspiro[2H-1-benzopyran-2,2'-indoline]; 4',7'-dimethoxy-6,8-dinitro-1',3',3'-trimethylspiro[2H-1-benzopyran-2,2'-indoline]; 5,7-dimethoxy-6,8-dinitro-1',3',3'-trimethylspiro[2H-1-benzopyran-2,2'-indoline]; 5',8-dimethoxy-5,6-dinitro-1',3',3'-trimethylspiro[2H-1-benzopyran-2,2'-indoline]; 6',8-dimethoxy-5,6-dinitro-1',3',3'-trimethylspiro[2H-1-benzopyran-2,2'-indoline]; 7',8-dimethoxy-5,6-dinitro-1',3',3'-trimethylspiro[2H-1-benzopyran-2,2'-indoline]; 4',7'-dimethoxy-8-ethoxy-1',3',3'-trimethylspiro[2H-1-benzopyran-2,2'-indoline]; 5',7'-dimethoxy-8-ethoxy-1',3',3'-trimethylspiro[2H-1-benzopyran-2,2'-indoline]; 5,7-dimethoxy-4'-fluoro-6-nitro-1',3',3'-trimethylspiro[2H-1-benzopyran-2,2'-indoline]; 5,7-dimethoxy-5'-fluoro-6-nitro-1',3',3'-trimethylspiro[2H-1-benzopyran-2,2'-indoline]; 1',8-dimethoxy-3'-methyl-6-nitro-3'-phenylspiro[2H-1-benzopyran-2,2'-indoline]; 5,7-dimethoxy-6-nitro-7'-phenyl-1',3',3'-trimethylspiro[2H-1-benzopyran-2,2'-indoline]; 4',7'-dimethoxy-6-nitro-1',3',3'-trimethylspiro[2H-1-benzopyran-2,2'-indoline]; 4',7'-dimethoxy-8-nitro-1',3',3'-trimethylspiro[2H-1-benzopyran-2,2'-indoline]; 5',6-dimethoxy-8-nitro-1',3',3'-trimethylspiro[2H-1-benzopyran-2,2'-indoline]; 5,7-dimethoxy-6-nitro-1',3',3'-trimethylspiro[2H-1-benzopyran-2,2'-indoline]; 5',8-dimethoxy-S-nitro-1',3',3'-trimethylspiro[2H-1-benzopyran-2,2'-indoline]; 5',8-dimethoxy-6-nitro-1',3',3'-trimethylspiro[2H-1-benzopyran-2,2'-indoline]; 6,7-dimethoxy-8-nitro-1',3',3'-trimethylspiro[-2H-1-benzopyran-2,2'-indoline]; 7',8-dimethoxy-5-nitro- 1',3',3'-trimethylspiro[2H-1-benzopyran-2,2'-indoline]; 7',8-dimethoxy-6-nitro-1',3',3'-trimethylspiro[2H-1-benzopyran-2,2'-indoline]; 5,7-dimethoxy-6-nitro-1',3',3'-trimethyl-4',6',7'-triphenylspiro[2H-1-benzopyran-2,2'-indoline]; 5,7-dimethoxy-1',3',3'-trimethylspiro[2H-1-benzopyran-2,2'-indoline]; 5',8-dimethoxy-1',3',3'-trimethylspiro[2H-1-benzopyran-2,2'-indoline]; 7',8-dimethoxy-1',3',3'-trimethylspiro[2H-1-benzopyran-2,2'-indoline]; 1',3'-dimethyl-6,8-dinitro-3'-ethylspiro[2H-1-benzopyran-2,2'-indoline]; 3',3'-dimethyl-6,8-dinitro-1'-ethylspiro[2H-1-benzopyran-2,2'-indoline]; 3',3'-dimethyl-5,6-dinitro-1'-hexadecyl-8-methoxyspiro[2H-1-benzopyran-2,2'-indoline]; 3',3'-dimethyl-6,8-dinitro-1'-isoamylspiro[2H-1-benzopyran-2,2'-indoline]; 3',3'-dimethyl-5,6-dinitro-1'-isoamyl-8-methoxyspiro[2H-1-benzopyran-2,2'-indoline]; 3',3'-dimethyl-6,8-dinitro-1'-isoamyl-7-methoxyspiro[2H-1-benzopyran-2,2'-indoline]; 1',3'-dimethyl-S,6-dinitro-8-methoxy-3'-phenyispiro[2H-1-benzopyran-2,2'-indoline]; 1',3'-dimethyl-5',6-dinitro-8-methoxy-3'-phenylspiro[2H-1-benzopyran-2,2'-indoline]; 3,3'-dimethyl-5,6-dinitro-8-methoxy-1'-phenylspiro[2H-1-benzopyran-2,2'-indoline]; 3,3'-dimethyl-6,8-dinitro-7-methoxy-1'-phenylspiro[2H-1-benzopyran-2,2'-indoline]; 3',3'-dimethyl-7,8-dinitro-6-methoxy-1'-phenylspiro[2H-1-benzopyran-2,2'-indoline]; 1',3'-dimethyl-6,8-dinitro-3'-phenylspiro[2H-1-benzopyran-2,2'-indoline]; 3',3'-dimethyl-6,8-dinitro-1'-phenylspiro[2H-1-benzopyran-2,2'-indoline]; 3',3'-dimethyl-6,8-dinitro-1'-propylspiro[2H-1-benzopyran-2,2'-indoline]; 1',3'-dimethyl-3',7'-diphenyl-8-methoxy-6-nitrospiro[2H-1-benzopyran-2,2'-indoline]; 3',3'-dimethyl-8-ethoxy-1'-phenylspiro[2H-1-benzopyran-2,2'-indoline]; 1',3'-dimethyl-3'-ethylspiro[2H-1-benzopyran-2,2'-indoline]; 3',3'-dimethyl-1'-ethylspiro[2H-1-benzopyran-2,2'-indoline]; 1',3'-dimethyl-3'-ethyl-8-methoxyspiro[2H-1-benzopyran-2,2'-indoline]; 1',3'-dimethyl-1'-ethyl-8-methoxyspiro[2H-1-benzopyran-2,2'-indoline]; 1',3'-dimethyl-3'-ethyl-6-methoxy-8-nitrospiro[2H-1-benzopyran-2,2'-indoline]; 1',3'-dimethyl-3'-ethyl-8-methoxy-5-nitrospiro[2H-1-benzopyran-2,2'-indoline]; 1',3'-dimethyl-3'-ethyl-8-methoxy-6-nitrospiro[2H-1-benzopyran-2,2'-indoline]; 3',3'-dimethyl-1'-ethyl-8-methoxy-6-nitrospiro[2H-1-benzopyran-2,2'-indoline]; 1',3'-dimethyl-3'-ethyl-6-nitrospiro[2H-1-benzopyran-2,2'-indoline]; 3',3'-dimethyl-1'-ethyl-6-nitrospiro[2H-1-benzopyran-2,2'-indoline]; 3',3'-dimethyl-1'-ethyl-8-nitrospiro[2H-1-benzopyran-2,2'-indoline]; 3',3'-dimethyl-1'-hexadecyl-6-nitrospiro[2H-1-benzopyran-2,2'-indoline]; 3',3'-dimethyl-1'-((3-hydroxyethyl)-6-nitrospiro[2H-1-benzopyran-2,2'-indoline]; 3,3'-dimethyl-1'-isoamyl-8-methoxy-5,5',6-trinitrospiro[2H-1-benzopyran-2,2'-indoline]; 3',3'-dimethyl-1'-isoamyl-6-nitrospiro[2H-1-benzopyran-2,2'-indoline]; 3',3'-dimethyl-1'-isoamyl-5',6,8-trinitrospiro[2H-1-benzopyran-2,2'-indoline]; 3',3'-dimethyl-1'-isopropyl-8-methoxy-6-nitrospiro[2H-1-benzopyran-2,2'-indoline]; 1',3'-dimethyl-6-methoxy-8-nitro-3'-phenylspiro[2H-1-benzopyran-2,2'-indoline]; 1',3'-dimethyl-8-methoxy-6-nitro-3'-phenylspiro[2H-1-benzopyran-2,2'-indoline]; 3',3'-dimethyl-6-methoxy-8-nitro-1'-phenylspiro[2H-1-benzopyran-2,2'-indoline]; 3',3'-dimethyl-7-methoxy-6-nitro-1'-phenylspiro[2H-1-benzopyran-2,2'-indoline]; 3',3'-dimethyl-8-methoxy-5-nitro-1'-phenylspiro[2H-1-benzopyran-2,2'-indoline]; 3',3'-dimethyl-8-methoxy-6-nitro-1'-phenylspiro[2H-1-benzopyran-2,2'-indoline]; 3',3'-dimethyl-8-methoxy-6-nitro-1'-propylspiro[2H-1-benzopyran-2,2'-indoline]; 1',3'-dimethyl-8-methoxy-3'-phenylspiro[2H-1-benzopyran-2,2'-indoline]; 3',3'-dimethyl-8-methoxy-1'-phenylspiro[2H-1-benzopyran-2,2'-indoline]; 3',3'-dimethyl-8-methoxy-1'-propylspiro[2H-1-benzopyran-2,2'-indoline]; 1',3'-dimethyl-6-nitro-3'-phenylspiro[2H-1-benzopyran-2,2'-indoline]; 1',3'-dimethyl-8-nitro-3'-phenylspiro[2H-1-benzopyran-2,2'-indoline]; 3',3'-dimethyl-6-nitro-1'-phenylspiro[2H-1-benzopyran-2,2'-indoline]; 3',3'-dimethyl-1'-phenylspino[2H-1-benzopyran-2,2'-indoline]; 3',3'-dimethyl-1'-propylspiro[2H-1-benzopyran-2,2'-indoline]; 1'-dimethylamino-5,6-dinitro-8-methoxy-3'-methyl-3'-phenylspiro[2H-1-benzopyran-2,2'-indoline]; 1'-dimethylamino-8-methoxy-3'-methyl-6-nitro-3'-phenylspiro[2H-1-benzopyran-2,2'-indoline]; 1'-dimethylamino-3'-methyl-6-nitro-3'-phenylspiro[2H-1-benzopyran-2,2'-indoline]; 5,6-dinitro-8-methoxy-1',3',3',4',7'-pentamethylspiro[2H-1-benzopyran-2,2'-indoline]; 5,6-dinitro-8-methoxy-7'-phenyl-1',3',3'-trimethylspiro[2H-1-benzopyran-2,2'-indoline]; 5,6-dinitro-8-methoxy-1',3,3',3'-tetramethylspiro[2H-1-benzopyran-2,2'-indoline]; 5,6-dinitro-8-methoxy-1',3',3',5'-tetramethylspiro[2H-1-benzopyran-2,2'-indoline]; 5,5'-dinitro-8-methoxy-1',3',3'-trimethylspiro[2H-1-benzopyran-2,2'-indoline]; 5,6-dinitro-8-methoxy-1',3',3'-trimethylspiro[2H-1-benzopyran-2,2'-indoline]; 5',8-dinitro-6-methoxy-1',3',3'-trimethylspiro[2H-1-benzopyran-2,2'-indoline]; 6',7'-dinitro-8-methoxy-1',3',3'-trimethylspiro[2H-1-benzopyran-2,2'-indoline]; 6,8-dinitro-5'-methoxy-1',3',3'-trimethylspiro[2H-1-benzopyran-2,2'-indoline]; 6,8-dinitro-7-methoxy-1',3',3'-trimethylspiro[2H-1-benzopyran-2,2'-indoline]; 5,6-dinitro-8-methoxy-1',3',3'-trimethyl-4',6',7'-triphenylspiro[2H-1-benzopyran-2,2'-indoline]; 6,8-dinitro-5'-phenyl-1',3',3'-trimethylspiro[2H-1-benzopyran-2,2'-indoline]; 6,8-dinitro-1',3,3',3'-tetramethylspiro[2H-1-benzopyran-2,2'-indoline]; 6,8-dinitro-1',3',3',7'-tetramethylspiro[2H-1-benzopyran-2,2'-indoline]; 5',6-dinitro-1',3',3'-trimethylspiro[2H-1-benzopyran-2,2'-indoline]; 6,8-dinitro-1',3',3'-trimethylspiro[2H-1-benzopyran-2,2'-indoline]; 4',6'-diphenyl-8-methoxy-6-nitro-1',3',3'-trimethylspiro[2H-1-benzopyran-2,2'-indoline]; 3',3'-diphenyl-1'-methyl-6-nitrospiro[2H-1-benzopyran-2,2'-indoline]; 4',6'-diphenyl-6-nitro-1',3',3'-trimethylspiro[2H-1-benzopyran-2,2'-indoline]; 5',7'-diphenyl-6-nitro-1',3',3'-trimethylspiro[2H-1-benzopyran-2,2'-indoline]; 6-ethoxy-8-nitro-1',3',3'-trimethylspiro[2H-1-benzopyran-2,2'-indoline]; 8-ethoxy-6-nitro-1',3',3'-trimethylspiro[2H-1-benzopyran-2,2'-indoline]; 8-ethoxy-1',3',3',4',7'-pentamethylspiro[2H-1-benzopyran-2,2'-indoline]; 8-ethoxy-5'-phenyl-1',3',3'-trimethylspiro[2H-1-benzopyran-2,2'-indoline]; 8-ethoxy-7'-phenyl-1',3',3'-trimethylspiro[2H-1-benzopyran-2,2'-indoline]; 8-ethoxy-1',3',3'-trimethylspiro[2H-1-benzopyran-2,2'-indoline]; 8-ethoxymethyl-6-nitro-1',3',3'-trimethylspiro[2H-1-benzopyran-2,2'-indoline]; 3'-ethyl-8-methoxy-3'-methyl-1'-phenylspiro[2H-1-benzopyran-2,2'-indoline]; 3'-ethyl-3'-methyl-6-nitro-1'-phenylspiro[2H-1-benzopyran-2,2'-indoline]; 8-ethyl-6-nitro-1',3',3'-trimethylspiro[2H-1-benzopyran-2,2'-indoline]; 4'-fluoro-8-methoxy-6-nitro-1',3',3'-trimethylspiro[2H-1-benzopyran-2,2'-indoline]; 5'-fluoro-6-methoxy-8-nitro-1',3',3'-trimethylspiro[2H-1-benzopyran-2,2'-indoline]; 5'-fluoro-8-methoxy-6-nitro-1',3',3'-trimethylspiro[2H-1-benzopyran-2,2'-indoline]; 4'-fluoro-6-nitro-1',3',3'-trimethylspiro[2H-1-benzopyran-2,2'-indoline]; 5'-fluoro-6-nitro-1',3',3'-trimethylspiro[2H-1-benzopyran-2,2'-indoline]; 6-fluoro-8-nitro-1',3',3'-trimethylspiro[2H-1-benzopyran-2,2'-indoline]; 8-fluoro-6-nitro-1',3',3'-trimethylspiro[2H-1-benzopyran-2,2'-indoline]; 7-fluoro-1',3',3'-trimethylspiro[2H-1-benzopyran-2,2'-indoline]; 8-fluoro-1',3',3'-trimethylspiro[2H-1-benzopyran-2,2'-indoline]; 8-Formyl-7-hydroxy-1',3',3'-trimethylspiro[2H-1-benzopyran-2,2'-indoline]; 6-formyl-8-methoxy-1',3',3'- trimethylspiro[2H-1-benzopyran-2,2'-indoline]; 6-formyl-1',3',3'-trimethylspiro[2H-1-benzopyran-2,2'-indoline]; 8-formyl-1',3',3'-trimethylspiro[2H-1-benzopyran-2,2'-indoline]; 1',3',3',5,5',7-hexamethyl-6-nitrospiro[2H-1-benzopyran-2,2'-indoline]; 1',3',3',5,7,8-hexamethyl-6-nitrospiro[2H-1-benzopyran-2,2'-indoline]; 5'-(β-hydroxyethyl)-8-methoxy-6-nitro-1',3 ',3'-trimethylspiro[2H-1-benzopyran-2,2'-indoline]; hydroxyethyl)-8-methoxy-1',3',3'-trimethylspiro[2H-1-benzopyran-2,2'-indoline]; 5'-(β-hydroxyethyl)-6-nitro-1',3',3'-trimethylspiro[2H-1-benzopyran-2,2'-indoline]; 5'-(β-Hydroxyethyl)-1',3',3'-trimethylspiro[2H-1-benzopyran-2,2'-indoline]; 6-hydroxy-8-methoxy-1',3',3'-trimethylspiro[2H-1-benzopyran-2,2'-indoline]; 7-hydroxy-5'-nitro-1',3',3'-trimethylspiro[2H-1-benzopyran-2,2'-indoline]; 7-hydroxy-6-nitro-1',3',3'-trimethylspiro[2H-1-benzopyran-2,2'-indoline]; 6-hydroxy-1',3',3'-trimethylspiro[2H-1-benzopyran-2,2'-indoline]; 7-hydroxy-1',3',3'-trimethylspiro[2H-1-benzopyran-2,2'-indoline]; 8-hydroxy-1',3',3'-trimethylspiro[2H-1-benzopyran-2,2'-indoline]; 8-hydroxymethyl-6-nitro-1',3',3'-trimethylspiro[2H-1-benzopyran-2,2'-indoline]; 6-iodo-8-nitro-1',3',3'-trimethylspiro[2H-1-benzopyran-2,2'-indoline]; 8-iodo-6-nitro-1',3',3'-trimethylspiro[2H-1-benzopyran-2,2'-indoline]; 1'-methoxy-3'-methyl-6-nitro-3'-phenylspiro[2H-1-benzopyran-2,2'-indoline]; 5'-methoxy-6-nitro-1',3',3',5,7-pentamethylspiro[2H-1-benzopyran-2,2'-indoline]; 5'-methoxy-6-nitro-1',3',3',5,8-pentamethylspiro[2H-1-benzopyran-2,2'-indoline]; 7'-methoxy-6-nitro-1',3',3',5,7-pentamethylspiro[2H-1-benzopyran-2,2'-indoline]; 7'-methoxy-6-nitro-1',3',3',5,8-pentamethylspiro[2H-1-benzopyran-2,2'-indoline]; 6-methoxy-8-nitro-5'-phenyl-1',3',3'-trimethylspiro[2H-1-benzopyran-2,2'-indoline]; 6-methoxy-8-nitro-7'-phenyl-1',3',3'-trimethylspiro[2H-1-benzopyran-2,2'-indoline]; 7-methoxy-6-nitro-7'-phenyl-1',3',3'-trimethylspiro[2H-1-benzopyran-2,2'-indoline]; 8-methoxy-5-nitro-5'-phenyl-1',3',3'-trimethylspiro[2H-1-benzopyran-2,2'-indoline]; 8-methoxy-5-nitro-7'-phenyl-1',3',3'-trimethylspiro[2H-1-benzopyran-2,2'-indoline]; 8-methoxy-6-nitro-3-phenyl-1',3',3'-trimethylspiro[2H-1-benzopyran-2,2'-indoline]; 8-methoxy-6-nitro-5'-phenyl-1',3',3'-trimethylspiro[2H-1-benzopyran-2,2'-indoline]; 8-methoxy-6-nitro-7'-phenyl-1',3',3'-trimethylspiro[2H-1-benzopyran-2,2'-indoline]; 6-methoxy-8-nitro-1',3,3',3'-tetramethylspiro[2H-1-benzopyran-2,2'-indoline]; 6-methoxy-8-nitro-1',3',3',5'-tetramethylspiro[2H-1-benzopyran-2,2'-indoline]; 6-methoxy-8-nitro-1',3',3',6'-tetramethylspiro[2H-1-benzopyran-2,2'-indoline]; 6-methoxy-8-nitro-1',3',3',7'-tetramethylspiro[2H-1-benzopyran-2,2'-indoline]; 7-methoxy-6-nitro-1',3,3',3'-tetramethylspiro[2H-1-benzopyran-2,2'-indoline]; 7-methoxy-6-nitro-1',3',3',5'-tetramethylspiro[2H-1-benzopyran-2,2'-indoline]; 8-methoxy-5-nitro-1',3,3',3'-tetramethylspiro[2H-1-benzopyran-2,2'-indoline]; 8-methoxy-5-nitro-1',3',3',6'-tetramethylspiro[2H-1-benzopyran-2,2'-indoline]; 8-methoxy-5-nitro-1',3',3',7'-tetramethylspiro[2H-1-benzopyran-2,2'-indoline]; 8-methoxy-6-nitro-1',3,3',3'-tetramethylspiro[2H-1-benzopyran-2,2'-indoline]; 8-methoxy-6-nitro-1',3',3',4'-tetramethylspiro[2H-1-benzopyran-2,2'-indoline]; 8-methoxy-6-nitro-1',3',3',5'-tetramethylspiro[2H-1-benzopyran-2,2'-indoline]; 8-methoxy-6-nitro-1',3',3',6'-tetramethylspiro[2H-1-benzopyran-2,2'-indoline]; 8-methoxy-6-nitro-1',3',3',7'-tetramethylspiro[2H-1-benzopyran-2,2'-indoline]; 8-methoxy-6-nitro-1',3',3'-triethylspiro[2H-1-benzopyran-2,2'-indoline]; 5'-methoxy-6-nitro-1',3',3'-trimethylspiro[2H-1-benzopyran-2,2'-indoline]; 5'-methoxy-8-nitro-1',3',3'-trimethylspiro[2H-1-benzopyran-2,2'-indoline]; 6-methoxy-8-nitro-1',3',3'-trimethylspiro[2H-1-benzopyran-2,2'-indoline]; 7-methoxy-6-nitro-1',3',3'-trimethylspiro[2H-1-benzopyran-2,2'-indoline]; 7-methoxy-6-nitro-1',3',3'-trimethylspiro[2H-1-benzopyran- 2,2'-indoline]; 7'-methoxy-8-nitro-1',3',3'-trimethylspiro[2H-1-benzopyran-2,2'-indoline]; 8-methoxy-5-nitro-1',3',3'-trimethylspiro[2H-1-benzopyran-2,2'-indoline]; 8-methoxy-5'-nitro-1',3',3'-trimethylspiro[2H-1-benzopyran-2,2'-indoline]; 8-methoxy-6-nitro-1',3',3'-trimethylspiro[2H-1-benzopyran-2,2'-indoline]; 7-methoxy-6-nitro-1',3',3'-trimethyl-4',6',7'-triphenylspiro[2H-1-benzopyran-2,2'-indoline]; 8-methoxy-6-nitro-1',3',3'-trimethyl-4',6',7'-triphenylspiro[2H-1-benzopyran-2,2'-indoline]; 8-methoxy-1',3',3',4',7'-pentamethylspiro[2H-1-benzopyran-2,2'-indoline]; 8-methoxy-5'-phenyl-1',3',3'-trimethylspiro[2H-1-benzopyran-2,2'-indoline];8-methoxy-7'-phenyl-1',3',3'-trimethylspiro[2H-1-benzopyran-2,2'-indoline]; 8-methoxy-1',3,3',3'-tetramethylspiro[2H-1-benzopyran-2,2'-indoline]; 8-methoxy-4',6,7'-trichloro-1',3',3'-trimethylspiro[2H-1-benzopyran-2,2'-indoline]; 5'-methoxy-1',3',3'-trimethylspiro[2H-1-benzopyran-2,2'-indoline]; 6-methoxy-1',3',3'-trimethylspiro[2H-1-benzopyran-2,2'-indoline]; 7-methoxy-1',3',3'-trimethyispiro[2H-1-benzopyran-2,2'-indoline]; 8-methoxy-1',3',3'-trimethylspiro[2H-1-benzopyran-2,2'-indoline]; 8-methoxy-1',3',3'-trimethyl-5,5',6-trinitrospiro[2H -1-benzopyran-2,2'-indoline]; 6-nitro-1',3',3 ',5,7-pentamethylspiro[2H-1-benzopyran-2,2'-indoline]; 6-nitro-1',3',3',5,8-pentamethylspiro[2H-1-benzopyran-2,2'-indoline]; 6-(o-nitrophenylazo)-1',3',3'-trimethylspiro[2H-1-benzopyran-2,2'-indoline]; 6-(p-nitrophenylazo)-1',3',3'-trimethylspiro[2H-1-benzopyran-2,2'-indoline]; 6-nitro-5'-phenyl-1',3',3'-trimethylspiro[2H-1-benzopyran-2,2'-indoline]; 6-nitro-7'-phenyl-1',3',3'-trimethylspiro[2H-1-benzopyran-2,2'-indoline]; 8-nitro-5'-phenyl-1',3',3'-trimethylspiro[2H-1-benzopyran-2,2'-indoline]; 8-nitro-7'-phenyl-1',3',3'-trimethylspiro[2H-1-benzopyran-2,2'-indoline]; 6-nitro-8-piperidinomethyl-1',3',3'-trimethylspiro[2H-1-benzopyran-2,2'-indoline]; 7-nitro-5,5',6,8-tetrachloro-1',3',3'-trimethylspiro[2H-1-benzopyran-2,2'-indoline]; 6-nitro-4',5',6',7'-tetrafluoro-1',3',3'-trimethylspiro[2H-1-benzopyran-2,2'-indoline]; 6-nitro-1',3,3',3'-tetramethylspiro[2H-1-benzopyran-2,2'-indoline]; 6-nitro-1',3',3',5'-tetramethylspiro[2H-1-benzopyran-2,2'-indoline]; 6-nitro-1',3',3',6'-tetramethylspiro[2H-1-benzopyran-2,2'-indoline]; 6-nitro-1',3',3',7'-tetramethylspiro[2H-1-benzopyran-2,2'-indoline]; 6-nitro-1',3',3',8'-tetramethylspiro[2H-1-benzopyran-2,2'-indoline]; 8-nitro-1',3,3',3'-tetramethylspiro[2H-1-benzopyran-2,2'-indoline]; 8-nitro-1',3',3',6'-tetramethylspiro[2H-1-benzopyran-2,2'-indoline]; 8-nitro-1',3',3',7'-tetramethylspiro[2H-1-benzopyran-2,2'-indoline]; 5-nitro-5',6,8-trichloro-1',3',3'-trimethylspiro[2H-1-benzopyran-2,2'-indoline]; 6-nitro-5,5',7-trichloro-1',3',3'-trimethylspiro[2H-1-benzopyran-2,2'-indoline]; 6-nitro-5,5',8-trichloro-1',3',3'-trimethylspiro[2H-1-benzopyran-2,2'-indoline]; 6-nitro-5,7,7'-trichloro-1',3',3'-trimethylspiro[2H-1-benzopyran-2,2'-indoline]; 6-nitro-5',7,8-trichloro-1',3',3'-trimethylspiro[2H-1-benzopyran-2,2'-indoline]; 7-nitro-5,6,8-trichloro-1',3',3'-trimethylspiro[2H-1-benzopyran-2,2'-indoline]; 5-nitro-4 ',7,8-trimethoxy-1',3',3'-trimethylspiro[2H-1-benzopyran-2,2'-indoline]; 6-nitro-4',6,8-trimethoxy-1',3',3'-trimethylspiro[2H-1-benzopyran-2,2'-indoline]; 6-nitro-4',7,8-trimethoxy-1',3',3'-trimethylspiro[2H-1-benzopyran-2,2'-indoline]; 8-nitro-4',6,7'-trimethoxy-1',3',3'-trimethylspiro[2H-1-benzopyran-2,2'-indoline]; 5-nitro-1',3',3'-trimethylspiro[2H-1-benzopyran-2,2'-indoline]; 5'-nitro-1',3',3'-trimethylspiro[2H-1-benzopyran-2,2'-indoline]; 6-nitro-1',3',3'-trimethylspiro[2H-1-benzopyran-2,2'-indoline]; 7-nitro-1',3',3'-trimethylspiro

[2H-1-benzopyran-2,2'-indoline]; 8-nitro-1',3',3'-trimethylspiro[2H-1-benzopyran-2,2'-indoline]; 6-(1,3-nitrovinyl)-1',3'-trimethylspiro[2H-1-benzopyran-2,2'-indoline]; 6-nitro-1',3',3'-trimethyl-4',6',7'-triphenylspiro[2H-1-benzopyran-2,2'-indoline]; 1',3',3',5,7-pentamethylspiro[2H-1-benzopyran-2,2'-indoline]; 1',3',3',6,8-pentamethylspiro[2H-1-benzopyran-2,2'-indoline]; 7'-phenyl-1',3',3'-trimethylspiro[2H-1-benzopyran-2,2'-indoline]; 6-phenylazo-1',3',3'-trimethylspiro[2H-1-benzopyran-2,2'-indoline]; 1',3',3',3'-tetramethylspiro[2H-1-benzopyran-2,2'-indoline]; 1',3',3',5'-tetramethylspiro[2H-1-benzopyran-2,2'-indoline]; 1',3',3',6'-tetramethylspiro[2H-1-benzopyran-2,2'-indoline]; 1',3',3',7'-tetramethylspiro[2H-1-benzopyran-2,2'-indoline]; 1',3',3',8'-tetramethylspiro[2H-1-benzopyran-2,2'-indoline]; 5,6,8-trichloro-1',3',3'-trimethylspiro[2H-1-benzopyran-2,2'-indoline]; 4',6',8-trimethoxy-1',3',3'-trimethylspiro[2H-1-benzopyran-2,2'-indoline]; 4',7,8-trimethoxy-1',3',3'-trimethylspiro[2H-1-benzopyran-2,2'-indoline]; 5',7',8-trimethoxy-1',3',3',8'-trimethylspiro[2H-1-benzopyran-2,2'-indoline]; 1',3',3'-trimethylspiro[2H-1-benzopyran-2,2'-indoline]; 1',3',3'-trimethyl-5',6,8-trinitrospiro[2H-1-benzopyran-2,2'-indoline]; 1',3',3'-trimethyl-4',6',7'-triphenylspiro[2H-1-benzopyran-2,2'-indoline]; spiro[2H-1-benzopyran-2,2'-[1H]-benzo[g]indoline]; 8-methoxy-6-nitro-1',3',3'-trimethylspiro[2H-1-benzopyran-2,2'-[1H]-benzo[g]indoline]; 6-nitro-1',3',3'-trimethylspiro[2H-1-benzopyran-2,2'-[1H]-benzo[g]indoline]; spiro[2H-benzopyran-2,2,-[1H]-benzo[e]indoline]; 6-nitro-1',3',3'-trimethylspiro[2H-benzopyran-2,2,-[1H]-benzo[e]indoline]; spiro[indoline-2,3'-[3H]-naphtho[2,1-b]pyran]; 8'-bromo-1,3,3-trimethylspiro[indoline-2,3'-[3H]-naphtho[2,1-b]pyran]; 1-butyl-3,3-dimethylspiro[indoline-2,3'-[3H]-naphtho[2,1-b]pyran]; 1-butyl-3,3-dimethyl-8-nitrospiro[indoline-2,3'-[3H]-naphtho[2,1-b]pyran]; 5'-carboxy-5-chloro-1,3,3-trimethylspiro[indoline-2,3'-[3H]-naphtho[2,1-b]pyran]; 5'-carboxy-1,3,3-trimethylspiro[indoline-2,3'-[3H]-naphtho[2,1-b]pyran]; 5-chloro-1,3,3-trimethylspiro[indoline-2,3'-[3H]-naphtho[2,1-b]pyran]; 5-chloro-8'-nitro-1,3,3-trimethylspiro[indoline-2,3'-[3H]-naphtho[2,1-b]pyran]; 4,7-dimethoxy-1,3,3-trimethylspiro[indoline-2,3'-[3H]-naphtho[2,1-b]pyran]; 1,3-dimethyl-3-ethylspiro[indoline-2,3'-[3H]-naphtho[2,1-b]pyran]; 3,3-dimethyl-1-ethylspiro[indoline-2,3'-[3H]-naphtho[2,1-b]pyran]; 3,3-dimethyl-1-ethyl-8'-nitrospiro[indoline-2,3'-[3H]-naphtho[2,1-b]pyran]; 3,3-dimethyl-1-propylspiro[indoline-2,3'-[3H]-naphtho[2,1-b]pyran]; 3,3-dimethyl-1-propyl-8'-nitrospiro[indoline-2,3'-[3H]-naphtho[2,1-b]pyran]; 9'-hydroxy-1,3,3-trimethylspiro[indoline-2,3'-[3H]-naphtho[2,1-b]pyran]; 5-(13-hydroxyethyl)-1,3,3-trimethylspiro[indoline-2,3'-[3H]-naphtho[2,1-b]pyran]; 5-methoxy-8'-nitro-1,3,3-trimethylspiro[indoline-2,3'-[3H]-naphtho[2,1-b]pyran]; 5'-methoxy-8'-nitro-1,3,3-trimethylspiro[indoline-2,3'-[3H]-naphtho[2,1-b]pyran]; 5'-methoxy-10'-nitro-1,3,3-trimethylspiro[indoline-2,3'-[3H]-naphtho[2,1-b]pyran]; 5-methoxy-1,3,3-trimethylspiro[indoline-2,3'-[3H]-naphtho[2,1-b]pyran]; 5'-methoxy-1,3,3-trimethylspiro[indoline-2,3'-[3H]-naphtho[2,1-b]pyran]; 7'-nitro-1,3,3-trimethylspiro[indoline-2,3'-[3H]-naphtho[2,1-b]pyran]; 8'-nitro-1,3,3-trimethylspiro[indoline-2,3'-[3H]-naphtho[2,1-b]pyran]; 10'-nitro-1,3,3-trimethylspiro[indoline-2,3'-[3H]-naphtho[2,1-b]pyran]; 1,3,3,4,7-pentamethylspiro[indoline-2,3'-[3H]-naphtho[2,1-b]pyran]; 1,3,3,5,7-pentamethylspiro[indoline-2,3'-[3H]-naphtho[2,1-b]pyran]; 5-phenyl-1,3,3-trimethylspiro[indoline-2,3'-[3H]-naphtho[2,1-b]pyran]; 7-phenyl-1,3,3-trimethylspiro[indoline-2,3'-[3H]-naphtho[2,1-b]pyran]; 1,2',3,3-tetramethylspiro[indoline-2,3'-[3H]-naphtho[2,1-[pyran]; 1,3,3,5-tetramethylspiro[indoline-2,3'-[3H]-naphtho[2,1-b]pyran]; 1,3,3,7-tetramethylspiro[indoline-2,3'-[3H]-naphtho[2,1-b]pyran]; 1,3,3,-trimethylspiro[indoline-2,3'-[3H]-naphtho[2,1-b]pyran]; spiro[indoline-2,2'-[2H]-phenanthro[2,1-b]pyran]; 1,3,3,-trimethylspiro[indoline-2,2'-[2H]-phenanthro[2,1-b]pyran]; spiro[3H-anthra[2,1-b]pyran-3,2'-indoline]; 1',3',3'-trimethylspiro[3H-anthra[2,1-b]pyran-3,2'-indoline]; spiro[indoline-2,3'-(3H]-phenanthro[3,4-b]pyran]; 1,3,3-trimethylspiro[indoline-2,3'-(3H]-phenanthro[3,4-b]pyran]; spiro[indoline-2,2'-[2H]-naphtho[1,2-b]pyran]; 6'-chloro-1,3,3-trimethylspiro[indoline-2,2'-[2H]-naphtho[1,2-b]pyran]; 6'-nitro-1,3,3-trimethylspiro[indoline-2,2'-[2H]-naphtho[1,2-b]pyran]; 1,3,3-trimethylspiro[indoline-2,2'-[2H]-naphtho[1,2-b]pyran]; spiro[indoline-2,2'-[2H]-naphtho[2,3-b]pyran]; 10'-nitro-1,3,3-trimethylspiro[indoline-2,2'-[2H]-naphtho[2,3-b]pyran]; 1,3,3-trimethylspiro[indoline-2,2'-[2H]-naphtho[2,3-b]pyran]; spiro[2H-1-benzopyran-2,2'-benzothiazoline]; 6'-acetamido-3,3'-dimethyl-6-nitrospiro[2H-1-benzopyran-2,2'-benzothiazoline]; 6'-amino-3,3'-dimethyl-6-nitrospiro[2H-1-benzopyran-2,2'-benzothiazoline]; 6-bromo-3,3'-dimethylspiro[2H-1-benzopyran-2,2'-benzothiazoline]; 6-bromo-3,3'-dimethyl-6'-methoxyspiro[2H-1-benzopyran-2,2'-benzothiazoline]; 6'-bromo-3,3'-dimethyl-8-methoxy-6-nitrospiro[2H-1-benzopyran-2,2'-benzothiazoline]; 6-bromo-3,3'-dimethyl-6'-methylthiospiro[2H-1-benzopyran-2,2'-benzothiazoline]; 6-bromo-3,3'-dimethyl-6'-nitrospiro[2H-1-benzopyran-2,2'-benzothiazoline]; 8-bromo-3,3'-dimethyl-6-nitrospiro[2H-1-benzopyran-2,2'-benzothiazoline]; 6-bromo-3'-methylspiro[2H-1-benzopyran-2,2'-benzothiazoline]; 3'-butyl-6-nitro-3-phenylspiro[2H-1-benzopyran-2,2'-benzothiazoline]; 8-carbethoxy-3,3'-dimethylspiro[2H-1-benzopyran-2,2'-benzothiazoline]; 8-carbethoxy-3,3'-dimethyl-6-nitrospiro[2H-1-benzopyran-2,2'-benzothiazoline]; 8-carboxy-3,3'-dimethylspiro[2H-1-benzopyran-2,2'-benzothiazoline]; 6'-carboxy-3,3'-dimethyl-8-methoxy-6-nitrospiro[2H-1-benzopyran-2,2'-benzothiazoline]; 8-carboxy-3,3'-dimethyl-6-nitrospiro[2H-1-benzopyran-2,2'-benzothiazoline]; 6'-chloro-3,3'-dimethyl-8-methoxy-6-nitrospiro[2H-1-benzopyran-2,2'-benzothiazoline]; 6-chloro-3,3'-dimethyl-8-nitrospiro[2H-1-benzopyran-2,2'-benzothiazoline]; 3-(p-chlorophenyl)-8-methoxy-3'-methyl-6-nitrospiro[2H-1-benzopyran-2,2'-benzothiazoline]; 6'-cyano-3,3'-dimethyl-8-methoxy-6-nitrospiro[2H-1-benzopyran-2,2'-benzothiazoline]; 6,6'-dibromo-3,3'-dimethylspiro[2H-1-benzopyran-2,2'-benzothiazoline]; 6',8-dimethoxy-3,3'-dimethylspiro[2H-1-benzopyran-2,2'-benzothiazoline]; 6',8-dimethoxy-3,3'-dimethyl-6,7'-dinitrospiro[2H-1-benzopyran-2,2'-benzothiazoline]; 6',8-dimethoxy-3,3'-dimethyl-6-nitrospiro[2H-1-benzopyran-2,2'-benzothiazoline]; 6',8-dimethoxy-3'-ethyl-3-methyl-6-nitrospiro[2H-1-benzopyran-2,2'-benzothiazoline]; 3,3'-dimethylspiro[2H-1-benzopyran-2,2'-benzothiazoline]; 3,3'-dimethyl-6,6'-dinitrospiro[2H-1-benzopyran-2,2'-benzothiazoline]; 3,3'-dimethyl-6,6'-dinitro-8-methoxyspiro[2H-1-benzopyran-2,2'-benzothiazoline]; 3,3'-dimethyl-6'-hydroxy-8-methoxy-6-nitrospiro[2H-1-benzopyran-2,2'-benzothiazoline]; 3,3'-dimethyl-5'-isobutyramido-6-nitrospiro[2H-1-benzopyran-2,2'-benzothiazoline]; 3,3'-dimethyl-5'-methacrylamido-6-nitrospiro[2H-1-benzopyran-2,2'-benzothiazoline]; 3,3'-dimethyl-8-methoxyspiro[2H-1-benzopyran-2,2'-benzothiazoline]; 3,3'-dimethyl-8-methoxy-6'-methylthio-6-nitrospiro[2H-1-benzopyran-2,2'-benzothiazoline]; 3,3'-dimethyl-6'-methoxy-6-nitrospiro[2H-1-benzopyran-2,2'-benzothiazoline]; 3,3'-dimethyl-8-methoxy-5-nitrospiro

[2H-1-benzopyran-2,2'-benzothiazoline]; 3,3'-dimethyl-8-methoxy-6-nitrospiro[2H-1-benzopyran-2,2'-benzothiazoline]; 3,3'-dimethyl-6'-methylthio-6-nitrospiro[2H-1-benzopyran-2,2'-benzothiazoline]; 3,3'-dimethyl-6-nitrospiro[2H-1-benzopyran-2,2'-benzothiazoline]; 3,3'-dimethyl-8-nitrospiro[2H-1-benzopyran-2,2'-benzothiazoline]; 3'-ethyl-8-methoxy-3-methylspiro[2H-1-benzopyran-2,2'-benzothiazoline]; 3-ethyl-8-methoxy-3'-methyl-6-nitrospiro[2H-1-benzopyran-2,2'-benzothiazoline]; 3'-ethyl-6'-methoxy-3-methyl-6-nitrospiro[2H-1-benzopyran-2,2'-benzothiazoline]; 3'-ethyl-8-methoxy-3-methyl-6-nitrospiro[2H-1-benzopyran-2,2'-benzothiazoline]; 3-ethyl-3'-methyl-6-nitrospiro[2H-1-benzopyran-2,2'-benzothiazoline]; 3'-ethyl-3-methyl-6-nitrospiro[2H-1-benzopyran- 2,2'-benzothiazoline]; 3'-ethyl-8-methoxy-6-nitro-3-phenylspiro[2H-1-benzopyran-2,2'-benzothiazoline]; 3'-ethyl-6-nitrospiro[2H-1-benzopyran-2,2'-benzothiazoline]; 3'-ethyl-6-nitro-3-phenylspiro[2H-1-benzopyran-2,2'-benzothiazoline]; 3-isopropyl-8-methoxy-3'-methyl-6-nitrospiro[2H-1-benzopyran-2,2'-benzothiazoline]; 3'-isopropyl-8-methoxy-3methyl-6-nitrospiro[2H-1-benzopyran-2,2'-benzothiazoline]; 7-methoxy-3'-methylspiro[2H-1-benzopyran-2,2'-benzothiazoline]; 8-methoxy-3'-methyl-6-nitro-3-phenylspiro[2H-1-benzopyran-2,2'-benzothiazoline]; 8-methoxy-3'-methyl-6-nitro-3-propylspiro[2H-1-benzopyran-2,2'-benzothiazoline]; 3'-methylspiro[2H-1-benzopyran-2,2'-benzothiazoline]; 3'-methyl-6-nitrospiro[2H -1-benzopyran-2,2'-benzothiazoline]; 3'-methyl-6-nitro-3-phenylspiro[2H-1-benzopyran-2,2'-benzothiazoline]; 3'-methyl-6-nitro-3-propylspiro[2H-1-benzopyran-2,2'-benzothiazoline]; 6-nitro-3-phenyl-3'-propylspiro[2H-1-benzopyran-2,2'-benzothiazoline]; spiro[benzothiazoline-2,3,'-[3H]-naphtho[2,1-b]pyran]; 2',3-dimethylspiro[benzothiazoline-2,3,'-[3H]-naphtho[2,1-b]pyran]; 2',3-dimethyl-6-methoxyspiro[benzothiazoline-2,3,'-[3H]-naphtho[2,1-b]pyran]; 3-ethylspiro[benzothiazoline-2,3,'-[3H]-naphtho[2,1-b]pyran]; 3-ethyl-2'-methylspiro[benzothiazoline-2,3,'-[3H]-naphtho[2,1-b]pyran]; 3-methylspiro[benzothiazoline-2,3,'-[3H]-naphtho[2,1-b]pyran]; spiro[2H-1-benzopyran-2,2'-benzoxazoline]; 8-bromo-3'-methyl-6-nitrospiro[2H-1-benzopyran-2,2'-benzoxazoline]; 5'-chloro-3,3'-dimethyl-6-nitrospiro[2H-1-benzopyran-2,2'-benzoxazoline]; 6-chloro-3,3'-dimethyl-8-nitrospiro[2H-1-benzopyran-2,2'-benzoxazoline]; 3,3'-dimethyl-6-methoxy-8-nitrospiro[2H-1-benzopyran-2,2'-benzoxazoline]; 3,3'-dimethyl-8-methoxy-6-nitrospiro[2H-1-benzopyran-2,2'-benzoxazoline]; 3,3'-dimethyl-8-methoxy-6-nitro-5'-phenylspiro[2H-1-benzopyran-2,2'-benzoxazoline]; 3,3'-dimethyl-6-nitrospiro[2H-1-benzopyran-2,2'-benzoxazoline]; 3,3'-dimethyl-8-nitrospiro[2H-1-benzopyran-2,2'-benzoxazoline]; 3,3'-dimethyl-6-nitro-5'-phenylspiro[2H-1-benzopyran-2,2'-benzoxazoline]; 3-ethyl-3'-methyl-6-nitrospiro[2H-1-benzopyran-2,2'-benzoxazoline]; 8-methoxy-6-nitro-3,3',5',7'-tetramethylspiro[2H-1-benzopyran-2,2'-benzoxazoline]; 8-methoxy-6-nitro-3,3',5'-trimethylspiro[2H-1-benzopyran-2,2'-benzoxazoline]; 6-nitro-3,3',5'-trimethylspiro[2H-1-benzopyran-2,2'-benzoxazoline]; 8-nitro-3,3',5'-trimethylspiro[2H-1-benzopyran-2,2'-benzoxazoline]; spiro[2H-1-benzopyran-2,2'-naphth[2,3-d]oxazoline]; 3,3'-dimethyl-8-methoxy-6-nitrospiro[2H-1-benzopyran-2,2'-naphth[2,3-d]oxazoline]; 3,3'-dimethyl-6-nitrospiro[2H-1-benzopyran-2,2'-naphth[2,3-d]oxazoline]; spiro[2H-1-benzopyran-2,2'-naphth[2,1-d]oxazoline]; 3,3'-dimethyl-8-methoxy-6-nitrospiro[2H-1-benzopyran-2,2'-naphth[2,1-d]oxazoline]; 2,2'-spirobi[2H-1-benzopyran]; 3-amyl-2,2'-spirobi[2H-1-benzopyran]; 3-amyl-6'-bromo-2,2'-spirobi[2H-1-benzopyran]; 3-amyl-6-bromo-6'-methyl-2,2'-spirobi[2H-1-benzopyran]; 3-amyl-6'-bromo-6-methyl-2,2'-spirobi[2H-1-benzopyran]; 3-amyl-6,6'-dibromo-2,2'-spirobi[2H-1-benzopyran]; 3-amyl-6,6'-dimethyl-2,2'-spirobi[2H-1-benzopyran]; 3-amyl-6-methyl-2,2'-spirobi[2H-1-benzopyran]; 5-bromo-8,8'-dimethoxy-6-nitro-3'-phenyl-2,2'-spirobi[2H-1-benzopyran]; 6-bromo-6'-nitro-3-phenyl-2,2'-spirobi[2H-1-benzopyran]; 6-bromo-3'-phenyl-2,2'-spirobi[2H-1-benzopyran]; 3-benzyl-2,2'-spirobi[2H-1-benzopyran]; 3-butyl-2,2'-spirobi[2H-1-benzopyran]; 6-chloro-6'-nitro-3-phenyl-2,2'-spirobi[2H-1-benzopyran]; 8-chloro-6-nitro-3'-phenyl-2,2'-spirobi[2H-1-benzopyran]; 6,6'-dibromo-3,3'-dimethylene-2,2'-spirobi[2H-1-benzopyran]; 8,8'-dimethoxy-6'-nitro-3-phenyl-2,2'-spirobi[2H-1-benzopyran]; 3,3'-dimethyl-2,2'-spirobi[2H-1-benzopyran]; 6,6-dimethyl-3',3'-dimethylene-2,2'-spirobi[2H-1-benzopyran]; 3,3'-dimethylene-2,2'-spirobi[2H-1-benzopyran]; 6,6'-dinitro-3,3'-diphenyl-2,2'-spirobi[2H-1-benzopyran]; 3,3'-diphenyl-2,2'-spirobi[2H-1-benzopyran]; 3-ethyl-2,2'-spirobi[2H-1-benzopyran]; 8-fluoro-6-nitro-3'-phenyl-2,2'-spirobi[2H-1-benzopyran]; 8-iodo-6-nitro-3'-phenyl-2,2'-spirobi[2H-1-benzopyran]; 8'-methoxy-3-methyl-6-nitro-2,2'-spirobi[2H-1-benzopyran]; 8-methoxy-6-nitro-3'-phenyl-2,2'-spirobi[2H-1-benzopyran]; 8-methoxy-6'-nitro-3-phenyl-2,2'-spirobi[2H-1-benzopyran]; 8-methoxy-8'-nitro-3-phenyl-2,2'-spirobi[2H-1-benzopyran]; 8'-methoxy-6-nitro-3-phenyl-2,2'-spirobi[2H-1-benzopyran]; 3-methyl-2,2'-spirobi[2H-1-benzopyran]; 3-methyl-6-nitro-2,2'-spirobi[2H-1-benzopyran]; 6-nitro-3'-phenyl-2,2'-spirobi[2H-1-benzopyran]; 3-phenyl-2,2'-spirobi[2H-1-benzopyran]; 3,3'-tetramethylene-2,2'-spirobi[2H-1-benzopyran]; 3,3'-trimethylene-2,2'-spirobi[2H-1-benzopyran]; ; 3,3'-spirobi[3H-naphtho[2,1-b]pyran]; 2-amyl- 3,3'-spirobi[3H-naphtho[2,1-b]pyran]; 2-benzyl-3,3'-spirobi[3H-naphtho[2,1-b]pyran]; 2-butyl-3,3'-spirobi[3H-naphtho[2,1-b]pyran]; 2-chloro-3,3'-spirobi[3H-naphtho[2,1-b]pyran]; 2-chloro-8,8'-dinitro-3,3'-spirobi[3H-naphtho[2,1-b]pyran]; 2-decyl-3,3'-spirobi[3H-naphtho[2,1-b]pyran]; 8,8'-dibromo-3,3'-spirobi[3H-naphtho[2,1-b]pyran]; 2,2'-dicarboethoxy-3,3'-spirobi[3H-naphtho[2,1-b]pyran]; 2,2'-dicarbomethoxy-3,3'-spirobi[3H-naphtho[2,1-b]pyran]; 2,2'-diethyl-3,3'-spirobi[3H-naphtho[2,1-b]pyran]; 5,5'-dimethoxy-3,3'-spirobi[3H-naphtho[2,1-b]pyran]; 5,5'-dimethoxy-8,8'-dinitro-3,3'-spirobi[3H-naphtho[2,1-b]pyran]; 5,5'-dimethoxy-10,10'-dinitro-3,3'-spirobi[3H-naphtho[2,1-b]pyran]; 9,9'-dimethoxy-8,8'-dinitro-3,3'-spirobi[3H-naphtho[2,1-b]pyran]; 2,2'-dimethyl-3,3'-spirobi[3H-naphtho[2,1-b]pyran]; 2,2'-dimethyl-8,8'-dinitro-3,3'-spirobi[3H-naphtho[2,1-b]pyran]; 5,5'-dimethyl-10,10'-dinitro-3,3'-spirobi[3H-naphtho[2,1-b]pyran]; 9,9'-dimethyl-8,8'-dinitro-3,3'-spirobi[3H-naphtho[2,1-b]pyran]; 9,9-dimethyl-7,7'-dinitro-3,3'-spirobi[3H-naphtho[2,1-b]pyran]; 2-(γ,γ-dimethylallyl)-3,3'-spirobi[3H-naphtho[2,1-b]pyran]; 2,2'-dimethylene-3,3'-spirobi[3H-naphtho[2,1-b]pyran]; 7,7'-dinitro-3,3'-spirobi[3H-naphtho[2,1-b]pyran]; 8,8'-dinitro-3,3'-spirobi[3H-naphtho[2,1-b]pyran]; 9,9'-dinitro-3,3'-spirobi[3H-naphtho[2,1-b]pyran]; 10,10'-dinitro-3,3'-spirobi[3H-naphtho[2,1-b]pyran]; 8,8'-dinitro-2-methyl-3,3'-spirobi[3H-haphtho[2,1-b]pyran]; 8,8'-dinitro-2,2'-(2"methyl)trimethylene-3,3'-spirobi[3H-naphtho[2,1-b]pyran]; 8,8'-dinitro-2-phenyl-3,3'-spirobi[3H-naphtho[2,1-b]pyran]; 8,8'-dinitro-2,2'-trimethylene-3,3'-spirobi[3H-naphtho[2,1-b]pyran]; 2,2'-diphenyl-3,3'-spirobi[3H-naphtho[2,1-b]pyran]; 2-ethyl-3,3'-spirobi[3H-naphtho[2,1-b]pyran]; 2-heptyl-3,3'-spirobi[3H-naphtho[2,1-b]pyran]; 2-hexyl-3,3'-spirobi[3H-naphtho[2,1-b]pyran]; 2-isobutyl-3,3'-spirobi[3H-naphtho[2,1-b]pyran]; 2-isopropyl-3,3'- spirobi[3H-naphtho[2,1-b]pyran]; 2-methyl-3,3'-spirobi[3H-naphtho[2,1-b]pyran]; 2,2'-(2"-methyl)trimethylene-3,3'-spirobi[3H-naphtho[2,1-b]pyran]; 8'-nitro-2-phenyl-3,3'-spirobi[3H-naphtho[2,1-b]pyran]; 2-octyl-3,3'-spirobi[3H-naphtho[2,1-b]pyran]; 2-phenyl-3,3'-spirobi[3H-naphtho[2,1-b]pyran]; 2-(β-phenylethyl)-3,3'-spirobi[3H-naphtho[2,1-b]pyran]; 2-propyl-3,3'-spirobi[3H-naphtho[2,1-b]pyran]; 2,2'-tetramethylene-3,3'-spirobi[3H-naphtho[2,1-b]pyran]; 2,2'-trimethyl-3,3'-spirobi[3H-naphtho[2,1-b]pyran]; 2,2'-spirobi[2H-naphtho[1,2-b]pyran]; 3-amyl-2,2'-spirobi[2H-naphtho[1,2-b]pyran]; 6,6'-dichloro-2,2'-spirobi[2H-naphtho[1,2-b]pyran]; 7,7'-dinitro-2,2'-spirobi[2H-naphtho[1,2-b]pyran]; 8,8'-dinitro-2,2'-spirobi[2H-naphtho[1,2-b]pyran]; 9,9'-dinitro-2,2'-spirobi[2H-naphtho[1,2-b]pyran]; 10,10'-dinitro-2,2'-spirobi[2H-naphtho[1,2-b]pyran]; 3-phenyl-2,2'-spirobi[2H-naphtho[1,2-b]pyran]; 2,2'-spirobi[2H-naphtho[2,3-b]pyran]; spiro[2H-1-benzopyran-2,3'-[3H]-naphtho[2,1-b]pyran]; 2'-amylspiro[2H-1-benzopyran-2,3'-[3H]-naphtho[2,1-b]pyran]; 3-amylspiro[2H-1-benzopyran-2,3'-[3H]-naphtho[2,1-b]pyran]; 3-amyl-6-bromospiro[2H-1-benzopyran-2,3'-[3H]-naphtho[2,1-b]pyran]; 3-amyl-7-chlorospiro[2H-1-benzopyran-2,3'-[3H]-naphtho[2,1-b]pyran]; 3-amyl-6-hydroxyspiro[2H-1-benzopyran-2,3'-[3H]-naphtho[2,1-b]pyran]; 3-amyl-6-methoxyspiro[2H-1-benzopyran-2,3'-[3H]-naphtho[2,1-b]pyran]; 3-amyl-7-methoxyspiro[2H-1-benzopyran-2,3'-[3H]-naphtho[2,1-b]pyran]; 3-amyl-6-methylspiro[2H-1-benzopyran-2,3'-[3H]-naphtho[2,1-b]pyran]; 3-amyl-7-methylspiro[2H-1-benzopyran-2,3'-[3H]-naphtho[2,1-b]pyran]; 3-amyl-6-nitrospiro[2H-1-benzopyran-2,3'-[3H]-naphtho[2,1-b]pyran]; 2'-benzylspiro[2H-1-benzopyran-2,3'-[3H]-naphtho[2,1-b]pyran]; 3-benzylspiro[2H-1-benzopyran-2,3'-[3H]-naphtho[2,1-b]pyran]; 6-bromospiro[2H-1-benzopyran-2,3'-[3H]-naphtho[2,1-b]pyran]; 6-bromo-8-methoxy-3-methyl-8'-nitrospiro[2H-1-benzopyran-2,3'-[3H]-naphtho[2,1-b]pyran]; 8'-bromo-8-methoxy-3-phenylspiro[2H-1-benzopyran-2,3'-[3H]-naphtho[2,1-b]pyran]; 6-bromo-3-methyl-8'-nitrospiro[2H-1-benzopyran-2,3'-[3H]-naphtho[2,1-b]pyran]; 6-bromo-8'-nitro-3-phenylspiro[2H-1-benzopyran-2,3'-[3H]-naphtho[2,1-b]pyran]; 8'-bromo-3-phenylspiro[2H-1-benzopyran-2,3'-[3H]-naphtho[2,1-b]pyran]; 6-chloro-8-methoxy-3-methyl-8'-nitrospiro[2H-1-benzopyran-2,3'-[3H]-naphtho[2,1-b]pyran]; 6-chloro-3-methylspiro[2H-1-benzopyran-2,3'-[3H]-naphtho[2,1-b]pyran]; 6-chloro-3-methyl-8'-nitrospiro[2H-1-benzopyran-2,3'-[3H]-naphtho[2,1-b]pyran]; 8-chloro-3-methyl-8'-nitrospiro[2H-1-benzopyran-2,3'-[3H]-naphtho[2,1-b]pyran]; 6-chloro-8'-nitro-3-phenylspiro[2H-1-benzopyran-2,3'-[3H]-naphtho[2,1-b]pyran]; 7-diethylamino-3-methyl-8'-nitrospiro[2H-1-benzopyran-2,3'-[3H]-naphtho[2,1-b]pyran]; 5,7-dimethoxy-8'-nitro-3-phenylspiro[2H-1-benzopyran-2,3'-[3H]-naphtho[2,1-b]pyran]; 2',3-dimethylspiro[2H-1-benzopyran-2,3'-[3H]-naphtho[2,1-b]pyran]; 2',3'-dimethylenespiro[2H-1-benzopyran-2,3'-[3H]-naphtho[2,1-b]pyran]; 6-fluoro-3-methyl-8'-nitrospiro[2H-1-benzopyran-2,3'-[3H]-naphtho[2,1-b]pyran]; 2-isopropylspiro[2H-1-benzopyran-2,3'-[3H]-naphtho[2,1-b]pyran]; 3-isopropylspiro[2H-1-benzopyran-2,3'-[3H]-naphtho[2,1-b]pyran]; 8-methoxy-2'-methylspiro[2H-1-benzopyran-2,3'-[3H]-naphtho[2,1-b]pyran]; 8-methoxy-2'-methyl-8'-nitrospiro[2H-1-benzopyran-2,3'-[3H]-naphtho[2,1-b]pyran]; 8-methoxy-3-methyl-6-nitrospiro[2H-1-benzopyran-2,3'-[3H]-naphtho[2,1-b]pyran]; 8-methoxy-3-methyl-8°-nitrospiro[2H-1-benzopyran-2,3'-[3H]-naphtho[2,1-b]pyran]; 7-methoxy-2'-methyl-4-phenylspiro[2H-1-benzopyran-2,3'-[3H]-naphtho[2,1-b]pyran]; 7-methoxy-3-methyl-4-phenylspiro[2H-1-benzopyran-2,3'-[3H]-naphtho[2,1-b]pyran]; 8-methoxy-8'-nitro-3-phenylspiro[2H-1-benzopyran-2,3'-[3H]-naphtho[2,1-b]pyran]; 2'-methylspiro[2H-1-benzopyran-2,3'-[3H]-naphtho[2,1-b]pyran]; 3-methylspiro[2H-1-benzopyran-2,3'-[3H]-naphtho[2,1-b]pyran]; 6-methylspiro[2H-1-benzopyran-2,3'-[3H]-naphtho[2,1-b]pyran]; 3-methyl-6-nitrospiro[2H-1-benzopyran-2,3'-[3H]-naphtho[2,1-b]pyran]; 2'-methyl-4-phenylspiro[2H-1-benzopyran-2,3'-[3H]-naphtho[2,1-b]pyran]; 8'-nitro-3-(o-nitrophenyl)spiro[2H-1-benzopyran-2,3'-[3H]-naphtho[2,1-b]pyran]; 8'-nitro-3-phenylspiro[2H-1-benzopyran-2,3'-[3H]-naphtho[2,1-b]pyran]; 2'-octylspiro[2H-1-benzopyran-2,3'-[3H]-naphtho[2,1-b]pyran]; 2'-phenylspiro[2H-1-benzopyran-2,3'-[3H]-naphtho[2,1-b]pyran]; 3-phenylspiro[2H-1-benzopyran-2,3'-[3H]-naphtho[2,1-b]pyran]; 2'-(β-phenylethyl)spiro[2H-1-benzopyran-2,3'-[3H]-naphtho[2,1-b]pyran]; 3-(β-phenylethyl)spiro[2H-1-benzopyran-2,3'-[3H]-naphtho[2,1-b]pyran]; 2',3-trimethylenespiro[2H-1-benzopyran-2,3'-[3H]-naphtho[2,1-b]pyran]; spiro[2H-1-benzopyran-2,2'-[2H]-naphtho[1,2-b]pyran]; 3-amylspiro[2H-1-benzopyran-2,2'-[2H]-naphtho[1,2-b]pyran]; 3'-amylspiro[2H-1-benzopyran-2,2'-[2H]-naphtho[1,2-b]pyran]; 3-amyl-6-bromospiro[2H-1-benzopyran-2,2'-[2H]-naphtho[1,2-b]pyran]; 3-amyl-6-methoxyspiro[2H-benzopyran-2,2'-[2H]-naphtho[1,2-b]pyran]; 3-amyl-6-methylspiro[2H-1-benzopyran-2,2'-[2H]-naphtho[1,2-b]pyran]; 3-amyl-6-nitrospiro[2H-1-benzopyran-2,2'-[2H]-naphtho[1,2-b]pyran]; 6'-chloro-8-methoxy-3-phenylspiro[2H-1-benzopyran-2,2'-[2H]-naphtho[1,2-b]pyran]; 3"-methyl-4'-phenylspiro[2H-1-benzopyran-2,2'-[2H]-naphtho[1,2-b]pyran]; 3-phenylspiro[2H-1-benzopyran-2,2'-[2H]-naphtho[1,2-b]pyran]; 3'-phenylspiro[2H-1-benzopyran-2,2'-[2H]-naphtho[1,2-b]pyran]; spiro[3H-anthraceno[2,1-b]pyran-3,2'-[2H]-1-benzopyran]; spiro[2H-1-benzopyran-2,2'-[2'H]phenanthreno[2,1-b]pyran]; spiro[3H-anthraceno[2,1-b]pyran-3,3'-[3H]naphtho[2,1-b]pyran]; spiro[3H-naphtho[2,1-b]pyran-3,2'-[2'H]phenanthreno[2,1-b]pyran]; 2,2'-spirobi[2H-phenanthreno[2,1-b]pyran]; spiro[4H-1-benzopyran-4,3'-[3H]naphtho[2,1-b]pyran]; 2,3-diphenyl-7-methoxyspiro[4H-1-benzopyran-4,3'-[3H]naphtho[2,1-b]pyran]; 2,3-diphenyl-7-methoxy-8'-nitrospiro[4H-1-benzopyran-4,3'-[3H]naphtho[2,1-b]pyran]; 2,3-diphenyl-8'-nitrospiro[4H-1-benzopyran-4,3'-[3H]naphtho[2,1-b]pyran]; 7-methoxy-8'-nitro-2-phenylspiro[4H-1-benzopyran-4,3'-[3H]naphtho[2,1-b]pyran]; 6-methoxy-3-methyl-2-phenylspiro[4H-1-benzopyran-4,3'-[3H]naphtho[2,1-b]pyran]; 7-methoxy-3-methyl-2-phenylspiro[4H-1-benzopyran-4,3'-[3H]naphtho[2,1-b]pyran]; 3-(p-methoxyphenyl)-8'-nitro-2-phenylspiro[4H-1-benzopyran-4,3'-[3H]naphtho[2,1-b]pyran]; 3-methyl-2-phenylspiro[4H-1-benzopyran-4,3'-[3H]naphtho[2,1-b]pyran]; spiro[2H-naphtho[1,2-b]pyran-2,3'-[3H]-naphtho[2,1-b]pyran]; 2'-amylspiro[2H-naphtho[1,2-b]pyran-2,3'-[3H]-naphtho[2,1-b]pyran]; 3-amylspiro[2H-naphtho[1,2-b]pyran-2,3'-[3H]-naphtho[2,1-b]pyran]; 2',3-dimethyl-4-phenylspiro[2H-naphtho[1,2-b]pyran-2,3'-[3H]-naphtho[2,1-b]pyran]; 2'-3-dimethylenespiro[2H-naphtho[1,2-b]pyran-2,3'-[3H]-naphtho[2,1-b]pyran]; 2'-methyl-4-phenylspiro[2H-naphtho[1,2-b]pyran-2,3'-[3H]-naphtho[2,1-b]pyran]; 3-methyl-4-phenylspiro[2H-naphtho[1,2-b]pyran-2,3'-[3H]-naphtho[2,1-b]pyran]; 2'-phenylspiro[2H-naphtho[1,2-b]pyran-2,3'-[3H]-naphtho[2,1-b]pyran]; 3-phenylspiro[2H-naphtho[1,2-b]pyran-2,3'-[3H]-naphtho[2,1-b]pyran]; 4-phenylspiro[2H-naphtho[1,2-b]pyran-2,3'-[3H]-naphtho[2,1-b]pyran]; 2',3-trimethylenespiro[2H-naphtho[1,2-b]pyran-2,3'-[3H]-naphtho[2,1-b]pyran]; spiro[4H-napththo[1,2-b]pyran-4,3'-[3H]naphtho[2,1-b]pyran]; 3-methyl-8'-nitro-2-phenylspiro[4H-napththo[1,2-b]pyran- 4,3'-[3H]naphtho[2,1-b]pyran]; spiro[2H-1-benzopyran-2, 9'-xanthene]; 6,8-dinitrospiro[2H-1-benzopyran-2,9'-xanthene]; 3'-hydroxy-6-nitrospiro[2H-1-benzopyran-2,9'-xanthene]; 6-nitrospiro[2H-1-benzopyran-2,9'-xanthene]; 8-nitrospiro[2H-1-benzopyran-2,9'-xanthene]; spiro[3H-naphtho[2,1-b]pyran-3,9'-xanthene]; 2-methylspiro[3H-naphtho[2,1-b]pyran-3,9'-xanthene]; 8-nitrospiro[3H-naphtho[2,1-b]pyran-3,9'-xanthene]; spiro[3H-naphtho[2,1-b]pyran-3,2'-2H]pyran; 4',6'-diphenylspiro[3H-naphtho[2,1-b]pyran-3,2'-[2H]pyran; spiro[indoline-2,2'-pyrano[3,2-H]quinoline]; 6'-bromo-1,3,3-trimethylspiro[indoline-2,2'-pyrano[3,2-H]quinoline]; 5-chloro-1,3,3,6'-tetramethylspiro[indoline-2,2'-pyrano[3,2-H]quinoline]; 5-chloro-1,3,3,9'-tetramethylspiro[indoline-2,2'-pyrano[3,2-H]quinoline]; 5-chloro-1,3,3-trimethylspiro[indoline-2,2'-pyrano[3,2-H]quinoline]; 3,3-dimethyl-1-ethylspiro[indoline-2,2'-pyrano[3,2- HI quinoline]; 3,3-dimethyl-1-propylspiro[indoline-2,2'-pyrano[3,2-H]quinoline]; 1-ethyl-3,3,6'-trimethylspiro[indoline-2,2'-pyrano[3,2-H]quinoline]; 5-fluoro-1,3,3,6'-tetramethylspiro[indoline-2,2'-pyrano[3,2-H]quinoline]; 5-fluoro-1,3,3-trimethylspiro[indoline-2,2'-pyrano[3,2-H]quinoline]; 1,3,3,6',7-pentamethylspiro[indoline-2,2'-pyrano[3,2-H]quinoline]; 1,3,3,7,9'-pentamethylspiro[indoline-2,2'-pyrano[3,2-H]quinoline]; 1-propyl-3,3,6'-trimethylspiro[indoline-2,2'-pyrano[3,2-H]quinoline]; 1,3,3,7-tetramethylspiro[indoline-2,2'-pyrano[3,2-H]quinoline]; 1,3,3,9'-tetramethylspiro[indoline-2,2'-pyrano[3,2-H]quinoline]; spiro[indoline-2,3'-[3H]-naphtho[2,1-b]-1,4-oxazine]; 5-chloro-1,3,3-trimethylspiro[indoline-2,3'-[3H]-naphtho[2,1-b]-1,4-oxazine]; 1,3,3-trimethylspiro[indoline-2,3'-[3H]-naphtho[2,1-b]-1,4-oxazine]; spiro[indoline-2,2'-[2H]-pyrano[3,4-b]pyridine]; 5'-hydroxymethyl-1,3,3,8'-tetramethylspiro[indoline-2,2'-[2H]-pyrano[3,4-b]pyridine]; spiro[indoline-2,2'-[2H]-pyrano[3,2-b]pyridine]; 5-chloro-1,3,3-trimethylspiro[indoline-2,2'-[2H]-pyrano[3,2-b]pyridine]; spiro[indoline-2,2'-[2H]-pyrano[3,2-c]quinoline]; 1,3,3,5'-tetramethylspiro[indoline-2,2'-[2H]-pyrano[3,2-c]quinoline]; spiro[2H-1,4-benzoxazine-2,2'-indoline]; 1',3',3'-trimethylspiro[2H-1,4-benzoxazine-2,2'-indoline]; spiro[2H-1-benzopyran-2,2'-[2H]quinoline]; 6-bromo-3-isopropyl-1'-methylspiro[2H-1-benzopyran-2,2'-[2H]quinoline]; 6-bromo-1'-methylspiro[2H-1-benzopyran-2,2'-[2H]quinoline]; 3,3'-dimethylene-1'-methylspiro[2H-1-benzopyran-2,2'-[2H]quinoline]; 1'-ethylspiro[2H-1-benzopyran- 2,2'-[2H]quinoline]; 1'-ethyl-6-nitrospiro[2H-1-benzopyran-2,2'-[2H]quinoline]; 1'-ethyl-8-nitrospiro[2H-1-benzopyran-2,2'-[2H]quinoline]; 6-methoxy-1'-methylspiro[2H-1-benzopyran-2,2'-[2H]quinoline]; 7-methoxy-1'-methylspiro[2H-1-benzopyran-2,2'-[2H]quinoline]; 1'-methylspiro[2H-1-benzopyran-2,2'-[2H]quinoline]; 1'-methyl-6-nitrospiro[2H-1-benzopyran-2,2'-[2H]quinoline]; 1'-methyl-3,3'-trimethylenespiro[2H-1-benzopyran-2,2'-[2H]quinoline]; 6-nitro-1',3,3'-trimethylspiro[2H-1-benzopyran-2,2'-[2H]quinoline]; spiro[3H-naphtho[2,1-b]pyran-3,2'-[2H]quinoline]; 2-isopropyl-1'-methylspiro[3H-naphtho[2,1-b]pyran-3,2'-[2H]quinoline]; 1'-methylspiro[3H-naphtho[2,1-b]pyran-3,2'-[2H]quinoline]; spiro[2H-1-benzopyran-2,2'-[2H]pyridine]; 6-bromo-1'-methylspiro[2H-1-benzopyran-2,2'-[2H]pyridine]; 1',3-dimethyl-6-nitrospiro[2H-1-benzopyran-2,2'-[2H]pyridine]; 6,8-dinitro-1'-methyl-3-phenylspiro[2H-1-benzopyran-2,2'-[2H]pyridine]; 1'-ethylspiro[2H-1-benzopyran-2,2'-[2H]pyridine]; 3-ethyl-1'-methyl-6-nitrospiro[2H-1-benzopyran-2,2'-[2H]pyridine]; 1'-ethyl-6-nitrospiro[2H-1-benzopyran-2,2'-[2H]pyridine]; 1'-ethyl-8-nitrospiro[2H-1-benzopyran-2,2'-[2H]pyridine]; 7-methoxy-1'-methylspiro[2H-1-benzopyran-2.2'-[2H]pyridine]; 1'-methylspiro[2H-1-benzopyran-2,2'-[2H]pyridine]; 1'-methyl-6-nitrospiro[2H-1-benzopyran-2,2'-[2H]pyridine]; spiro[3H-naphtho[2,1-b]pyran-3,2'-[2H]pyridine]; 1'-methylspiro[3H-naphtho[2,1-b]pyran-3,2'-[2H]pyridine]; 1',4',6'-triphenylspiro[3H-naphtho[2,1-b]pyran-3,2'-[2H]pyridine]; spiro[9H-acridine-9,2'-[2H]benzopyran]; 8'-methoxy-10-methylspiro[9H-acridine-9,2'-[2H]benzopyran]; 10-methylspiro[9H-acridine-9,2'-[2H]benzopyran]; spiro[9H-acridine-9,3'-[3H]naphtho[2,1-b]pyran]; 10-methylspiro[9H-acridine-9,3'-[3H]naphtho[2,1-b]pyran]; spiro[indoline-2,2'-[2H]pyrano[2,3-b]indole]; 5-chloro-1,3,3,9'-tetramethylspiro[indoline-2,2'-[2H]pyrano[2,3-b]indole]; spiro[indoline-2,2'-[2H]pyrano[3,2-b]indole]; 5-chloro-1,3,3-trimethylspiro[indoline-2,2'-[2H]pyrano[3,2-b]indole]; spiro[indoline-2,2'-[2H]pyrano[2,3-b]benzofuran]; 1,3,3-trimethylspiro[indoline-2,2'-[2H]pyrano[2,3-b]benzofuran]; spiro[indoline-2,2'-[2H]pyrano[3,2-b]benzofuran]; 5-chloro-1,3,3-trimethylspiro[indoline-2,2'-[2H]pyrano[3,2-b]benzofuran]; spiro[2H-1-benzothieno[2,3-b]pyran-2,2'-indoline]; 5'-chloro-1',3',3'-trimethylspiro[2H-1-benzothieno[2,3-b]pyran-2,2'-indoline]; spiro[2H]-1-benzothieno[3,2-b]pyran-2,2'-indoline]; 5'-chloro-1',3',3'-trimethylspiro[2H]-1-benzothieno[3,2-b]pyran-2,2'-indoline]; spiro[3H-naphtho[2,1-b]pyran-3,9'-thioxanthene]; 4'-chloro-8-nitrospiro[3H-naphtho[2,1-b]pyran-3,9'-thioxanthene]; spiro[2H,8H-benzo[1,2-b:-3,4-b']dipyran-8-2'-indoline]-2-one; 1',3',3',4-tetramethylspiro[2H,8H-benzo[1,2-b:-3,4-b']dipyran-8-2'-indoline]-2-one; spiro[2H-1-benzopyran-2,2'-oxazoline]; 3'-methyl-6-nitro-5'-phenylspiro[2H-1-benzopyran-2,2'-oxazoline]; spiro[2H-1-benzothiopyran-2,2'-indoline]; 1,3',3'-trimethylspiro[2H-1-benzothiopyran-2,2'-indoline]; spiro[3H-naphtho[2,1-b]pyran-3,2'-thiazoline]; 4',5'-dihydro-2,3'-dimethylspiro[3H-naphtho[2,1-b]pyran-3,2'-thiazoline]; m-dithiino[5,4b:5,6-b']bis[1]benzopyranspiro[3H-naphtho[2,1-b]pyran-3,2'-thiazoline]; 6H,8H-thiopyrano[4,3-b:4,5-b']bis[1]benzopyranspiro[3H-naphtho[2,1-b]pyran-3,2'-thiazoline]; 6H,8H-bisnaphtho[1',2':5,6]pyrano[3,2-c:2',3'-d]thiopyranspiro[3H-naphtho[2,1-b]pyran-3,2'-thiazoline]; spiro[2H-1-benzopyran-2,1'-isoindoline]; 6-nitro-2',3',3'-trimethylspiro[2H-1-benzopyran-2,1'-isoindoline]; spiro[indoline-2,3'-[3H]pyrano-[3,2-a]xanthene]-12'-one; 5-chloro-3',12'-dihydro-1,3,3-trimethylspiro[indoline-2,3'-[3H]pyrano-[3,2-a]xanthene]-12'-one; spiro[benzoselenazole-2,3'-[3H]naphtho[2,1-b]pyran]; 3-ethylspiro[benzoselenazole-2,3'-[3H]naphtho[2,1-b]pyran]; and the like. Mixtures of two or more spiro compounds can also be used.

One spiro compound preferred for lightfastness and reversibility of the photochromic shift over a number of times is of the formula

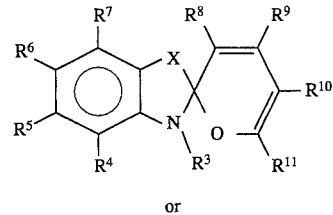

or

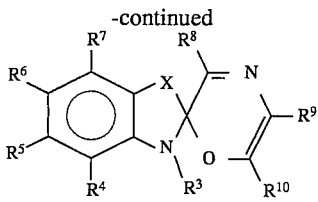

wherein X is a sulfur atom, a selenium atom, an oxygen atom, a —$CH_2$— group, a —$CHR^1$— group, or a —$CR^1R^2$— group, and wherein $R^1$, $R^2$, $R^3$, $R^4$, $R^5$, $R^6$, $R^7$, $R^8$, $R^9$, $R^{10}$, and $R^{11}$ each, independently of the others, can be (but are not limited to) hydrogen, alkyl, including cyclic alkyl groups, such as cyclopropyl, cyclohexyl, and the like, and including unsaturated alkyl groups, such as vinyl ($H_2C$=CH—), allyl ($H_2C$=CH—$CH_2$—), propynyl (HC≡C—$CH_2$—), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 20 carbon atoms and more preferably with from 1 to about 10 carbon atoms, aryloxy groups, preferably with from about 5 to about 20 carbon atoms and more preferably with from about 5 to about 10 carbon atoms, alkylthio groups, preferably with from 1 to about 20 carbon atoms and more preferably with from 1 to about 10 carbon atoms, arylthio groups, preferably with from about 5 to about 20 carbon atoms and more preferably with from about 5 to about 10 carbon atoms, aldehyde groups, ketone groups, ester groups, amide groups, carboxylic acid groups, sulfonic acid groups, and the like. Further, two or more R groups can be joined together to form a ring.

Spiropyrans, spirooxazines, and spirothiopyrans are known compounds and can be prepared as described in, for example, U.S. Pat. No. 3,293,055; U.S. Pat. No. 3,451,338; U.S. Pat. No. 3,100,778; U.S. Pat. No. 3,290,331; U.S. Pat. No. 3,231,584; U.S. Pat. No. 3,299,079; U.S. Pat. No. 3,291,604; U.S. Pat. No. 3,149,120; U.S. Pat. No. 3,022,318; U.S. Pat. No. 2,978,462; U.S. Pat. No. 3,413,234; U.S. Pat. No. 3,407,145; French Patent 1,450,583; French Patent 1,451,332; Zelichenok et al., *Macromolecules*, vol. 25, p. 3179 et seq. (1992); A. I. Kiprianov et al., *Zh. Obshch. Khim.*, vol. 17, p. 1468 (1947); E. B. Knott, *J. Chem. Soc.*, vol. 1951, p. 3038 (1951); Y. Hirshberg et al., *J. Chem. Soc.*, vol. 1955, p. 3313 (1955); C. Schiele et al., *Tetrahedron*, vol. 23, p. 3733 (1967); T. A. Shakhverdov et al., *Opt. Spektrosk.*, vol. 24, p. 619 (1968); R. Guglielmetti et al., *J. Chim. Phys.*, vol. 65, p. 454 (1968); A. Hinnen et al., *Bull. Soc. Chim. Fr.*, p. 2066 (1968); E. Berman et al., *J. Amer. Chem. Soc.*, vol. 81, p. 5605 (1959); D. P. Maisuradze et al., *Soobshch. Akad. Nauk Gruz. SSR*, vol. 50, p. 77 (1968); D. P. Maisuradze et al., *Soobshch. Akad. Nauk Gruz. SSR*, vol. 49, p. 75 (1968); T. Bercovici et al., *Mol. Photochem.*, vol. 1, p. 23 (1969); O. F. Koelsch et al., *J. Amer. Chem. Soc.*, vol. 74, p. 6288 (1952); O. Chaude, *Cahiers Phys.* (France), vol. 52, p. 39 (1954); I. Shimidzu et al., *Kogyo Kagaku Zasshi*, vol. 72, p. 171 (1969); I. Shimidzu et al., *Bull. Chem. Soc. Jap.*, vol. 42, p. 1730 (1969); I. Shimidzu et al., *Nippon Kagaku Zasshi*, vol. 88, p. 1127 (1967); I. Shimidzu, et al., *Nippon Kagaku Zasshi*, vol. 89, p. 755 (1968); C. Balny et al., *Tetrahedron Lett.*, vol. 1968, p. 5097 (1968); J. Arnaud et al., *J. Chim. Phys.*, vol. 64, p. 1165 (1967); R. Wizinger et al., *Helv. Chim. Acta*, vol. 23, p. 247 (1940); L. D. Taylor et al., *Tetrahedron Lett.*, vol. 1967, p. 1585 (1967); A. I. Nogaideli et al., *Soobshch. Akad. Nauk Gruz. SSR*, vol. 40, p. 607 (1965); E. D. Bergmann et al., *J. Amer. Chem. Soc.*, vol. 7, p. 5009 (1950); C. Schiele et al., *Angew. Chem.*, vol. 78, p. 389 (1966); C. Schiele et al., *Ann. Chem.*, vol. 696, p. 81 (1966); C. Schiele et al., *Tetrahedron Lett.*, vol. 1966, p. 4409 (1966); R. Guglielmetti et al., *Bull. Soc. Chim. Fr.*, vol. 1967, p. 2824 (1967); Z. M. Elashvili et al., *Soobshch. Aka Nauk Gruz, SSR*, vol. 52, p. 351 (1968); O. Dumenil et al., *Bull. Soc. Chim. Fr.*, vol. 1969, p. 817 (1969); P. H. Vandewijer et al., *J. Polym. Sci. Part C*, vol. 22, p. 231 (1968); A. V. Shablya et al., *Opt. Spektrosk.*, vol. 20, p. 738 (1966); H. Decker et al., *Chem. Ber.*, vol. 41, p. 2997 (1908); O. Arnold, *Z. Naturforsch.*, vol. 21b, p. 291 (1966); C. Schiele et al., *Ann. Chem.*, vol. 722, p. 162 (1969); I. M. Heilbron et al., *J. Chem. Soc.*, vol. 1931, p. 1336 (1931); A. Lowenbein et al., *Chem. Ber.*, vol. 59, p. 1377 (1926); W. Borsche et al., *Ann. Chem.*, vol. 393, p. 29 (1912); R. Dickinson et al., *J. Chem. Soc.*, vol. 1928, p. 2077 (1928); W. Dilthey et al., *J. Prakt. Chem.*, vol. 1, p. 179 (1926); R. Dickinson et al., *J. Chem. Soc.*, vol. 1927, p. 14 (1927); R. Dickinson et al., *J. Chem. Soc.*, vol. 1927, p. 1699 (1927); W. Dilthey et al., *Chem. Ber.*, vol. 61, p. 963 (1928);I. M. Heilbron et al., *J. Chem. Soc.*, vol. 1933, p. 430 (1933); I. M. Heilbron et al., *J. Chem. Soc.*, vol. 1929, p. 936 (1929); I. M. Heilbron et al., *J. Chem. Soc.*, vol. 1936, p. 1380 (1936); C. Schiele et al., *Tetrahedron Lett.*, vol. 1966, p. 4413 (1966); I. M. Heilbron et al., *J. Chem. Soc.*, vol. 1934, p. 1571 (1934); I. M. Heilbron et al., *J. Chem. Soc.*, vol. 1933, p. 1263 (1933); F. Irving, *J. Chem. Soc.*, vol. 1929, p. 1093 (1929); F. Przystal et al., *Anal. Chim. Acta*, vol. 41, p. 391 (1968); C. F. Koelsch, *J. Org. Chem.*, vol. 16, p. 1362 (1951); R. S. Becker et al., *J. Phys. Chem.*, vol. 72, p. 997 (1968); E. O. Howard et al., *J. Amer. Chem. Soc.*, vol. 82, p. 158 (1960); A. I. Nogaideli et al., *Soobshch. Akad. Nauk Gruz. SSR*, vol. 49, p. 573 (1968); A. Samat et al., *Bull. Soc., Chim. Belg.*, vol. 100, no. 9, p. 679 (1991); G. Petilion, Ph.D. Thesis, University of Brest (1979); M. Maguet, Ph.D. Thesis, University of Brest (1980); and R. Guglielmetti et al., *Bull. Soc. Chim.* France, vol 1971, p. 2039 (1971); the disclosures of each of which are totally incorporated herein by reference. Spiro compounds are also available commercially from, for example, Aldrich Chemical Company, Milwaukee, Wis., Nippon Kankoh—Shikiso Kenkyusho Co. Ltd., Okayarea, Japan, Chroma Chemicals Inc., Dayton, Ohio, and the like. Specific examples of suitable commercially available spiropyrans and spirooxazines include 27,361-9; 32,254-7; 32,255-5; 32,256-3; and 32,257-1, available from Aldrich; SP-1822; SP-98; SP-48; SP-12;, and SP-99, available from Nippon Kankoh - Shikiso Kenkyusho; and the like.

Stilbene compounds are of the general formula

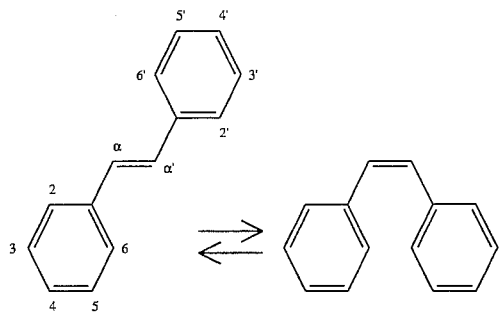

wherein substituents may be present at the 2, 3, 4, 5, 6, 2',3',4',5', and 6' positions. Examples of suitable substituents include (but are not limited to) alkyl, including cyclic alkyl groups, such as cyclopropyl, cyclohexyl, and the like, and including unsaturated alkyl groups, such as vinyl ($H_2C=CH$—), allyl ($H_2C=CH$—$CH_2$—), propynyl ($HC\equiv C$—$CH_2$—), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aidehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from I to about 30 carbon atoms and more preferably with from 1 to about 20 carbon atoms, arylthio groups, preferably with from about 5 to about 30 carbon atoms and more preferably with from about 5 to about 20 carbon atoms, aidehyde groups, ketone groups, ester groups, amide groups, carboxylic acid groups, sulfonic acid groups, and the like. Further, two or more substituents can be joined together to form a ring.

Specific examples of stilbenes include stilbene (no substituents), 3-methylstilbene, 4-methoxystilbene, 3-methoxystilbene, 4-aminostilbene, 4-fluorostilbene, 3-fluorostilbene, 4-chlorostilbene, 3-chlorostilbene, 4-bromostilbene, 3-bromostilbene, 3-iodostilbene, 4-cyanostilbene, 3-cyanostilbene, 4-acetylstilbene, 4-benzoylstilbene, 4-phenacylstilbene, 4-nitrostilbene, 3-nitrostilbene, 3-nitro-3'-methoxystilbene, 3-nitro-4-dimethylaminostilbene, 4,4'-dinitrostilbene, 4-nitro-4'-methoxystilbene, 4-nitro-3'-methoxystilbene, 4-nitro-4'-aminostilbene, 4-nitro-4'-dimethylaminostilbene, α-methylstilbene, α,α'-dimethylstilbene, α,α'-difluorostilbene, α,α'-dichlorostilbene, 2,4,6-trimethylstilbene, 2,2',4,4',6,6'-hexamethylstilbene, and the like. Stilbene compounds are well known and can be prepared as described in, for example, G. S. Hammond et al., *J. Amer. Chem. Soc.*, vol. 86, p. 3197 (:1964), W. G. Herkstroeter et al., *J. Amer. Chem. Soc.*, vol. 88, p. 4769 (1966), D. L. Beveridge et al., *J. Amer. Chem. Soc.*, vol. 87, p. 5340 (1965), D. Gegiou et al., *J. Amer. Chem. Soc.*, vol. 90, p. 3907 (1968), D. Schulte-Frohlinde et al., *J. Phys. Chem.*, vol. 66, p. 2486 (1962), S. Malkin et al., *J. Phys. Chem.*, vol. 68, p. 1153 (1964), S. Malkin et al., *J. Phys. Chem.*, vol. 66, p. 2482 (1964), H. Stegemeyer, *J. Phys. Chem.*, vol. 66, p. 2555 (1962), H. Gusten et al., *Tetrahedron Lett.*, vol. 1968, p. 3097 (1968), D. Gegiou et al., *J. Amer. Chem. Soc.*, vol. 90, p. 12 (1968), K. Kruger et al., *J. Phys. Chem.*, vol. 66, p. 293 (1969), and D. Schulte-Frohlinde, *Ann.*, vol. 612, p. 138 (1958), the disclosures of each of which are totally incorporated herein by reference.

Aromatic azo compounds which exhibit photochromism are of the general formula

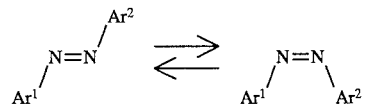

wherein $Ar^1$ and $Ar^2$ are each, independently of the other, selected from the group consisting of aromatic groups. The aromatic groups can be substituted, with examples of substituents including (but not limited to) alkyl, including cyclic alkyl groups, such as cyclopropyl, cyclohexyl, and the like, and including unsaturated alkyl groups, such as vinyl ($H_2C=CH$—), allyl ($H_2C=CH$—$CH_2$—), propynyl ($HC\equiv C$—$CH_2$—), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aidehyde groups, ketone groups, ester groups, amide groups, carboxylic acid groups, sulfonic acid groups, and the like. Alkyl, aryl, and arylalkyl substituents can also be further substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 30 carbon atoms and more preferably with from 1 to about 20 carbon atoms, arylthio groups, preferably with from about 5 to about 30 carbon atoms and more preferably with from about 5 to about 20 carbon atoms, aidehyde groups, ketone groups, ester groups, amide groups, carboxylic acid groups, sulfonic acid groups, and the like. Further, two or more substituents can be joined together to form a ring.

Examples of photochromic azo compounds include azobenzene, 2-methoxyazobenzene, 2-hydroxyazobenzene, 3-methylazobenzene, 3-nitroazobenzene, 3-methoxyazobenzene, 3-hydroxyazobenzene, 4-iodoazobenzene, 4-bromoazobenzene, 4-chloroazobenzene, 4-fluoroazobenzene, 4-methylazobenzene, 4-carbomethoxyazobenzene, 4-acetylazobenzene, 4-carboxyazobenzene, 4-cyanoazobenzene, 4-ethoxyazobenzene, 4-methoxyazobenzene, 4-nitroazobenzene, 4-acetamidoazobenzene, 4-dimethylaminoazobenzene, 4-aminoazobenzene, 4-trimethylammonium azobenzene (with any suitable anion accompanying the ammonium cation, including but not limited to $Cl^-$, $Br^-$, $I^-$, $HSO_4^-$, $SO_4^{2-}$, $NO_3^-$, $HCOO^-$, $CH_3COO^-$, $HCO_3^-$, $CO_3^{2-}$, $H_2PO_4^-$, $HPO_4^{2-}$, $PO_4^{3-}$, $SCN^-$, $BF_4^-$, $ClO_4^-$, $SSO_3^-$, $CH_3SO_3^-$, $CH_3C_6H_4SO_3^-$, $SO_3^{2-}$, $BrO_3^-$, $IO_3^-$, $ClO_3^-$, or the like, as well as mixtures thereof), 4-dimethylamino-4'-phenylazobenzene, 4-dimethylamino-4'-hydroxyazobenzene, 4,4'-bis-(dimethylamino)azobenzene, 4-dimethylamino-4'-p-aminophenylazobenzene, 4-dimethylamino-4'-p-acetamidophenylazobenzene, 4-dimethylamino-4'-p-aminobenzylazobenzene, 4-dimethylamino-4'-[13-(p-aminophenyl)ethyl]azobenzene, 4-dimethylamino-4'-mercuric acetate azobenzene, 4-hydroxyazobenzene, 2-methyl-4-hydroxyazobenzene, 4-hydroxy-4'-methylazobenzene, 2,6-dimethyl-4-hydroxyazobenzene, 2,2'- 4',6,6'-pentamethyl-4-hydroxyazobenzene, 2,6-dimethyl-2',4',6'-trichloro-4-hydroxyazobenzene, 4-hydroxy-4'-chloroazobenzene, 2,2',4',6'-tetrachloro-4-hydroxyazobenzene, 3-sulfonate-4-hydroxyazobenzene, 2,2'-dimethoxyazobenzene, 3,3'-dinitroazobenzene, 3,3'-dimethylazobenzene, 4,4'-dimethylazobenzene, 4,4'-dimethoxyazobenzene, 4,4'-dinitroazobenzene, 4,4'-dichloroazobenzene, 2,4-dimethoxyazobenzene, 2,6-dimethoxyazobenzene, 4-nitro-4'-methoxyazobenzene, 2,4,6-trimethylazobenzene, 2,3'-dimethoxy-4'-isobutyramidoazobenzene, 2,2',4,4',6,6'-hexamethylazobenzene, 2-hydroxy-5-methylazobenzene, 3,3'-disulfonateazobenzene, 4-methoxy-3'-sulfonateazobenzene, 4-methoxy-4'-sulfonateazobenzene, 2,4-dimethoxy-4'-sulfonateazobenzene, 2,2',4-trimethoxy-5'-sulfonateazobenzene, 4,4'-dimethoxy-3,3'-dicarboxylateazobenzene, 2,2'-azopyridine, 3,3'-azopyridine, 4,4'-azopyridine, 2-phenylazopyridine, 3-phenylazopyridine, 4-phenylazopyridine, 6,6'-azoquinoline, 1-phenylazonaphthalene, 1,1-azonaphthalene, a,2'-azonaphthalene, 2,2'-azonaphthalene, 1-phenylazo-4-naphthol, 1-phenylazo-4-methoxynaphthalene, 3-phenylazo-2-naphthol, 3-phenylazo-2-methoxynaphthalene, 1-(o-hydroxyphenylazo)-2-naphthol, 4-phenylazo-1-naphthylamine, 1-phenylazo-2-naphthylamine, and the like. Polymeric azo materials are also suitable. Aromatic azo compounds are well known and can be prepared as described in, for example, A. Natansohn et al., *Macromolecules*, vol. 25, p. 2268 (1992); G. Zimmerman et al., *J. Amer. Chem. Soc.*, vol. 80, p. 3528 (1958); W. R. Brode, in *The Roger Adams Symposium*, p. 8, Wiley (New York 1955); D. Gegiou et al., *J. Amer. Chem. Soc.*, vol. 90, p. 3907 (1968); S. Malkin et al., *J. Phys. Chem.*, vol. 66, p. 2482 (1962); D. Schulte-Frohlinde, *Ann.*, vol. 612, p. 138 (1958); E. I. Stearns, *J. Opt. Soc. Amer.*, vol. 32, p. 382 (1942); W. R. Brode et al., *J. Amer. Chem. Soc.*, vol 74, p. 4641 (1952); W. R. Brode et al., *J. Amer. Chem. Soc.*, vol 75, p. 1856 (1953); E. Fischer et al., *J. Chem. Phys.*, vol. 27, p. 328 (1957); G. Wettermark et al., *J. Amer. Chem. Soc.*, vol. 87, p. 476 (1965); G. Gabor et al., *J. Phys. Chem.*, vol. 72, p. 3266 (1968); M. N. Inscoe etal., *J. Amer. Chem. Soc.*, vol 81, p. 5634(1959); E. Fischeretal., *J. Chem. Soc*, vol. 1959, p. 3159 (1959); G. Gabor et al., *J. Phys. Chem.*, vol. 66, p. 2478 (1962); G. Gabor et al., *Israel J. Chem.*, vol. 5, p. 193 (1967); D. Bullock et al., *J. Chem. Soc.*, vol. 1965, p. 5316 (1965); R. Lovrien et al., *J. Amer. Chem. Soc*, vol 86, p. 2315 (1964); J. H. Collins et al., *J. Amer. Chem. Soc*, vol. 84, p. 4708 (1962); P. P. Birnbaum et al., *Trans. Faraday Soc.*, vol. 50, p. 1192 (1954); M. Frankel et al., *J. Chem. Soc.*, vol. 1955, p. 3441 (1955); E. Fischer et al., *J. Chem. Phys.*, vol. 23, p. 1367 (1955); E. Fischer, *J. Amer. Chem. Soc.*, vol. 82, p. 3249 (1960); H. Sterk et al., *Monatsch. Chem.*, vol. 99, p. 297 (1968); A. H. Cook et al., *J. Chem. Soc.*, vol. 1939, p. 1315 (1939); A. H. Cook et al., *J. Chem. Soc.*, vol. 1939, p. 1309 (1939); N. Campbell et al., *J. Chem. Soc.*, vol. 1953, p. 1281 (1953); P. P. Birnbaum et al., *Trans. Faraday Soc.*, vol. 49, p. 735 (1953); R. Lefevre et al., *J. Chem. Soc.*, vol. 1953, p. 867 (1953); G. S. Hartley, *J. Chem. Soc.*, vol. 1938, p. 633 (1938); J. H. Gould etal., *J. Opt. Soc. Amer.*, vol. 42, p. 380 (1952); G. Gabor et al., *J. Phys. Chem.*, vol. 72, p. 153 (1968); R. Lefevre et al., *J. Chem. Soc.*, vol. 1951, p. 1814(1951); M. A. Horowitz et al., *J. Amer. Chem. Soc.*, vol. 77, p. 5011(1955); and A. Winkel et al., *Ber.*, vol. 74B, p. 670 (1940), the disclosures of each of which are totally incorporated herein by reference.

Bisimidazoles are of the general formula

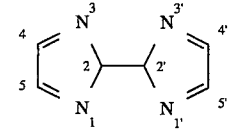

wherein substituents can be present on the 2, 4, 5, 2',4', and 5' positions. examples of substituents include (but are not limited to) alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from-about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aidehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 30 carbon atoms and more preferably with from 1 to about 20 carbon atoms, arylthio groups, preferably with from about 5 to about 30 carbon atoms and more preferably with from about 5 to about 20 carbon atoms, aidehyde groups, ketone groups, ester groups, amide groups, carboxylic acid groups, sulfonic acid groups, and the like. Further, two or more substituents can be joined together to form a ring.

Specific examples of photochromic bisimidazoles include 2,2',4,4',5,5'-hexaphenyl bisimidazole, 2,2',4,4',5,5'-hexa-p-tolyl bisimidazole, 2,2',4,4',5,5'-hexa-p-chlorophenyl bisimidazole, 2,2'-di-p-chlorophenyl-4,4',5,5'-tetraphenyl bisimidazole, 2,2'-di-p-anisyl-4,4',5,5'-tetraphenyl bisimidazole, and the like. Bisimidazole compounds are known, and can be prepared as described in, for example, T. Hayashi et al., *Bull. Chem. Soc.* Jap., vol. 33, p. 565 (1960), T. Hayashi et al., *J. Chem. Phys.*, vol. 32, p. 1568 (1960), T. Hayashi et al., *Bull. Chem. Soc.* Jap., vol. 38, p. 2202 (1965), and D. M. White et al., *J. Org. Chem.*, vol. 29, p. 1926 (1964), the disclosures of each of which are totally incorporated herein by reference.

Bis-tetraphenylpyrrole is of the formula

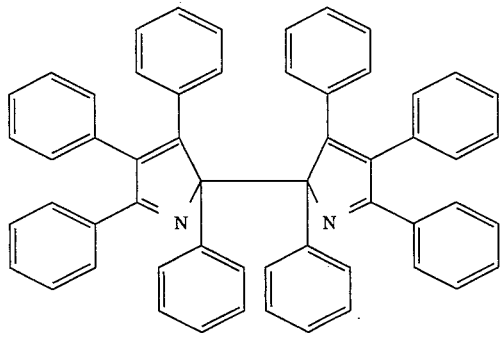

and can be prepared as disclosed in, for example, S. M. Blinder et al., *J. Chem. Phys.*, vol. 36, p. 540 (1962) and in G. Rio et al., *Acad. Sci., Paris*, Ser. C, vol. 263, p. 634 (1967), the disclosures of each of which are totally incorporated herein by reference.

Hydrazines are of the general formula

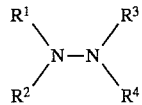

wherein $R^1$, $R^2$, $R^3$, and $R^4$ each, independently of the others, can be hydrogen, alkyl, preferably with from 1 to about 50 carbon atoms and more preferably with from 1 to about 30 carbon atoms, aryl, preferably with from about 5 to about 30 carbon atoms and more preferably with from about 5 to about 20 carbon atoms, and arylalkyl, preferably with from about 6 to about 50 carbon atoms and more preferably with from about 6 to about 30 carbon atoms. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 30 carbon atoms and more preferably with from 1 to about 20 carbon atoms, arylthio groups, preferably with from about 5 to about 30 carbon atoms and more preferably with from about 5 to about 20 carbon atoms, aidehyde groups, ketone groups, ester groups, amide groups, carboxylic acid groups, sulfonic acid groups, and the like. Further, two or more R groups can be joined together to form a ring.

Specific examples of hydrazines include hydrazine (wherein $R^1$, $R^2$, $R^3$, and $R^4$ are each hydrogen), 1,2-diphenylhydrazine, tetraphenylhydrazine, and the like. Hydrazines are well known and can be prepared as described in, for example, G. N. Lewis et al., *J. Amer. Chem. Soc.*, vol 64, p. 2801 (1942), D. A. Ramsay, *J. Phys. Chem.*, vol. 57, p. 415 (1953), P. F. Holt et al., *J. Chem. Soc.*, v. 1955, p. 98 (1955), and J. Weiss, *Trans. Faraday Soc.*, vol. 36, p. 856 (1940), disclosures of each of which are totally incorporated herein by reference.

Aryl disulfides are of the general formula

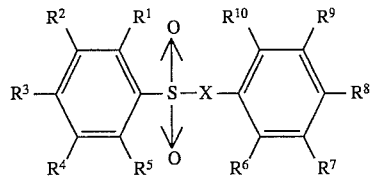

wherein X is a sulfur atom, an oxygen atom, or an $SO_2$ group and $R^1$, $R^2$, $R^3$, $R^4$, $R^5$, $R^6$, $R^7$, $R^8$, $R^9$, and Rio each, independently of the others, can be hydrogen, alkyl, preferably with from 1 to about 50 carbon atoms and more preferably with from 1 to about 30 carbon atoms, aryl, preferably with from 5 to about 30 carbon atoms and more preferably with from about 5 to about 20 carbon atoms, arylalkyl, preferably with from about 6 to about 50 carbon atoms and more preferably-with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups,. preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aidehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 30 carbon atoms and more preferably with from 1 to about 20 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Further, two or more R groups can be joined together to form a ring.

Specific examples of aryl disulfide compounds include

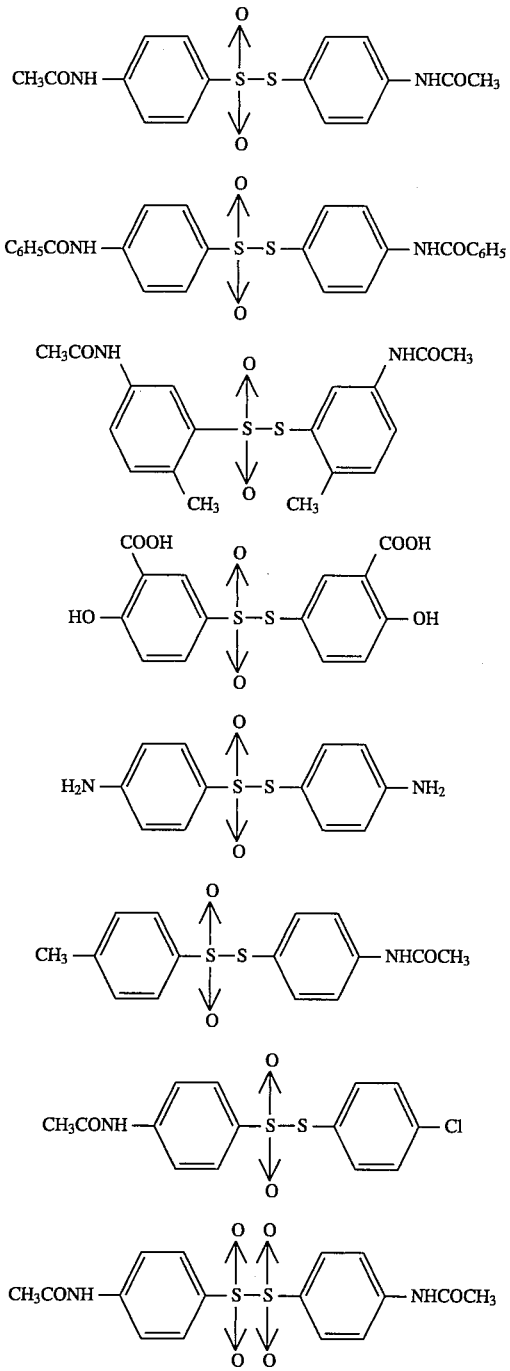

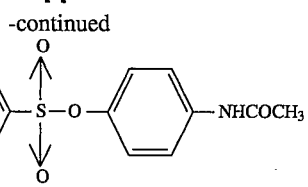

and the like. Aryl disulfide compounds are known, and can be prepared as described in, for example, C. M. Bere et al., *J. Chem. Soc.*, vol. 1924, p. 2359 (1924) and in R. Child et al., *J. Chem. Soc.*, vol. 1926, p. 2697 (1926), the disclosures of each of which are totally incorporated herein by reference.

Also suitable are compounds that exhibit tautomeric photochromic phenomena. Examples of these materials include those that undergo photochromic valence tautomerism, those that undergo hydrogen transfer, including keto-enol phototautomerism, aci-nitro phototautomerism, and those that undergo other forms of phototautomerism, such as the naphthacenequinones and their substituted derivatives, as well as polymers containing these moieties, which undergo photochromic transformation between the trans and ana forms as follows:

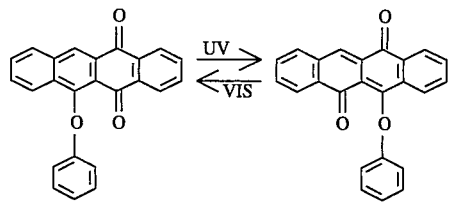

as disclosed in, for example, F. Buchholtz et al., *Macromolecules*, vol. 26, p. 906 (1993), the disclosure of which is totally incorporated herein by reference. Examples of suitable substituents include alkyl, preferably with from 1 to about 50 carbon atoms and more preferably with from 1 to about 30 carbon atoms, aryl, preferably with from 5 to about 30 carbon atoms and more preferably with from about 5 to about 20 carbon atoms, arylalicyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Alkyl, aryl, and arylalkyl substituents can also be further substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Further, two or more substituents can be joined together to form a ring.

Mixtures of two or more photochromic materials can also be employed.

Additional information regarding photochromic materials and the preparation and characterization thereof is disclosed in, for example, *Techniques of Chemistry*, Vol. 3: *Photochromism*, A. Weissberger and G. Brown, ed., John Wiley & Sons (New York 1971), and in *Photochromism: Molecules and Systems*, H. Durr and H. Bouas-Laurent, ed., Elsevier (New York 1990), the disclosures of each of which are totally incorporated herein by reference. Photochromic materials are also available from, for example, Aldrich Chemical Company, Milwaukee, Wis. (including 5480-8; 13,993-9; 26,813-5; 10,655-0; 30,832-3; 5492-1; 15,073-8; 21,515-5; 12,672-1; 39,026-7; and the like), Eastman Kodak Company, Rochester, N.Y. (including 1817; 13080; 704; 9439; 11012; 902; and the like), Lancaster Synthesis Inc., Windham, N.H. (including 2002; 4555; 4956; 4364; and the like), Fluka Chemika-BioChemika, Buchs, Switzerland (including 85868; 85870; 85875; 12801; and the like) and the like.

Preferred photochromic materials do not decompose at the operating temperatures of the ink jet printing process and are compatible with (i.e., dissolve or disperse uniformly in) the selected ink vehicle.

The photochromic material is present in the ink in any effective amount. Typically, the photochromic material is present in the ink in an amount of from about 1 to about 50 percent by weight, preferably from about 1 to about 10 percent by weight, and more preferably from about 5 to about 10 percent by weight, although the amount can be outside these ranges.

Optionally, a propellant may be contained in the inks of the present invention, and a propellant is particularly preferred when the inks are intended for use in thermal ink jet printing processes. Suitable propellants for the hot melt inks of the present invention, present in any effective amount, typically from about 10 to about 90 percent by weight and preferably from about 20 to about 50 percent by weight, generally have melting points of from about 50° to about 150° C., and preferably from about 80620 to about 120° C. Although greater melting points are acceptable, they are generally not preferred because they may reduce printhead lifetime. In another embodiment, the propellants generally have a boiling point of from about 180° to about 250° C., preferably from about 200° to about 230° C. Preferably, the melting point and the boiling point of the propellant are separated by at least 100° C. Further, the surface tension of the propellant in its liquid state at the operating temperature of the ink preferably should be from about 20 to about 65 dynes per centimeter, and more preferably from about 40 to about 65 dynes per centimeter to enhance refill rates, paper wetting, and color mixing. In addition, the propellants preferably should have a viscosity at the operating temperature of the ink of from about 1 to about 20 centipoise, and more preferably from about 1 to about 5 centipoise to enhance refill, jettability, and substrate penetration. The critical pressure of the propellant preferably should be from about 40 to about 218 atmospheres, and more preferably from about 60 to about 218 atmospheres to enhance drop velocity. The propellant should also be thermally stable in its molten state so that it does not undergo decomposition to yield gaseous products or to form heater deposits.

Examples of suitable propellants for the hot melt inks of the present invention include water; hydrazine; alcohols, such as ethanol, propanol, butanol, 2,5-dimethyl-2,5-hexanediol, 3-hydroxy benzyl alcohol, and the like; cyclic amines and ureas, including 1,3-dimethyl urea, such as imidazole, substituted imidazoles, including 2-imidazolidone, 2-ethyl imidazole, 1,2,4-triazole, and the like, pyrazole and substituted pyrazoles, including 3,5-dimethyl pyrazole and the like; pyrazine; carboxylic acids; sulfonic acids; aldehydes and ketones; hydrocarbons, such as biphenyl, hexane, benzene; esters; phenols, including phenol, dichlorophenol, other halogen substituted phenols, and cresols; amides, such as propionamide, lactamide, and the like; imides; halocarbons; urethanes; ethers; sulfones, including dimethyl sulfone, methyl sulfone, diethyl sulfone, and diphenyl sulfone; sulfamides, such as methyl sulfamide; sulfonamides, such as ortho, para-toluenesulfonamide, methyl sulfonamide, and the like; phosphites; phosphonates; phosphates; alkyl sulfides, such as methyl sulfide; alkyl acetates, such as methyl acetate; sulfur dioxide; alkylene carbonates, such as propylene carbonate; succinimide; and the like. Preferred propellants include water, imidazole, imidazoles substituted with hydrocarbon, keto, or hydroxyl substituents, pyrazine, pyrazole, and pyrazoles substituted with hydrocarbon, keto, or hydroxyl substituents. These compounds are five-membered heterocyclic rings, preferably with a molecular weight of about 60. Also preferred are sulfones, such as dimethyl sulfone, diethyl sulfone, diphenyl sulfone, and the like. In addition, methyl sulfamide, succinimide, and propionamide are preferred propellants.

Optionally, the hot melt inks of the present invention can contain a colorant in addition to the photochromic material. If present, the colorant is present in any desired amount, typically from about 0.5 to about 10 percent by weight of the ink vehicle/propellant mixture and preferably from about 3 to about 5 percent by weight of the ink vehicle/propellant mixture, although the amount can be outside these ranges. Examples of suitable colorants include pigments and dyes, with solvent dyes being preferred. Any dye or pigment may be chosen, provided that it is capable of being dispersed or dissolved in the ink vehicle and is compatible with the other ink components. Examples of suitable pigments include Violet Toner VT-8015 (Paul Uhlich), Normandy Magenta RD-2400 (Paul Uhlich), Paligen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), Heliogen Blue L6900, L7020 (BASF), Heliogen Blue K6902, K6910 (BASF), Heliogen Blue D6840, D7080 (BASF), Sudan Blue OS (BASF), Neopen Blue FF4012 (BASF), PV Fast Blue B2G01 (American Hoechst), Irgalite Blue BCA (Ciba-Geigy), Paliogen Blue 6470 (BASF), Sudan III (red orange) (Matheson, Coleman, Bell), Sudan II (orange) (Matheson, Coleman, Bell), Sudan IV (orange) (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FGL (Hoechst), Permanent Yellow YE 0305 (Paul Uhlich), Lumogen Yellow D0790 (BASF), Suco-Gelb L1250 (BASF), Suco-Yellow D1355 (BASF), Sico Fast Yellow D1355, D1351(BASF), Hostaperm Pink E (American Hoechst), Fanal Pink D4830 (BASF), Cinquasia Magenta (DuPont), Paliogen Black L0084 (BASF), Pigment Black K801 (BASF), and carbon blacks such as Regal 330®(Cabot), Carbon Black 5250 and Carbon Black 5750 (Columbian Chemicals Company). Suitable dyes for the inks of the present invention include Pontamine; Food Black 2; Carodirect Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red $H_8B$ (Reactive Red 31), available from ICI America; Pylam Certified D&C Red #28 (Acid Red 92), available from Pylam; Direct Brill Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc., and the like. Particularly preferred are solvent dyes, and within the class of solvent dyes, spirit soluble dyes are preferred because of their high compatibility with ink vehicle materials. Examples of suitable spirit solvent dyes include Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow 6D 167, Cartasol Brilliant Yellow 4GF (Sandoz), Pergasol Yellow CGP (:Ciba-Geigy), Orasol Black RL (:Ciba-Geigy), Orasol Black RLP (Ciba-Geigy), Savinyl Black RLS (Sandoz), Dermacarbon 2GT (Sandoz), Pyrazol Black BG (ICI), Morfast Black Conc A (Morton-Thiokol), Diazol Black RN Quad (ICI), Orasol Blue GN (Ciba-Geigy), Savinyl Blue GLS (Sandoz), Luxol Blue MBSN (Morton-Thiokol), Sevron Blue 56M F (ICI), Basacid Blue 750 (BASF), and the like.

The optional colorant can be present in the ink in any amount to obtain the desired color, hue, and intensity for the ink composition. Typically the colorant is present in an amount of at least about 0.05 percent by weight of the ink, and preferably from about 0.1 to about 20 percent by weight of the ink, although the amount can be outside these ranges.

Optionally, the hot melt ink composition may contain a biocide in any effective amount, typically from about 0.1 to about 1.0 percent by weight, although the amount can be outside this range; a biocide is not as neccesary an ingredient for hot melt inks as it is for liquid inks. Suitable biocides include sorbic acid, 1-(3-chloroallyl)-3,5,7-triaza-1-azoniaadamantane chloride, commercially available as Dowicil 200 (Dow Chemical Company, Midland, Mich.), vinylene-bis thiocyanate, commercially available as Cytox 3711 (American Cyanamid Company, Wayne, N.J.), disodium ethylenebis-dithiocarbamate, commercially available as Dithone D14 (Rohm & Haas Company, Philadelphia, Pa.), bis (trichloromethyl) sulfone, commercially available as Biocide N-1386 (Stauffer Chemical Company, Westport, Conn.), zinc pyridinethione, commerically available as zinc omadine (Olin Corporation Stamford, Conn.), 2-bromo-t-nitropropane-1,3-diol, commercially available as onyxide 500 (Onyx Chemical Company, Jersey City, N.J.), Bosquat MB50 (Louza, Inc., Fairtown, N.J.), and the like. In addition, other optional additives such as dispersing agents or surfactants may be present in the ink, typically in amounts of from about 0.01 to about 20 percent by weight, although the amount can be outside this range. Further, plasticizers such as pentaerythritol tetrabenzoate, commerically available as Benzoflex S552 (Velsicol Chemical Corporation, Chicago, Ill.), trimethyl titrate, commercially available as Citroflex 1 (Monflex Chemical Company, Greensboro, N.C.), N,N-dimethyl oleamide, commercially available as Halcomid M-18-OL (C. P. Hall Company, Chicago, Ill.), and the like, may be added to the ink vehicle, and may constitute from about 1 to 100 percent of the ink vehicle component of the ink. Plasticizers can either function as the ink vehicle or can act as an agent to provide compatibility between the ink propellant, which generally is polar, and the ink vehicle, which generally is non-polar.

Hot melt ink compositions of the present invention are generally prepared by combining all of the ingredients, heating the mixture to its melting point, which typically is from about 80° to about 120° C., and stirring the mixture for from about 5 seconds to about 10 minutes to obtain a homogeneous, uniform melt. When pigments are the selected colorants, the molten mixture may be subjected to grinding in an attritor or ball mill apparatus to effect dispersion of the pigment in the ink vehicle. In addition, a compatible blend can be obtained by dissolving the photochromic material and the vehicle in a good solvent for both components. The photochromic material is dissolved in the solvent (typically in a concentration of from about 0.5 to about 5 percent by weight solids; the total solids concentration of the photochromic material and the vehicle is limited by solubility and viscosity, with typical ranges for total solids concentrations being up to about 50 percent by weight, and more typically up to about 20 percent by weight; excessive viscosities may make stirring difficult) using any conventional stirring method. The vehicle may be initially present in the solvent and stirred with the photochromic material. Alternatively, the vehicle can be added to the solvend and mixed after the photochromic material has been dissolved. The stirring steps generally can be carried out at room temperature. The solvent may have a single component or be a mixture. After the photochromic material and the vehicle are mixed, the solvent is removed.

Printed images may be generated with the inks of the present invention by incorporating the inks into a continuous stream or piezoelectric ink jet printer and causing droplets of the molten ink to be ejected in imagewise pattern onto a substrate such as paper or transparency material. Printed images may also be generated with the inks of the present invention by incorporating the inks into a thermal ink jet printer and causing droplets of the molten ink to be ejected in imagewise pattern onto a substrate such as paper or transparency material. Suitable printers for employing the inks of the present invention include commercially available ink jet printers, such as the ThinkJet®, PaintJet®, and DeskJet® printers available from Hewlett-Packard Company. Conventional ink jet printers may be modified to make them suitable for use with hot melt inks by including a means for heating the ink reservoir to the melting point of the ink. The inks of the present invention are also suitable for use in piezoelectric drop-on-demand ink jet printing systems and in continuous stream ink jet printing systems that have been modified to be suitable for use with hot melt inks.

The images printed with the inks of the present invention are photochromic in that they have a first state corresponding to a first absorption spectrum and a second state corresponding to a second absorption spectrum. Another embodiment of the present invention is directed to a process which comprises (1) incorporating into an ink jet printing apparatus an ink composition which comprises (a) an ink vehicle, said ink vehicle being a solid at about 25° C. and having a viscosity of from about 1 to about 20 centipoise at a temperature suitable for hot melt ink jet printing, said temperature being greater than about 45° C., (b) a photochromic material having a first state corresponding to a first absorption spectrum and a second state corresponding to a second absorption spectrum, (c) an optional colorant, and (d) an optional propellant; (2) forming images by melting the ink and causing the melted ink to be expelled in droplets onto a substrate, thereby generating an image on the substrate; and (3) thereafter effecting a photochromic change in at least some of the photochromic material on the substrate from the first state to the second state.

The photochromic shift from the first state to the second state can be effected by any method suitable for the photochromic material or materials selected for the marking material. Examples of methods for inducing the photochromic shift include irradiation with radiation of a suitable wavelength, typically from about 200 to about 400 nanometers, although the wavelength can be outside this range. The reverse photochromic effect can be induced by irradiation with visible light, typically in the wavelength range of from about 400 to about 700 nanometers, although the wavelength can be outside this range, or by the application of heat.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Ink compositions of the present invention with the following ingredients are prepared by melt mixing the photochromic material with the ink vehicle, and specifically by heating the mixture to a temperature slightly beyond the temperature at which the mixture melts, stirring until a homogeneous melt mixture is obtained, and subsequently cooling the mixture to room temperature. The ink compositions are then incorporated into a piezoelectric phase-change ink jet printer such as a Tektronix Phaser™ 340. The ink typically is heated to a temperature of from about 100620 to about 130° C. An electric pulse from the printhead propels droplets of the ink onto the substrate (such as paper) in an imagewise fashion. This particular printer has cold-pressure fusing to smooth out the image. The viscosity of the ink compositions at the heated temperature typically is less than about 20 centipoise.

Ink 1: 5.0 percent by weight 1'-octadecyl-3',3'-dimethyl-5'-methyl-6-nitro-8-(docosanoyloxymethyl) spiro [2H-1-benzopyran-2,2'-indoline], available from Nippon Kanko-Shikiso Kenkyusho Company, of the formula

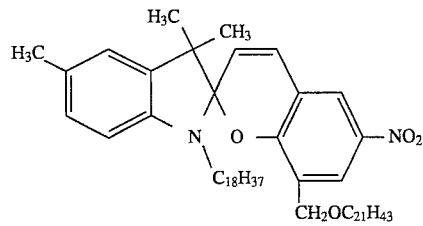

and 95.0 percent by weight Petrolite CA-11, a urethane derivative of oxidized synthetic or petroleum waxes, available from Petrolite Corporation Polymers Division Headquarters, Tulsa, Okla. It is believed that the image formed by this ink will be faint orange or faint red in color. Upon subsequent irradiation with a Blak Ray longwave UV lamp (model B-100A, San Gabriel, Calif.), it is believed that the print pattern will appear purple. Thereafter, it is believed that exposure of the print pattern to incandescent light will return the print to its original appearance.

Ink 2: 5.0 percent by weight 1'-octadecyl-3',3'-dimethyl-5'-methyl-6-nitro-8-(docosanoyloxymethyl) spiro [2H-1-benzopyran-2,2'-indoline], available from Nippon Kanko-Shikiso Kenkyusho Company, and 95.0 percent by weight Unithox 420, an ethoxylated alcohol available from Petrolite Corporation Polymers Division Headquarters, Tulsa, Okla. It is believed that the image formed by this ink will be faint orange or faint red in color. Upon subsequent irradiation with a Blak Ray longwave UV lamp (model B-100A, San Gabriel, Calif.), it is believed that the print pattern will appear purple. Thereafter, it is believed that exposure of the print pattern to incandescent light will return the print to its original appearance.

Ink 3: 8.0 percent by weight 1-octadecyl-3,3-dimethyl-spiro [2H-indole-2,3'-[3H]naphth[2,1b]-[1,4]oxazine, of the formula

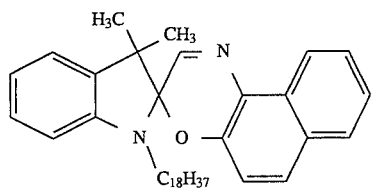

and 92 percent by weight Unithox 480, an ethoxylated alcohol available from Petrolite Corporation Polymers Division Headquarters, Tulsa, Okla. It is believed that the image formed by this ink will be colorless. Upon subsequent irradiation with a Blak Ray longwave UV lamp (model B-100A, San Gabriel, Calif.), it is believed that the print pattern will appear blue. Thereafter, it is believed that exposure of the print pattern to incandescent light will return the print to its original appearance.

Ink 4: 5.0 percent by weight 1,3-dimethyl-3-hexadecyl-8'-nitrospiro-(indoline 2,3'-)3H)-naphtho (2,1b)-pyran), prepared as disclosed in, for example, M. Morin et al., *Can. J. Chem.*, vol. 58, p. 2038 (1980), the disclosure of which is totally incorporated herein by reference, of the formula

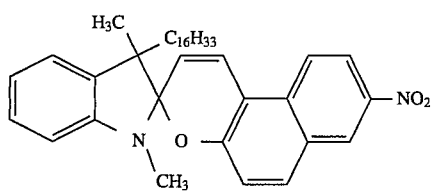

and 95.0 percent by weight Ceramer 1608, a modified maleic anhydride hydrocarbon adduct of polyolefins prepared by graft copolymerization, available from Petrolite Corporation Polymers Division Headquarters, Tulsa, Okla. It is believed that the image formed by this ink will be colorless. Upon subsequent irradiation with a Blak Ray longwave UV lamp (model B-100A, San Gabriel, Calif.), it is believed that the print pattern will appear colored. Thereafter, it is believed that exposure of the print pattern to incandescent light will return the print to its original appearance.

Ink 5: 7.0 percent by weight 1'-octadecyl-3',3'-dimethyl-5'-methyl-6-nitro-8-(docosanoyloxymethyl) spiro [2H-1-benzopyran-2,2'-indoline], available from Nippon Kanko-Shikiso Kenkyusho Company, and 93.0 percent by weight Ceramer 5005, a modified maleic anhydride hydrocarbon adduct of polyolefins prepared by graft copolymerization, available from Petrolite Corporation Polymers Division Headquarters, Tulsa, Okla. It is believed that the image formed by this ink will be faint orange or faint red in color. Upon subsequent irradiation with a Blak Ray longwave UV lamp (model B-100A, San Gabriel, Calif.), it is believed that the print pattern will appear purple. Thereafter, it is believed that exposure of the print pattern to incandescent light will return the print to its original appearance.

EXAMPLE II

Ink compositions of the present invention with the following ingredients are prepared by melt mixing. The mixture is heated to a temperature slightly beyond the temperature at which the mixture melts, stirred until a homogeneous melt mixture is obtained, and subsequently cooled to room temperature. The material is then jetted onto Xerox®4024 paper and onto polysulfone transparency material by incorporating it into a thermal ink jet printing test fixture equipped with a Hewlett-Packard DeskJet® printhead modified with an aluminum block heater inserted into the cartridge. It is believed that the images formed by these inks will be faint orange or faint red in color. Upon subsequent irradiation with a Blak Ray longwave UV lamp (model B-100A, San Gabriel, Calif.), it is believed that the print patterns will appear purple. Thereafter, it is believed that exposure of the print patterns to incandescent light will return the prints to their original appearance.

Ink 6: 57.0 percent by weight decyl sulfone, 38.0 percent by weight imidazole, and 5.0 percent by weight 1'-octadecyl-3',3'-dimethyl-5'-methyl-6-nitro-8-(docosanoyloxymethyl) spiro [2H-1-benzopyran-2,2'-indoline], available from Nippon Kanko-Shikiso Kenkyusho Company.

Ink 7: 32.0 percent by weight Unithox 720, 27.0 percent by weight Unithox 550, 8.0 percent by weight palmitic acid, 27.0 percent by weight dimethyl sulfone, and 6.0 percent by weight 1'-octadecyl-3',3'-dimethyl-5'-methyl-6-nitro-8-(docosanoyloxymethyl) spiro [2H-1-benzopyran-2,2'-indoline], available from Nippon Kanko-Shikiso Kenkyusho Company.

Other embodiments and modifications of the present invention may occur to those skilled in the art subsequent to a review of the information presented herein. These embodiments and modifications, as well as equivalents thereof, are also included within the scope of this invention.

What is claimed is:

1. A hot melt ink composition comprising (a) an ink vehicle, said ink vehicle being a solid at about 25° C. and having a viscosity of from about 1 to about 20 centipoise at a temperature suitable for hot melt ink jet printing, said temperature being greater than about 45° C., (b) a photochromic material selected from the group consisting of spiropyrans, spirooxazines, spirothiopyrans, bis-imidazole compounds, bis-tetraphenyl pyrroles, hydrazine compounds, aryl disulfide compounds, stilbene compounds, photoisomerizable azo compounds, naphthacenequinones, and mixtures thereof, (c) an optional colorant, and (d) an optional propellant.

2. A hot melt ink according to claim 1 wherein the ink vehicle contains a material selected from the group consisting of ethylene/propylene copolymers, urethane derivatives of oxidized synthetic or petroleum waxes, n-paraffinic hydrocarbons, branched paraffinic hydrocarbons, naphthenic hydrocarbons, highly branched hydrocarbons prepared by olefin polymerization, ethoxylated alcohols, high molecular weight linear alcohols, hydrocarbon-based waxes, modified maleic anhydride hydrocarbon adducts of polyolefins prepared by graft copolymerization, mixtures of monoamides and tetraamides, and mixtures thereof.

3. A hot melt ink composition comprising (a) an ink vehicle, said ink vehicle being a solid at about 25° C. and having a viscosity of from about 1 to about 20 centipoise at a temperature suitable for hot melt ink jet printing, said temperature being greater than about 45° C., (b) a photochromic material, (c) an optional colorant, and (d) an optional propellant, wherein the ink vehicle contains a material selected from the group consisting of (a) those of the general formula

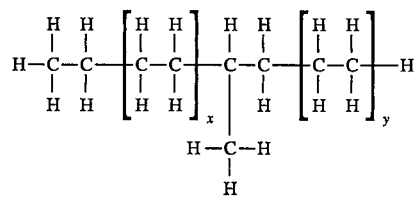

wherein y is an integer of from 0 to about 10 and x=21-y, (b) those of the general formulae

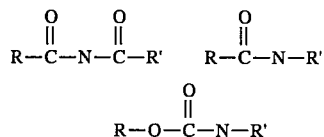

wherein R is an alkyl group of the formula $CH_3(CH_2)_n$ wherein n is an integer of from about 20 to about 200 and R' is a tolyl group, (c) n-paraffinic hydrocarbons with from about 30 to about 60 carbon atoms, (d) branched paraffinic hydrocarbons with from about 30 to about 60 carbon atoms, (e) naphthenic hydrocarbons with from about 30 to about 60 carbon atoms, (f) highly branched hydrocarbons prepared by olefin polymerization, (g) those of the general formula

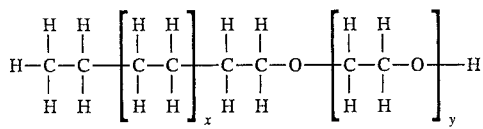

wherein x is an integer of from about 11 to about 24 and y is an integer of from about 1 to about 40, (h) those of the general formula

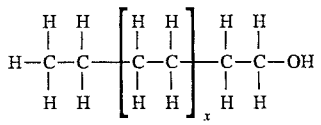

wherein x is an integer of from about 11 to about 23, (i) those of the general formula

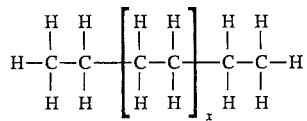

wherein x is an integer of from about 12 to about 105, (j) those of the general formulae

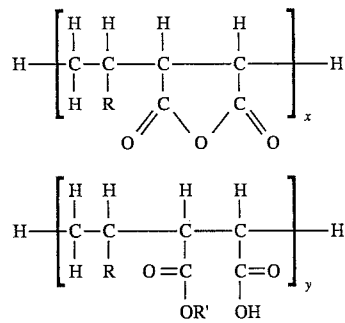

wherein R is an alkyl group with from about 6 to about 28 carbon atoms, R' is an ethyl group, a propyl group, an isopropyl group, a butyl group, an isobutyl group, or an alkyl group with from about 20 to about 200 carbon atoms, x is an integer of from about 9 to about 13, and y is an integer of from about 9 to about 13, (k) those of the general formula

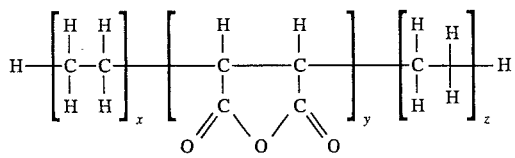

wherein R is an alkyl group with from about 6 to about 28 carbon atoms, x is an integer of from about 9 to about 13, y is 1 or 2, and z is an integer of from about 9 to about 13, (I) those of the general formula

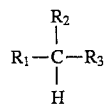

wherein $R_1$ and $R_3$ are hydrocarbon groups and $R_2$ is either of one of the general formulae

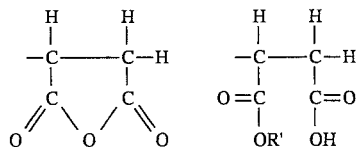

or a mixture thereof, wherein R' is an isopropyl group, (m) mixtures of stearyl stearamide and dimer acid tetraamide, and mixtures thereof.

4. A hot melt ink composition according to claim 1 wherein the photochromic material is present in the ink in an amount of from about 1 to about 50 percent by weight.

5. A hot melt ink composition according to claim 1 wherein the photochromic material is a spiropyran.

6. A hot melt ink composition according to claim 1 wherein the photochromic material is a spirooxazine.

7. A hot melt ink composition according to claim 1 wherein the photochromic material is a spirothiopyran.

8. A hot melt ink composition according to claim 1 wherein the photochromic material is selected from the group consisting of 1',3'-dihydro-1',3',3'-trimethyl-6-nitro-spiro[2H-1-benzopyran-2,2'-(2H)indole], 1,3-dihydro-1,3,3-trimethylspiro[2H-indole-2,3'-[3H]naphth[2,1-b][1,4]oxazine, and mixtures thereof.

9. A process for generating images which comprises incorporating into an ink jet printing apparatus the ink composition of claim 1 and forming images by melting the ink and causing the melted ink to be expelled in droplets onto a substrate, thereby generating an image on the substrate.

10. A process according to claim 9 wherein the ink is selectively heated in an imagewise pattern, thereby causing droplets of the ink to be ejected in an imagewise pattern.

11. A process which comprises (1) incorporating into an ink jet printing apparatus an ink composition which comprises (a) an ink vehicle said ink vehicle being a solid at about 25° C. and having a viscosity of from about 1 to about 20 centipoise at a temperature suitable for hot melt ink jet printing, said temperature being greater than about 45° C., (b) a photochromic material having a first state corresponding to a first absorption spectrum and a second state corresponding to a second absorption spectrum, said photochromic material being selected from the group consisting of spiropyrans, spirooxazines, spirothiopyrans, bis-imidazole compounds, bis-tetraphenylpyrroles, hydrazine compounds, aryl disulfide compounds, stilbene compounds, photoisomerizable azo compounds, naphthacenequinones, and mixtures thereof, (c) an optional colorant, and (d) an optional propellant; (2) forming images by melting the ink and causing the melted ink to be expelled in droplets onto a substrate, thereby generating an image on the substrate; and (3) thereafter effecting a photochromic change in at least some of the photochromic material on the substrate from the first state to the second state.

12. A process according to claim 11 wherein the photochromic change in the photochromic material from the first state to the second state is effected by irradiation with radiation at a selected wavelength.

13. A process which comprises (1) incorporating into an ink jet printing apparatus an ink composition which comprises (a) an ink vehicle, said ink vehicle being a solid at about 25° C. and having a viscosity of from about 1 to about 20 centipoise at a temperature suitable for hot melt ink jet printing, said temperature being greater than about 45° C., (b) a photochromic material having a first state corresponding to a first absorption spectrum and a second state corresponding to a second absorption spectrum, (c) an optional colorant, and (c) an optional propellant (2) forming images by melting the ink and causing the melted ink to be expelled in droplets onto a substrate, thereby generating an image on the substrate; and (3) thereafter effecting a photochromic change in at least some of the photochromic material on the substrate from the first state to the second state, wherein the photochromic change in the photochromic material from the first state to the second state is effected by irradiation with radiation at a selected wavelength, wherein said radiation is within the ultraviolet wavelength band.

14. A process which comprises (1) incorporating into an ink jet printing apparatus an ink composition which comprises (a) an ink vehicle, said ink vehicle being a solid at about 25° C. and having a viscosity of from about 1 to about 20 centipoise at a temperature suitable for hot melt ink jet printing, said temperature being greater than about 45° C., (b) a photochromic material having a first state corresponding to a first absorption spectrum and a second state corresponding to a second absorption spectrum, (c) an optional colorant, and (c) an optional propellant; (2) forming images by melting the ink and causing the melted ink to be expelled in droplets onto a substrate, thereby generating an image on the substrate; and (3) thereafter effecting a photochromic change in at least some of the photochromic material on the substrate from the first state to the second state, wherein the photochromic material in the second state subsequently is caused to undergo another photochromic change, thereby returning it to the first state.

15. A process according to claim 14 wherein the photochromic material in the second state subsequently is caused to undergo another photochromic change effected by irradiation with visible light, thereby returning it to the first state.

16. A process according to claim 14 wherein the photochromic material in the second state subsequently is caused to undergo another photochromic change effected by heating, thereby returning it to the first state.

17. A process according to claim 11 wherein all of the photochromic material on the substrate is caused to shift from the first state to the second state.

18. A process which comprises (1) incorporating into an ink jet printing apparatus an ink composition which comprises (a) an ink vehicle, said ink vehicle being a solid at about 25° C. and having a viscosity of from about 1 to about 20 centipoise at a temperature suitable for hot melt ink jet printing, said temperature being greater than about 45° C., (b) a photochromic material having a first state corresponding to a first absorption spectrum and a second state corresponding to a second absorption spectrum, (c) an optional colorant, and (c) an optional propellant; (2) forming images by melting the ink and causing the melted ink to be expelled in droplets onto a substrate, thereby generating an image on the substrate; and (3) thereafter effecting a photochromic change in at least some of the photochromic material on the substrate from the first state to the second state, wherein a first portion of the photochromic material on the substrate is caused to shift from the first state to the second state and a second portion of the photochromic material on the substrate remains in the first state.

19. A process which comprises (1) incorporating into an ink jet printing apparatus an ink composition which comprises (a) an ink vehicle, said ink vehicle being a solid at about 25° C. and having a viscosity of from about 1 to about 20 centipoise at a temperature suitable for hot melt ink jet printing, said temperature being greater than about 45° C., (b) a photochromic material having a first state corresponding to a first absorption spectrum and a second state corresponding to a second absorption spectrum, (c) an optional colorant, and (c) an optional propellant; (2) forming images by melting the ink and causing the melted ink to be expelled in droplets onto a substrate, thereby generating an image on the substrate; and (3) thereafter effecting a photochromic change in at least some of the photochromic material on the substrate from the first state to the second state, wherein the ink vehicle contains a material selected from the group consisting of (a) those of the general formula

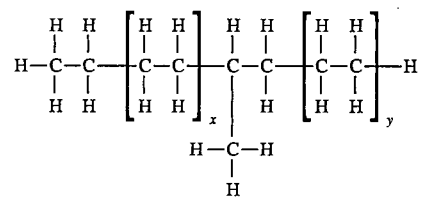

wherein y is an integer of from 0 to about 10 and x=21-y, (b) those of the general formulae

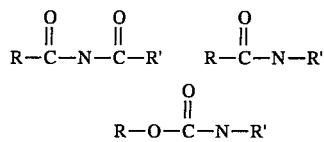

wherein R is an alkyl group of the formula $CH_3(CH_2)_n$ wherein n is an integer of from about 20 to about 200 and R' is a tolyl group, (c) n-paraffinic hydrocarbons with from about 30 to about 60 carbon atoms, (d) branched paraffinic hydrocarbons with from about 30 to about 60 carbon atoms, (e) naphthenic hydrocarbons with from about 30 to about 60 carbon atoms, (f) highly branched hydrocarbons prepared by olefin polymerization, (g) those of the general formula

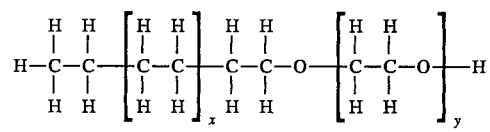

wherein x is an integer of from about 11 to about 24 and y is an integer of from about ]to about 40, (h) those of the general formula

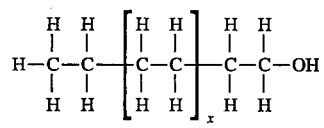

wherein x is an integer of from about 11 to about 23, (i) those of the general formula

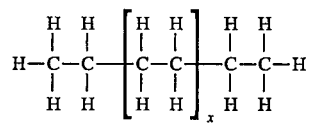

wherein x is an integer of from about 12 to about 105, (j) those of the general formulae

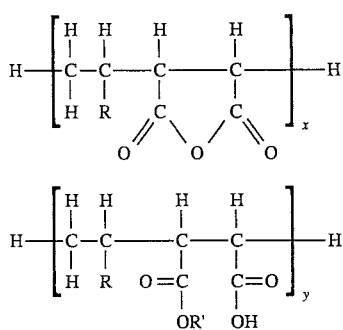

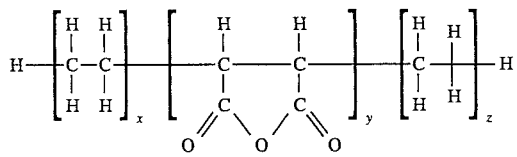

wherein R is an alkyl group with from about 6 to about 28 carbon atoms, R' is an ethyl group, a propyl group, an isopropyl group, a butyl group, an isobutyl group, or an alkyl group with from about 20 to about 200 carbon atoms, x is an integer of from about 9 to about 13, and y is an integer of from about 9 to about 13, (k) those of the general formula

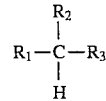

wherein R is an alkyl group with from about 6 to about 28 carbon atoms, x is an integer of from about 9 to about 13, y is 1 or 2, and z is an integer of from about 9 to about 13, (I) those of the general formula $$R_1-\underset{\underset{H}{|}}{\overset{\overset{R_2}{|}}{C}}-R_3$$

wherein $R_1$ and $R_3$ are hydrocarbon groups and $R_2$ is either of one of the general formulae

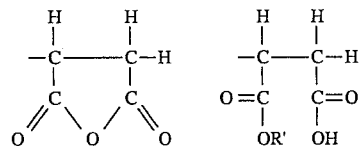

or a mixture thereof, wherein R' is an isopropyl group, (m) mixtures of stearyl stearamide and dimer acid tetraamide, and mixtures thereof.

* * * * *